United States Patent
Ishikawa

(10) Patent No.: US 11,689,293 B2
(45) Date of Patent: Jun. 27, 2023

(54) CONTROL DEVICE OF MODULATING SIGNAL AND METHOD

(71) Applicant: FUJITSU OPTICAL COMPONENTS LIMITED, Kawasaki (JP)

(72) Inventor: Tomohisa Ishikawa, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/685,043

(22) Filed: Mar. 2, 2022

(65) Prior Publication Data

US 2022/0303018 A1 Sep. 22, 2022

(30) Foreign Application Priority Data

Mar. 17, 2021 (JP) .................................. 2021-043855

(51) Int. Cl.
| | |
|---|---|
| *H04B 10/2507* | (2013.01) |
| *H04B 10/524* | (2013.01) |
| *H04B 10/54* | (2013.01) |
| *H04B 10/293* | (2013.01) |
| *H04B 10/80* | (2013.01) |

(52) U.S. Cl.
CPC ......... *H04B 10/54* (2013.01); *H04B 10/2935* (2013.01); *H04B 10/808* (2013.01); *H04B 10/2507* (2013.01); *H04B 10/524* (2013.01)

(58) Field of Classification Search
None
See application file for complete search history.

(56) References Cited

U.S. PATENT DOCUMENTS

| 6,385,360 | B1 | 5/2002 | Kambe |
| 9,584,222 | B2* | 2/2017 | Tatsumi ............... H04B 10/505 |
| 10,038,575 | B1* | 7/2018 | Steffan .................... H04L 27/01 |
| 10,333,622 | B2* | 6/2019 | Bhoja ................ H04B 10/2575 |
| 10,491,436 | B1* | 11/2019 | Lim ............... H03K 19/017545 |
| 10,720,995 | B1* | 7/2020 | Mazzini ............. H04L 25/4917 |
| 2013/0170781 | A1 | 7/2013 | Kissa et al. |
| 2013/0223849 | A1* | 8/2013 | Whiteaway ........... H04L 27/368 |
| | | | 398/186 |
| 2016/0269121 | A1* | 9/2016 | Lee ...................... H04B 10/524 |

(Continued)

FOREIGN PATENT DOCUMENTS

| JP | 2000-066157 | 3/2000 |
| JP | 2017-216681 | 12/2017 |

*Primary Examiner* — Jai M Lee
(74) *Attorney, Agent, or Firm* — Staas & Halsey LLP

(57) ABSTRACT

A control device of modulating signal generates high-side signal and low-side signal. The high-side signal takes level in accordance with level of AC component of a monitor signal obtained by photoelectric conversion of modulated light, when the polarity of the AC component is positive, or its magnitude is zero. The high-side signal further takes constant level when the polarity of the AC component is negative. The low-side signal takes constant level when the polarity of the AC component is positive. The low-side signal further takes level in accordance with level of the AC component when the polarity of the AC component is negative, or its magnitude is zero. Then, the control device adjusts level of the modulating signal based on a greatest value of absolute values of levels taken by the high-side signal and a greatest value of absolute values of levels taken by the low-side signal.

10 Claims, 43 Drawing Sheets

(56) References Cited

U.S. PATENT DOCUMENTS

| | | |
|---|---|---|
| 2017/0346570 A1 | 11/2017 | Teranishi |
| 2018/0198527 A1 | 7/2018 | Bhoja et al. |
| 2019/0109645 A1* | 4/2019 | Teranishi ........... H04B 10/5161 |
| 2021/0211202 A1* | 7/2021 | Tsai ..................... G02F 1/0123 |

* cited by examiner

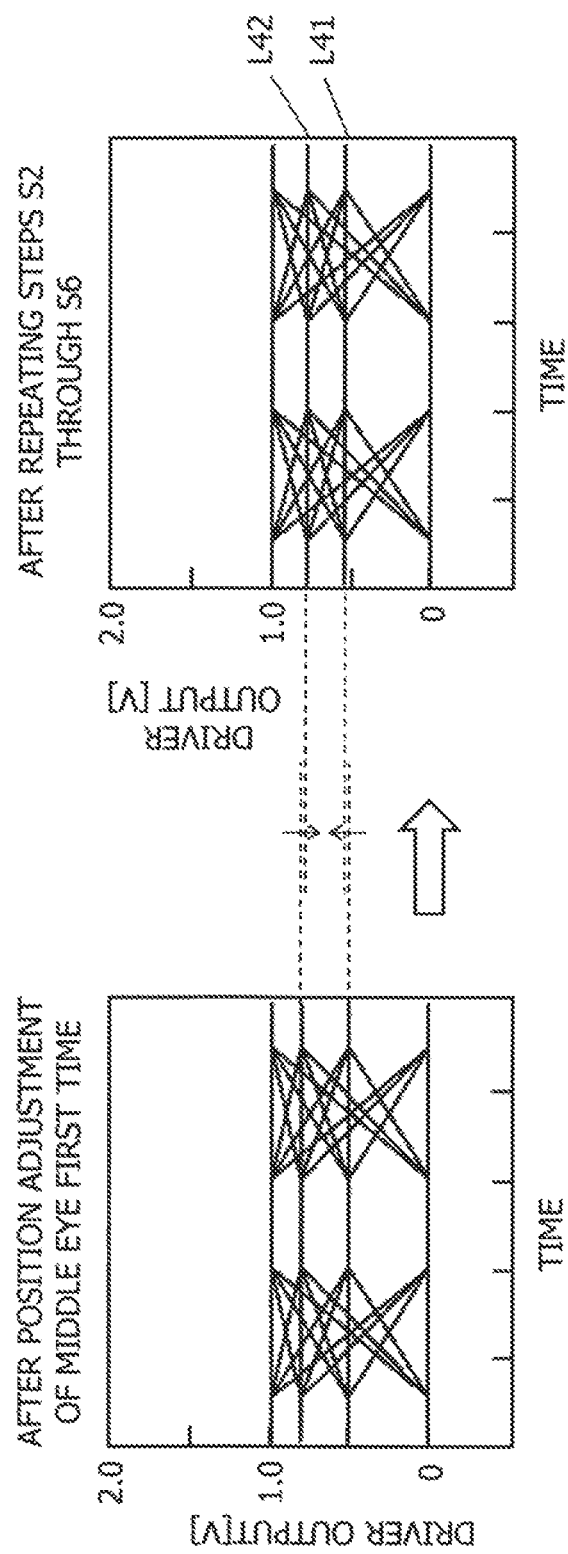

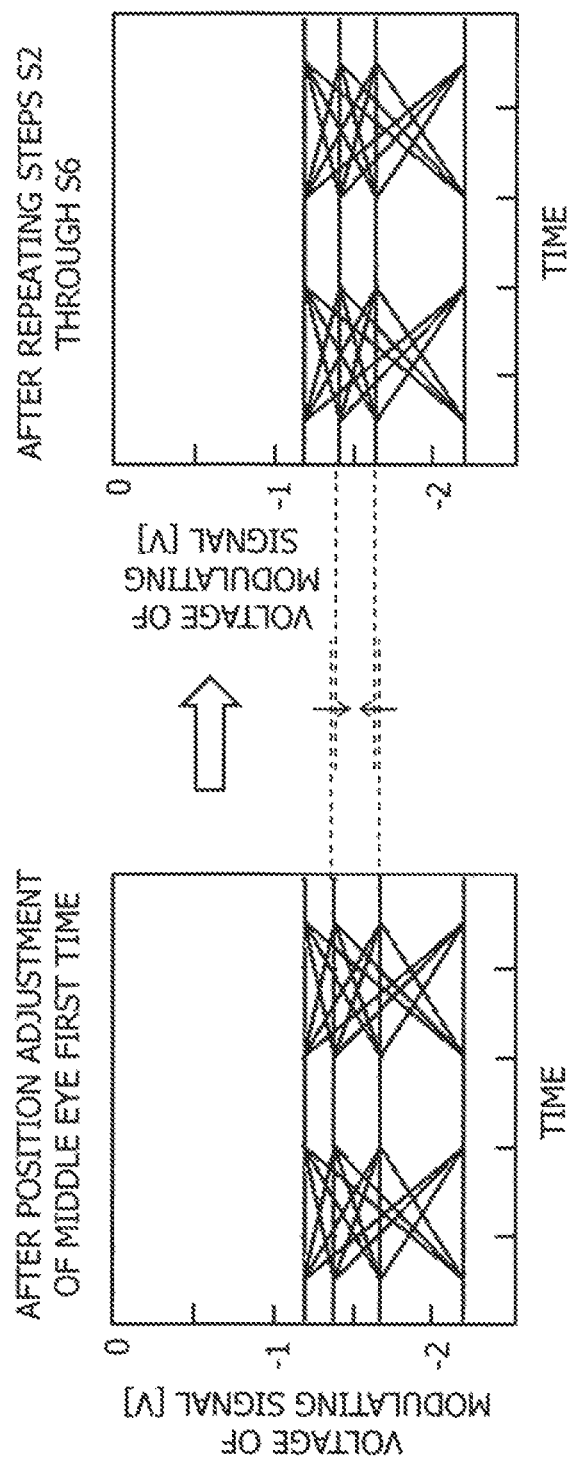

CONTROL DEVICE OF MODULATING SIGNAL AND METHOD

CROSS-REFERENCE TO RELATED APPLICATION

This application is based upon and claims the benefit of priority of the prior Japanese Patent Application No. 2021-043855, filed on Mar. 17, 2021, the entire contents of which are incorporated herein by reference.

FIELD

The embodiments discussed herein are related to a control device of a modulating signal and a control method of a modulating signal.

BACKGROUND

Optical transmission technology that uses multilevel modulation, capable of greater capacity and higher speed communication as compared to binary level modulation (e.g., On-Off-Keying), is being studied (e.g., see Japanese Laid-open Patent Publication No. 2017-216681 and U.S. Patent Application Publication No. 2018/0198527). PAM4 (Pulse Amplitude Modulation 4), for example, is a modulation format in which electrical signals that take four levels (in other words, "assume for levels"; the same applies hereafter) are applied to a modulator, thereby generating quaternary optical signals that exhibit four values.

Multivalued optical signals (e.g., quaternary optical signals) generated by the modulator are input to a receiver via an optical transmission line, and demodulated into the original electric signals. Unless the intervals between levels of the multivalued optical signals are uniform, the frequency of the multivalued optical signals being erroneously demodulated rises.

Now, many modulators that convert electrical signals into optical signals exhibit non-linearity, in which the level of output light (hereinafter referred to as modulated light) does not linearly change with regard to the level of electrical signals being applied (hereinafter referred to as modulating signals). Applying modulating signals having uniform level intervals to such a modulator generates multivalued optical signals with non-uniform level intervals. As a result, the frequency of demodulation error rises.

Accordingly, technology is being proposed to adjust the levels of modulating signals on the basis of modulation characteristics (i.e., the relation between voltage and so forth of the modulating signals, and the light intensity of the generated modulated light) recorded in memory, so that the level intervals of the multivalued optical signals will be uniform (e.g., Japanese Laid-open Patent Publication No. 2017-216681).

SUMMARY

According to an aspect of the embodiments, a control device to controls a modulating signal that takes a first level, a second level that is higher than the first level, and at least one third level that is higher than the first level and lower than the second level includes a high-side signal generating unit that generates a high-side signal, the high-side signal taking a level in accordance with a level of an alternating current component of an electrical signal generated from a modulated light when a polarity of the alternating current component is positive or magnitude of the alternating current component is zero, the high-side signal further taking a constant level when a polarity of the alternating current component is negative; a low-side signal generating unit that generates a low-side signal, the low-side signal taking a constant level when a polarity of the alternating current component is positive, the low-side signal further taking a level in accordance with a level of the alternating current component when a polarity of the alternating current component is negative or magnitude of the alternating current component is zero; a high-side peak value detecting unit that generates a high-side peak value signal that takes a fourth level in accordance with a first certain level out of levels that the high-side signal takes, the first certain level being a level with a greatest value of absolute values for levels that the high-side signal takes; a low-side peak value detecting unit that generates a low-side peak value signal that takes a fifth level in accordance with a second certain level out of levels that the low-side signal takes, the second certain level being a level with a greatest value of absolute values for levels that the low-side signal takes; a level adjusting unit that adjusts the at least one third level of the modulating signal on the basis of the fourth level taken by the high-side peak value signal and the fifth level taken by the low-side peak value signal, wherein the modulating signal causes an optical device to generate the modulated light by taking the first level, the second level, and the at least one third level while being applied to the optical device, the modulated light being a multivalued signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 29A is a diagram illustrating eye patterns of the driver output 20 obtained by repeating steps S2 through S6;

FIG. 29B is a diagram illustrating an eye pattern of the modulating signal 22 obtained by repeating steps S2 through S6;

DESCRIPTION OF EMBODIMENTS

The embodiments will be described hereinafter according to the drawings. However, it is noted that the technical scope is not limited to the embodiments described below but covers the matters described in the claims and the equivalents thereof. Here, identical symbols are given to corresponding parts even in different drawings, and the description thereof will be omitted.

Embodiment 1

(1) Device Configuration and Operations

Figure 1:
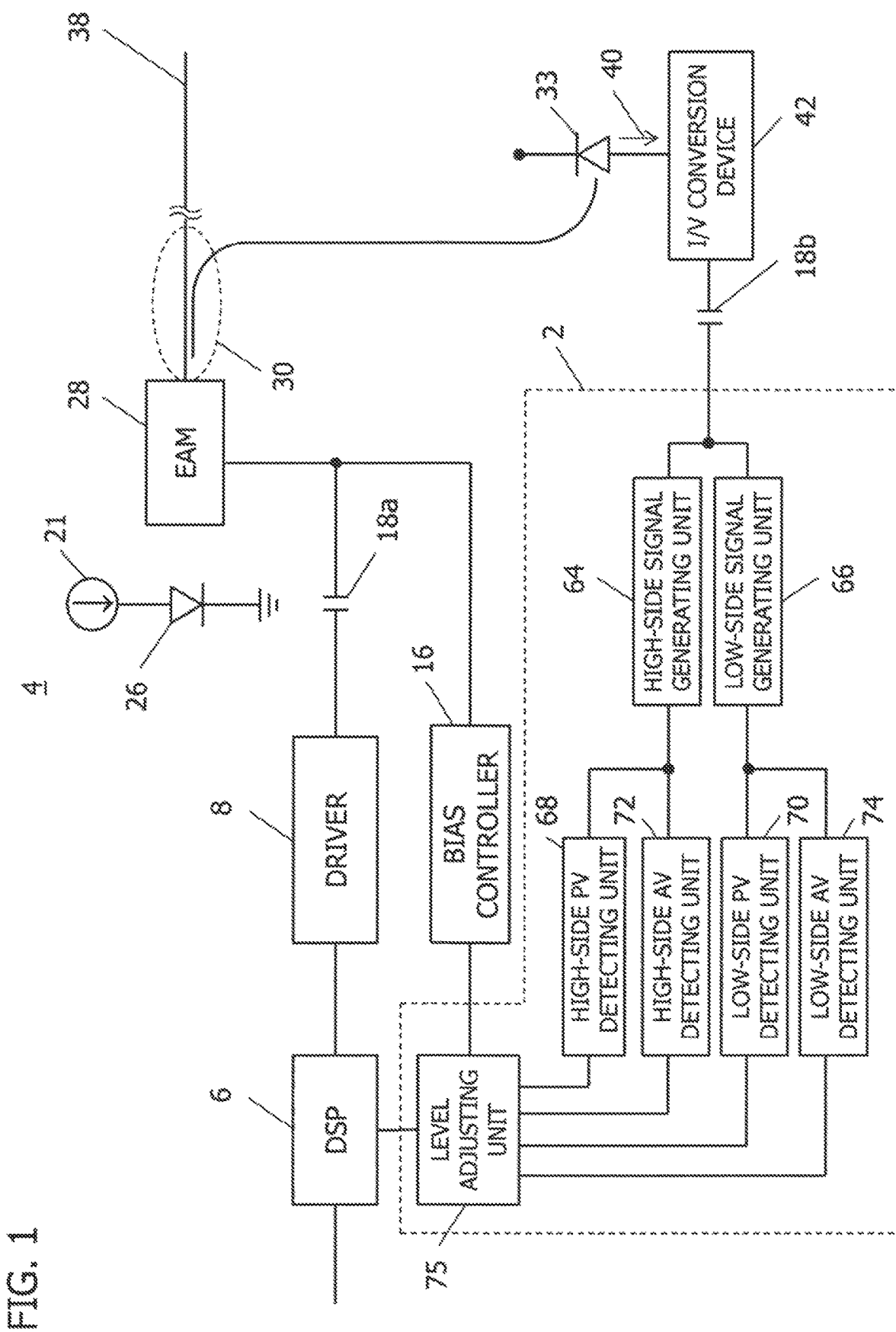
FIG. 1 is a diagram illustrating an example of an optical transmitter 4 including a control device 2 according to Embodiment 1.
Figure 2:
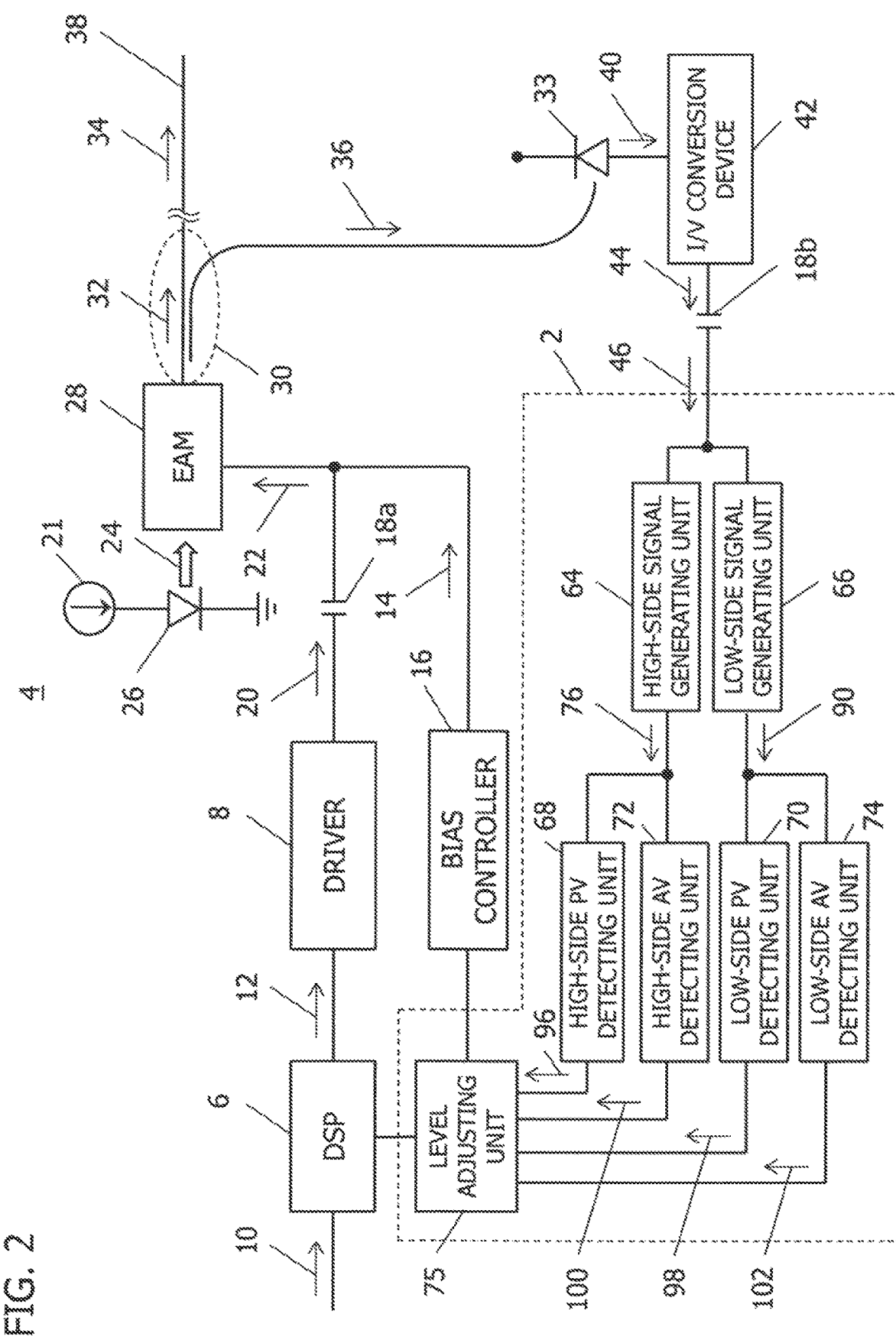
FIG. 2 is a diagram illustrating the flow of signals in FIG. 1.

FIG. 1 is a diagram illustrating an example of an optical transmitter 4 including a control device 2 according to Embodiment 1. FIG. 2 is a diagram illustrating the flow of signals in FIG. 1.

The optical transmitter 4 includes a DSP (Digital Signal Processor) 6, and a driver 8 connected to the DSP 6, for example. The DSP 6 converts a digital signal 10 (see FIG. 2) into a multivalued signal 12 (electrical signal) that has three or more amplitudes. The driver 8 amplifies the multivalued signal 12 output from the DSP 6.

The optical transmitter 4 further has a bias controller 16 that outputs a bias voltage 14 (direct current voltage), and a DC block (direct current block filter) 18a of which one end is connected to the driver 8 and the other end is connected to the bias controller 16. The DC block 18a superimposes an alternating current component of the amplified multivalued signal 12 (hereinafter referred to as driver output 20) on the bias voltage 14, and generates a modulating signal 22. The alternating current component is a signal obtained by subtracting, from a certain signal, an averaged signal of that signal (i.e., direct current component).

The optical transmitter 4 further has a current source 21 and a semiconductor laser 26 that is connected to the current source 21 and outputs continuous light 24. The optical transmitter 4 further has a modulator 28 that is connected to an end of the DC block 18a on the bias controller 16 side. In the example illustrated in FIG. 1, the modulator 28 is an electro-absorption modulator (Electro-Absorption Modulator: EAM).

The continuous light 24 output by the semiconductor laser 26 is input to the modulator 28, and the light intensity thereof is modulated in accordance with the level (voltage here) of the modulating signal 22 applied to the modulator 28. The modulating signal 22 is the alternating current component superimposed on the bias voltage 14 in the example illustrated in FIG. 1, the alternating current component being an alternating current component of the driver output 20 (e.g., the amplified multivalued signal 12).

The optical transmitter 4 further has an optical splitter 30 (e.g., fiber coupler) and a photodetector 33. The modulator 28 is connected to an input end of the optical splitter 30. The photodetector 33 is connected to one of the output terminals of the optical splitter 30.

The optical splitter 30 splits the modulated continuous light 24 (hereinafter referred to as modulated light 32) into transmission light 34 and monitor light 36. The modulated light 32 is optical signals having three or more amplitudes (i.e., multivalued optical signals).

The transmission light 34 is sent out on, for example, an optical transmission line 38 (e.g., optical fiber). Meanwhile, the monitor light 36 is input to the photodetector 33. The photodetector 33 converts the monitor light 36 into a photoelectric current 40 of which the magnitude changes in accordance with the light intensity of the monitor light 36.

The optical transmitter 4 further has a current/voltage conversion device 42 connected to the photodetector 33, and a DC block 18b with one end connected to the current/voltage conversion device 42 and the other end connected to the control device 2. The current/voltage conversion device 42 is a transimpedance amplifier, for example.

The current/voltage conversion device 42 converts the photoelectric current 40 into an electric signal 44 of which the voltage (i.e., potential difference as to a reference potential) changes in accordance with the magnitude of the photoelectric current 40. That is to say, the electric signal 44 is a signal generated from the modulated light 32. The DC block 18b extracts an alternating current component 46 of the electric signal 44, and inputs the alternating current component 46 to the control device 2.

Figure 3:
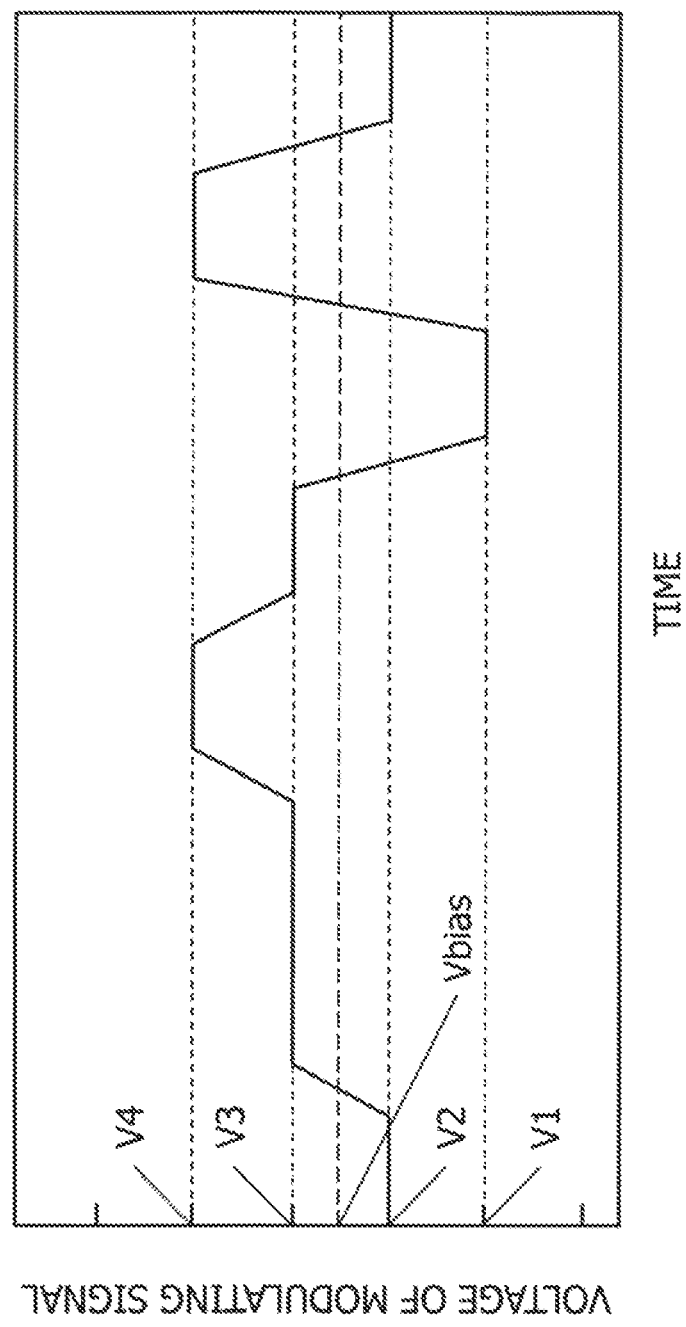
FIG. 3 is a diagram illustrating an example of temporal change of the modulating signal 22.

The control device 2 indirectly controls the modulating signal 22 by controlling the DSP 6. FIG. 3 is a diagram illustrating an example of temporal change of the modulating signal 22. The horizontal axis is time. The vertical axis is the voltage of the modulating signal. $V_{bias}$ is the bias voltage 14.

In the example illustrated in FIG. 3, the modulating signal 22 is a quaternary signal. That is to say, the voltage of the modulating signal 22 is maintained at one (e.g., voltage V2) of four voltages V1 through V4 that differ from each other, and thereafter is maintained at a different voltage (e.g., voltage V3) out of the four voltages V1 through V4 or at the original voltage (e.g., voltage V2). That is to say, the modulating signal 22 is a signal of which updating (i.e., changing or maintaining) of voltage (i.e., level) is repeated, the voltage being maintained constant for a certain amount of time.

In the example illustrated below, the modulating signal 22 is a quaternary signal. The modulating signal 22 takes four levels (voltages V1 through V4 here) while being applied to the modulator 28, thereby causing the modulator 28 to generate light signals having four values (modulated light 32 here). In the example illustrated here, the four values that the amplitudes of the modulated light 32 exhibits are 0, 1, 2, and 3, as expressed in decimal numbers. Note that the "level" of a signal is a discrete physical quantity of the signal (e.g., voltage or light intensity), and is a physical quantity that is maintained for a certain amount of time.

The difference (e.g., V2−V1) between a certain level (V1 here) and another level (V2 here) will hereinafter be referred to as level interval, the another level (V2 here) being the lowest level of levels higher than the certain level (V1 here). The level intervals of the modulating signal 22 illustrated in FIG. 3 are V2−V1, V3−V2, and V4−V3.

Figure 4:
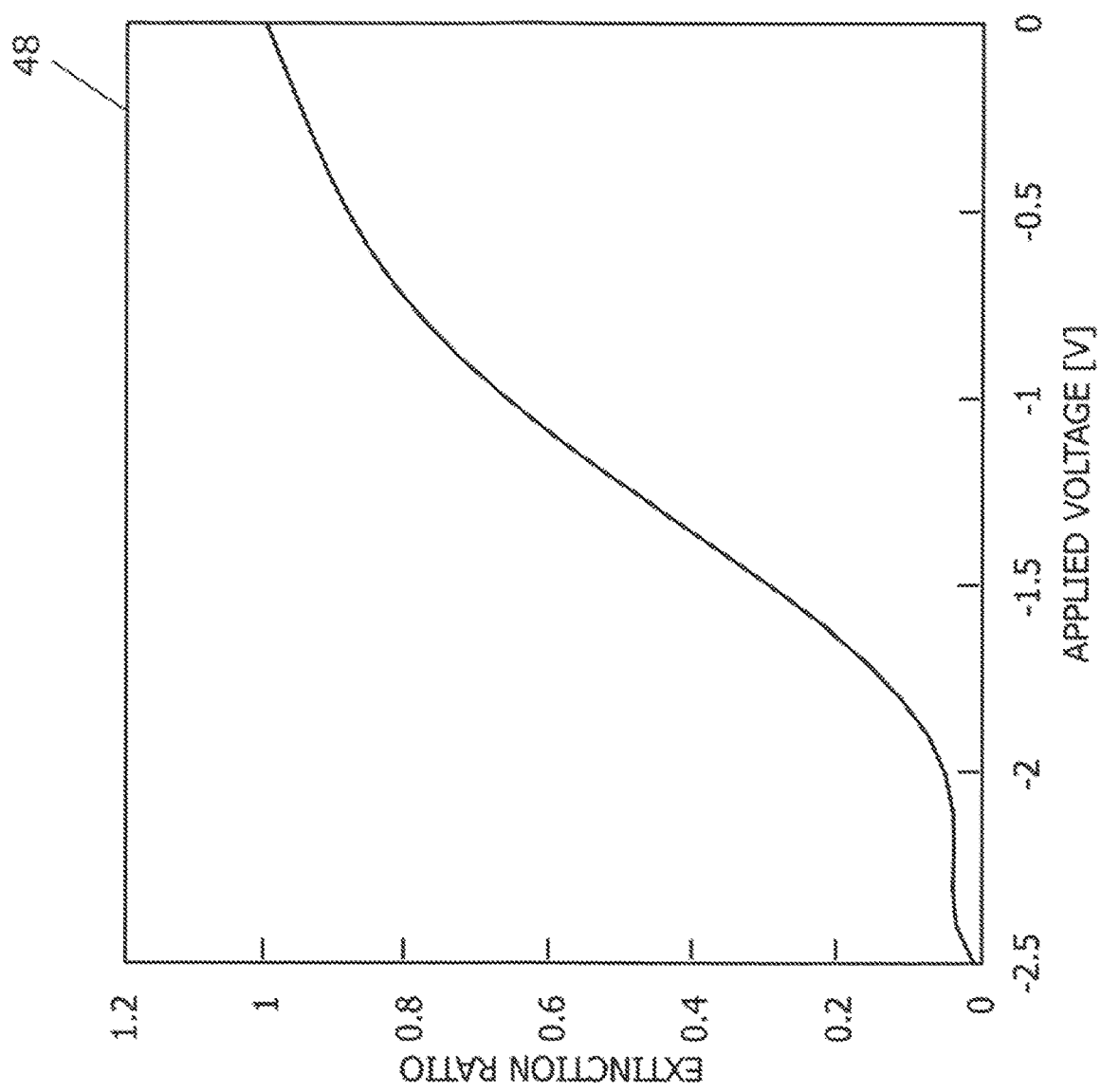
FIG. 4 is a diagram illustrating an example of modulation characteristics 48 of the modulator 28.

FIG. 4 is a diagram illustrating an example of modulation characteristics 48 of the modulator 28. The horizontal axis is voltage applied to the modulator 28 (hereinafter referred to as applied voltage). The vertical axis is relative intensity of light output from the modulator 28 (i.e., extinction ratio). The modulation characteristics of the modulator 28 (an electro-absorption modulator here) exhibit non-linearity, in which the extinction ratio does not linearly change with regard to the applied voltage, as illustrated in FIG. 4.

Figure 5:
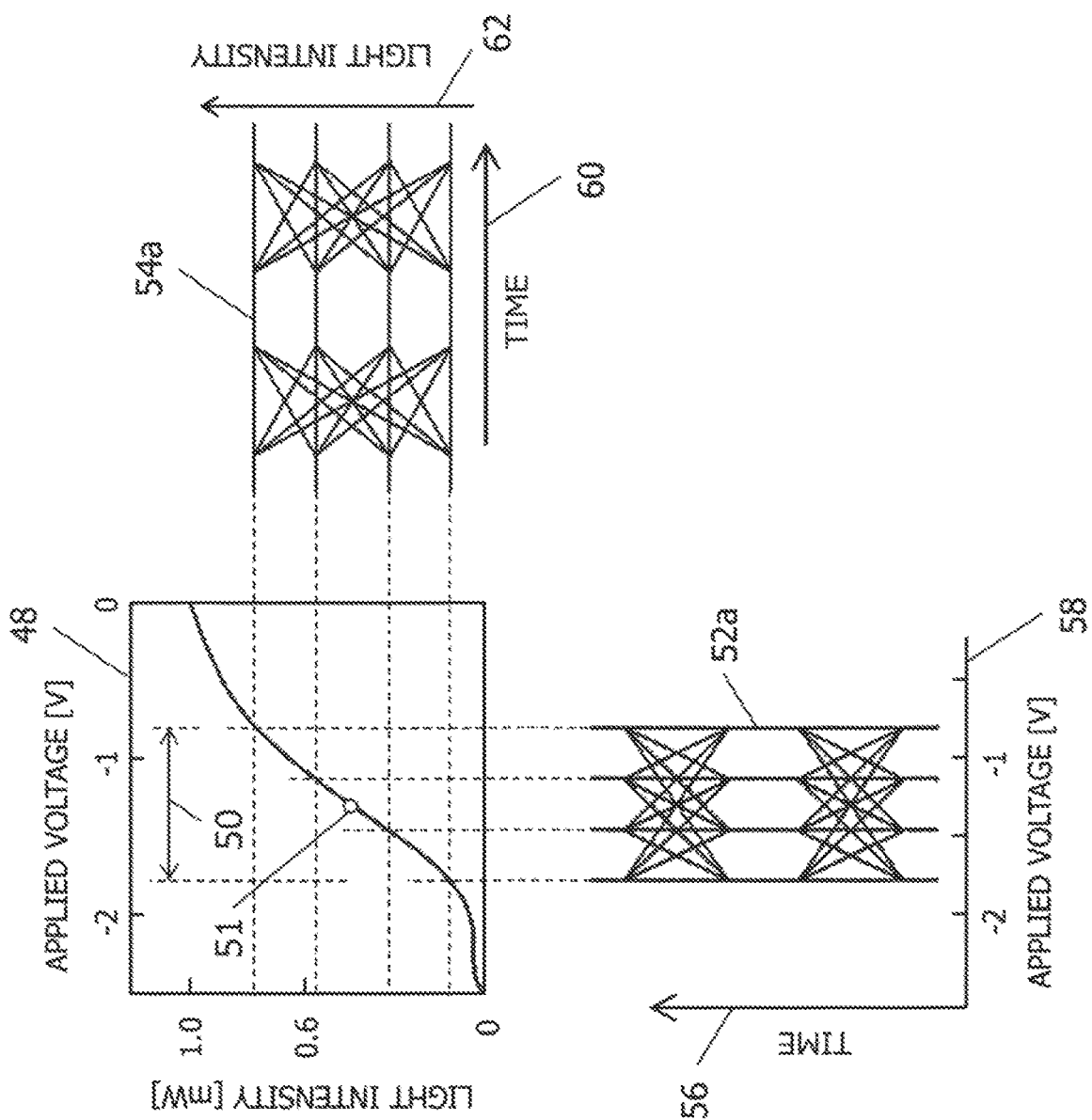
FIG. 5 is a diagram illustrating an example of an eye pattern 54a of the modulated light 32 that is generated in a case in which the bias voltage 14 is set at the center of a linear region 50 of the modulation characteristics 48.

FIG. 5 is a diagram illustrating an example of an eye pattern 54a of the modulated light 32 that is generated in a case in which the bias voltage 14 is set at the center of a linear region 50 of the modulation characteristics 48. The "linear region 50" is a range of applied voltage in which the extinction ratio changes approximately linearly as to the applied voltage. An outline dot 51 illustrated in the modulation characteristics 48 is a bias point of the modulator 28 (the same hereinafter).

FIG. 5 illustrates the modulation characteristics 48 of the modulator 28, an eye pattern 52a of the modulating signal 22, and the eye pattern 54a of the modulated light 32. The horizontal axis of the modulation characteristics 48 is applied voltage (e.g., voltage of the modulating signal 22). The vertical axis of the modulation characteristics 48 is the light intensity of light output from the modulator 28 (e.g., modulated light 32). The light intensity of the continuous light 24 input to the modulator 28 is set here so that the output light of the modulator 28 is 1 mW when the voltage applied to the modulator 28 is 0 V.

A time axis 56 of the eye pattern 52a of the modulating signal 22 indicates a later time the farther upward. A voltage axis 58 of the eye pattern 52a indicates the voltage of the modulating signal 22. The eye pattern 52a is drawn such that the scale marks of the voltage axis 58 and the scale marks of the horizontal axis of the modulation characteristics 48 match each other, by performing translation of the voltage axis 58 in the vertical direction to be overlaid on the horizontal axis of the modulation characteristics 48. This is the same in later-described FIG. 6 and others.

A time axis 60 of the eye pattern 54a of the modulated light 32 indicates a later time the farther to the right side. A light intensity axis 62 of the eye pattern 54a indicates the light intensity of the modulated light 32. The eye pattern 54a is drawn such that the scale marks of the light intensity axis 62 and the scale marks of the vertical axis of the modulation characteristics 48 match each other, by performing translation of the light intensity axis 62 in the horizontal direction to be overlaid on the vertical axis of the modulation characteristics 48. This is the same in later-described FIG. 6 and others.

As illustrated in FIG. 5, in a case in which the level of the modulating signal 22 (i.e., the applied voltage on the modulator 28) changes within the linear region 50, the eye pattern 52a of the modulating signal 22 and the eye pattern 54a of the modulated light 32 are approximately the same shape. Accordingly, as long as the level intervals of the modulating signal 22 (i.e., the heights of the eyes) are uniform, the level intervals of the modulated light 32 will also be uniform.

Figure 6:
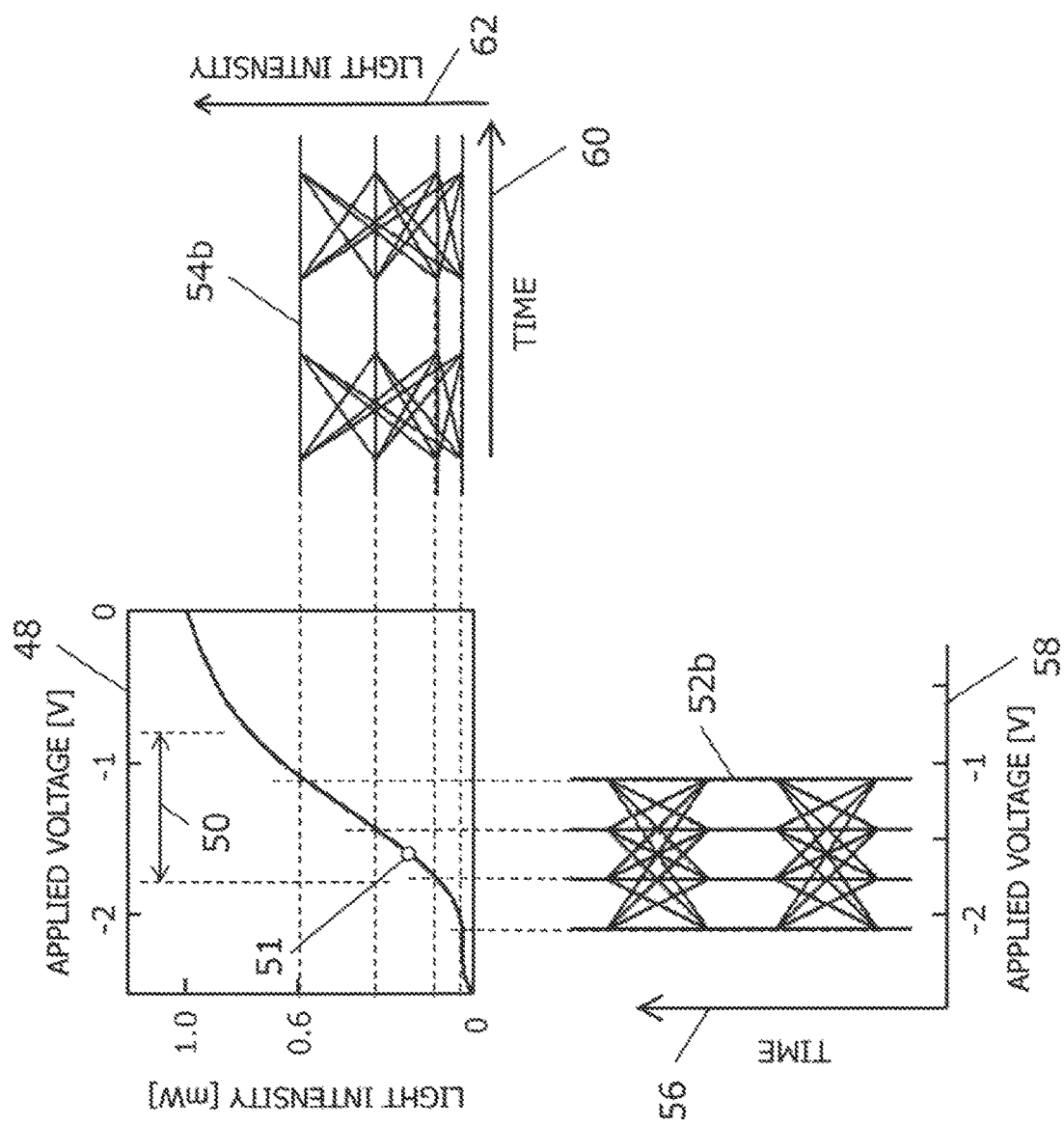
FIG. 6 is a diagram illustrating an example of an eye pattern 54b of the modulated light 32 generated in a case in which the bias voltage 14 is set to a voltage lower than the center of the linear region 50.

FIG. 6 is a diagram illustrating an example of an eye pattern 54b of the modulated light 32 generated in a case in which the bias voltage 14 is set to a voltage lower than the center of the linear region 50. The modulation characteristics 48 of the modulator 28, an eye pattern 52b of the modulating signal 22, and the eye pattern 54b of the modulated light 32 are illustrated in FIG. 6.

When the level of the modulating signal 22 changes overlapping with outside of the linear region 50, the eye pattern 54b of the modulated light 32 becomes a pattern obtained by deforming the eye pattern 52b of the modulating signal 22, as illustrated in FIG. 6. Accordingly, the level intervals of the modulated light 32 are non-uniform even though the level intervals of the modulating signal 22 are uniform.

The frequency of an optical receiver erroneously demodulating the transmission light 34 becomes higher unless the level intervals of the modulated light 32 (i.e., the heights of the eyes) are uniform, the optical receiver received the transmission light 34 (see FIG. 2). Accordingly, the control device 2 adjusts the level intervals of the modulating signal 22 so that the frequency of demodulation error (i.e., the bit error rate) does not become high.

Figure 7:
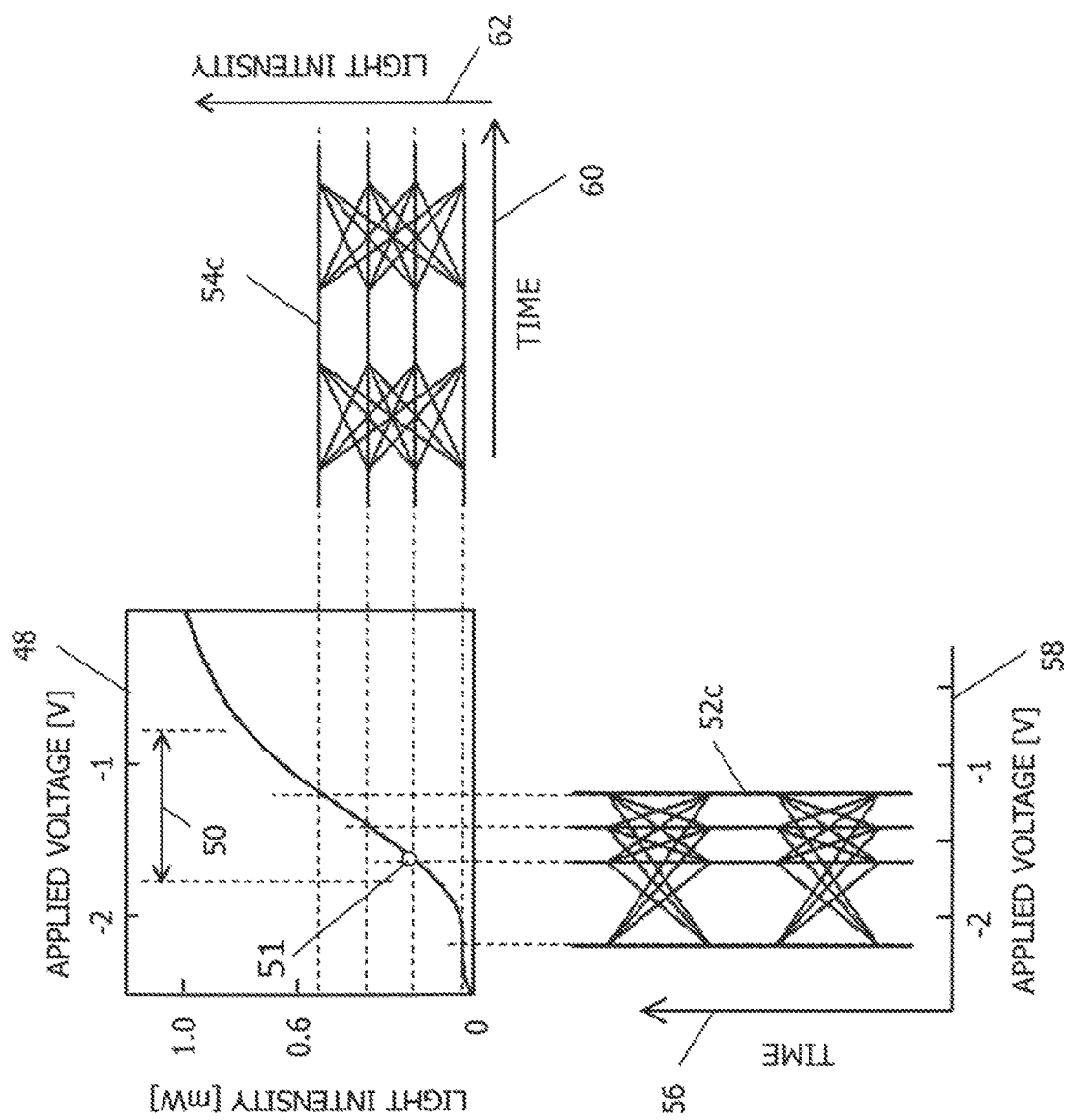
FIG. 7 is a diagram illustrating an example of an eye pattern 54c of the modulated light 32 generated in a case in which the bias voltage is set lower than the center of the linear region 50, following which the control device 2 controls the modulating signal 22.

FIG. 7 is a diagram illustrating an example of an eye pattern 54c of the modulated light 32 generated in a case in which the bias voltage is set lower than the center of the linear region 50, following which the control device 2 controls the modulating signal 22. The modulation characteristics 48 of the modulator 28, an eye pattern 52c of the modulating signal 22, and the eye pattern 54c of the modulated light 32 are illustrated in FIG. 7.

In the same way as the example illustrated in FIG. 6, the bias voltage 14 is set to a voltage lower than the center of the linear region 50 (see bias point 51). When the control device 2 controls the modulating signal 22, the level intervals of the modulating signal 22 become broader in a region in which the inclination of the modulation characteristics 48 is small, and the level intervals of the modulating signal 22 become narrower in regions in which the inclination of the modulation characteristics is great. As a result, the level intervals of the eye pattern 54c of the modulated light 32 become approximately uniform (see "(1-7) level adjusting unit 75").

Now, when the transmission light 34 is propagated over the optical transmission line 38, the waveform of the transmission light 34 becomes deformed due to group velocity dispersion of the optical transmission line 38. When the deformation of the transmission light 34 becomes great, the bit error rate becomes high. Accordingly, the bias point 51 of the modulator 28 is set to a voltage where deformation of the modulated light 32 is small.

For example, the bias voltage 14 of the modulator 28 is set to a voltage such that an α parameter of the modulator 28 is approximately zero. The longer the transmission distance is, the greater the deformation of the transmission light 34 is, and accordingly the longer the transmission distance is, the more important the bias voltage 14 that makes deformation of the transmission light 34 small (e.g., the voltage at which the α parameter becomes zero) is.

In many cases, the voltage at which the α parameter becomes zero does not match the center of the linear region 50 of the modulation characteristics 48 (hereinafter referred to as linear center). Accordingly, setting the bias voltage 14 to a voltage at which the α parameter becomes zero results in the level intervals of the modulated light 32 being non-uniform (see FIG. 6). According to the control device 2 of Embodiment 1, the level intervals (i.e., the level intervals of the modulated light 32) made non-uniform due to such settings of the bias voltage 14 are made to be uniform, and accordingly increase in bit error rate at the optical receiver can be suppressed.

FIGS. 8A, 8B, 9A, and 9B are diagrams illustrating an example of eye patterns of the driver output 20, the modulating signal 22, the modulated light 32, and the alternating current component 46 of the electric signal 44 (hereinafter referred to as monitor signal) in the optical transmitter 4 according to Embodiment 1. Eye patterns of each of the signals in a case in which the bias voltage 14 is set on the linear center, and eye patterns immediately following changing the bias voltage 14 to a voltage lower than the linear center, are illustrated in FIGS. 8A, 8B, 9A, and 9B. FIGS. 8A, 8B, 9A, and 9B are eye patterns obtained by simulation. This is the same for FIGS. 22A, 22B, 23A, 23B, and so forth described later.

Figure 8A:
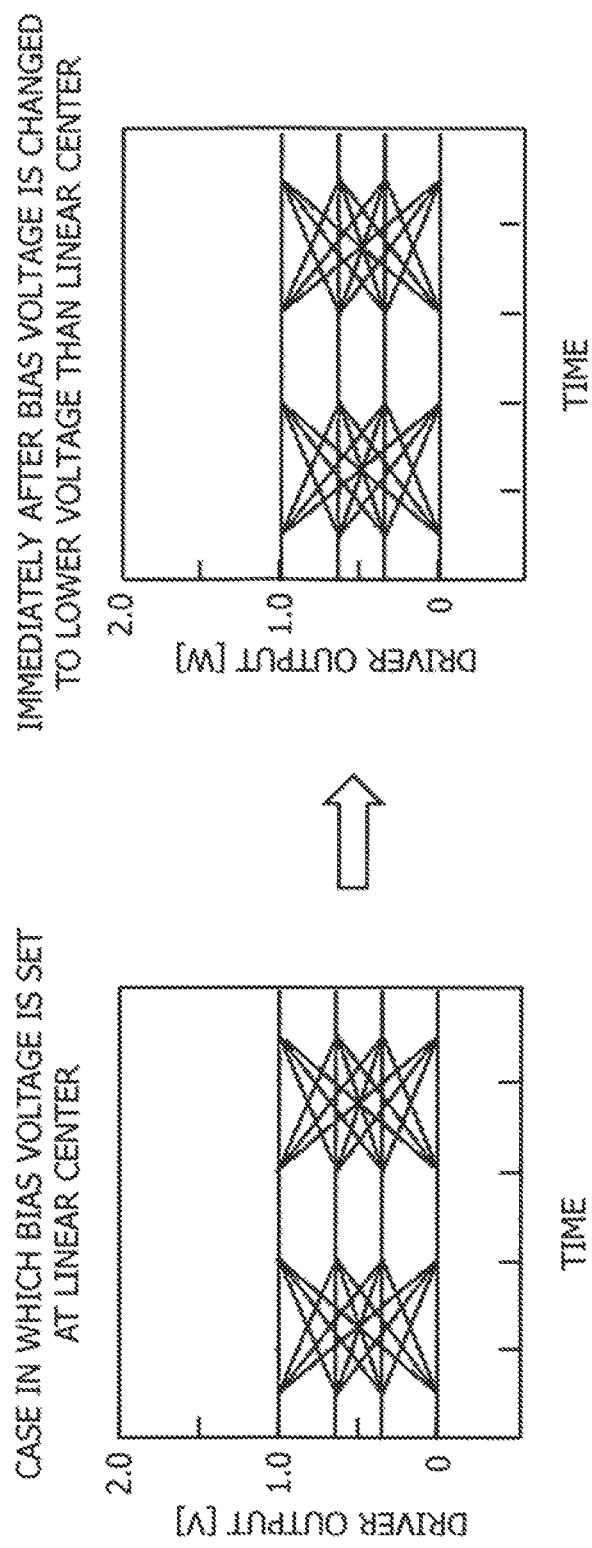
FIG. 8A illustrates eye patterns of the driver output 20 in the optical transmitter 4 of the embodiment 1.

FIG. 8A illustrates eye patterns of the driver output 20. The pattern to the left side is an eye pattern when the bias voltage 14 is set on the linear center (the same for FIGS. 8B, 9A, and 9B). The pattern to the right side is an eye pattern immediately following changing the bias voltage 14 to a voltage lower than the linear center (the same for FIGS. 8B, 9A, and 9B). There is no change in the eye pattern of the driver output 20 immediately after the bias voltage 14 is lowered, as illustrated in the right diagram in FIG. 8A.

Figure 8B:
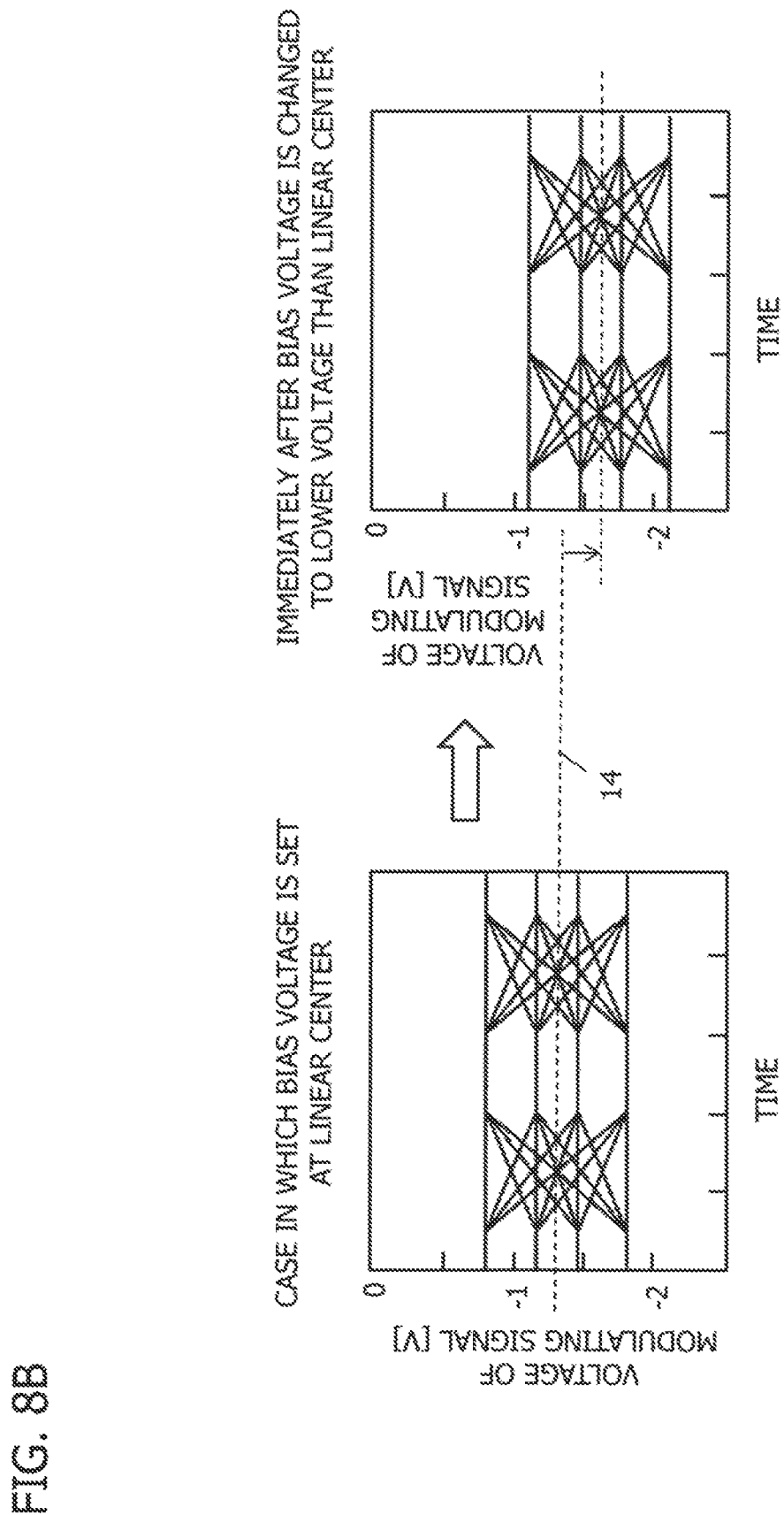
FIG. 8B illustrates eye patterns of the modulating signal 22 in the optical transmitter 4 of the embodiment 1.

FIG. 8B illustrates eye patterns of the modulating signal 22. Lowering the bias voltage 14 also lowers the level of the modulating signal 22, as illustrated in FIG. 8B.

Figure 9A:
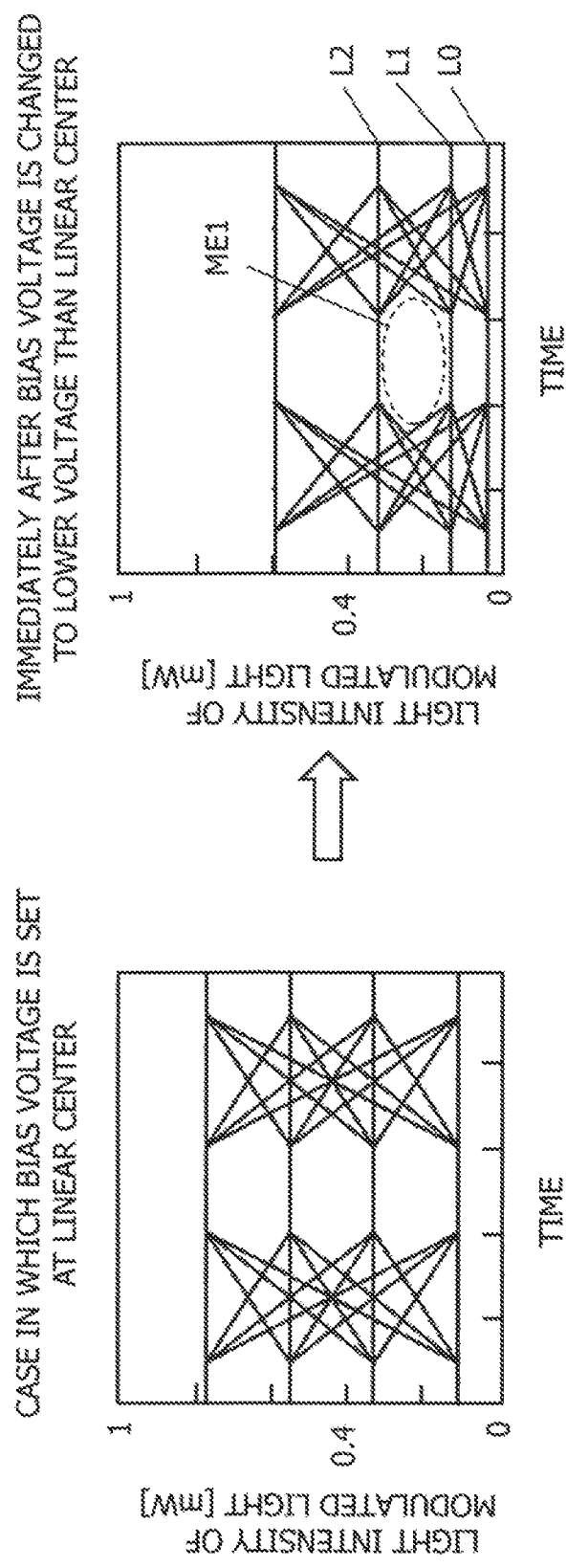
FIG. 9A illustrates eye patterns of the modulated light 32 in the optical transmitter 4 of the embodiment 1.

FIG. 9A illustrates eye patterns of the modulated light 32. As illustrated in FIG. 9A, lowering the bias voltage 14 causes a second-lowest level L1 (see FIG. 9A) of the modulated light 32 and a third-lowest level L2 to approach a lowest level L0 due to non-linearity of the modulation characteristics 48 (see FIG. 6). In other words, a middle eye ME1 between the second-lowest level L1 and the third-lowest level L2 approaches the lowest level L0.

Figure 9B:
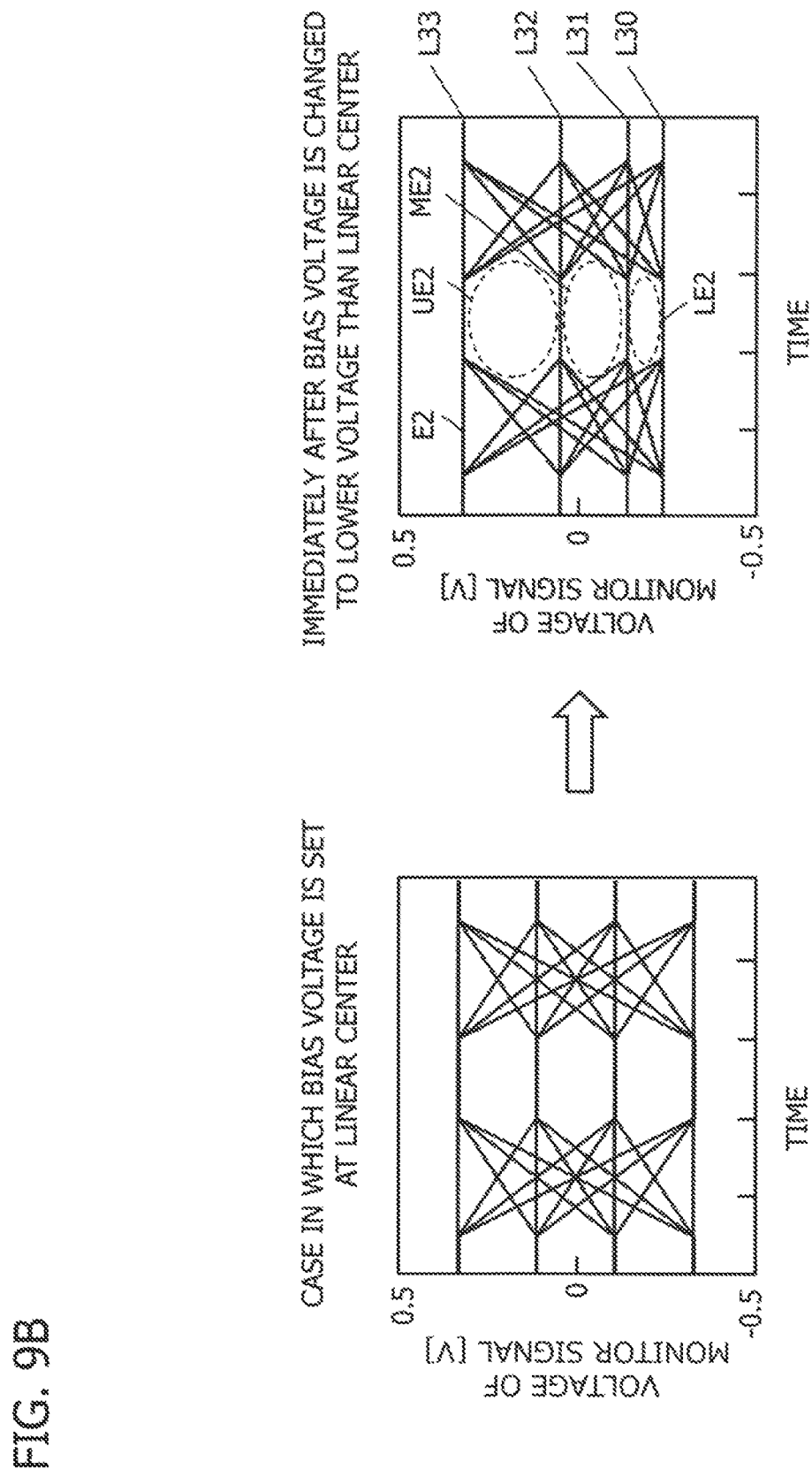
FIG. 9B illustrates eye patterns of the monitor signal 46 in the optical transmitter 4 of the embodiment 1.

FIG. 9B illustrates an eye pattern E2 of the monitor signal 46. As the middle eye ME1 of the modulated light 32 approaches the lowest level L0 as illustrated in FIG. 9A, the middle eye ME2 of the monitor signal 46 also approaches a lowest level L30 (see FIG. 9B).

The control device 2 (see FIG. 1) that adjusts the level intervals of the modulating signal 22 has a high-side signal generating unit 64, a low-side signal generating unit 66, a high-side peak value detecting unit 68, and a low-side peak value detecting unit 70. The control device 2 further has a high-side average value detecting unit 72 and a low-side average value detecting unit 74. The control device 2 further has a level adjusting unit 75. In the FIGS. 1 and 2, "peak value" is abbreviated as "PV". In the FIGS. 1 and 2, "average value" is abbreviated as "AV".

(1-1) High-Side Signal Generating Unit 64

Figure 10:
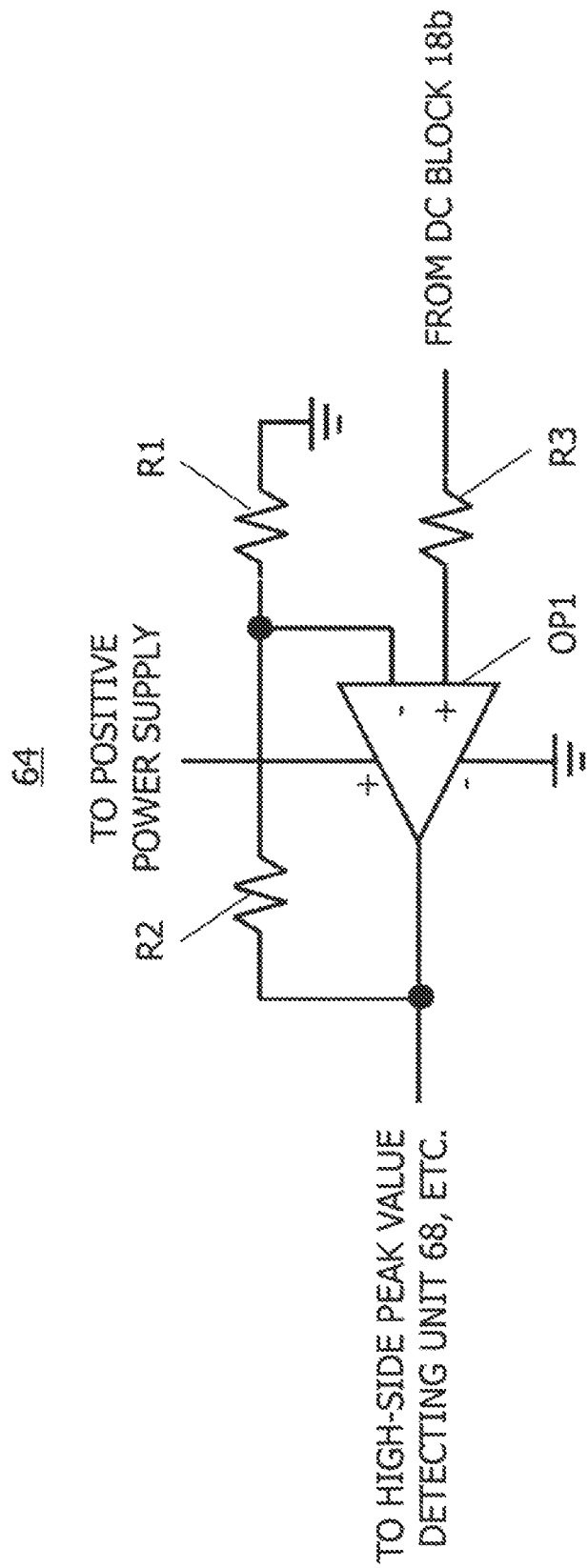
FIG. 10 is a circuit diagram illustrating an example of a hardware configuration of the high-side signal generating unit 64.

FIG. 10 is a circuit diagram illustrating an example of a hardware configuration of the high-side signal generating unit 64. The high-side signal generating unit 64 has an operational amplifier OP1 of which the output terminal is connected to the high-side peak value detecting unit 68 and the high-side average value detecting unit 72, for example. Operational amplifiers will be referred to as op amps hereinafter. The high-side signal generating unit 64 further has a resistor R1 connected between the inverting input terminal of the op amp OP1 and the reference potential (i.e., ground). The high-side signal generating unit 64 further has a resistor R2 connected between the inverting input terminal of the op amp OP1 and the output terminal thereof, and a resistor R3 connected between a non-inverting input terminal of the op amp OP1 and the DC block 18b.

Figure 11:
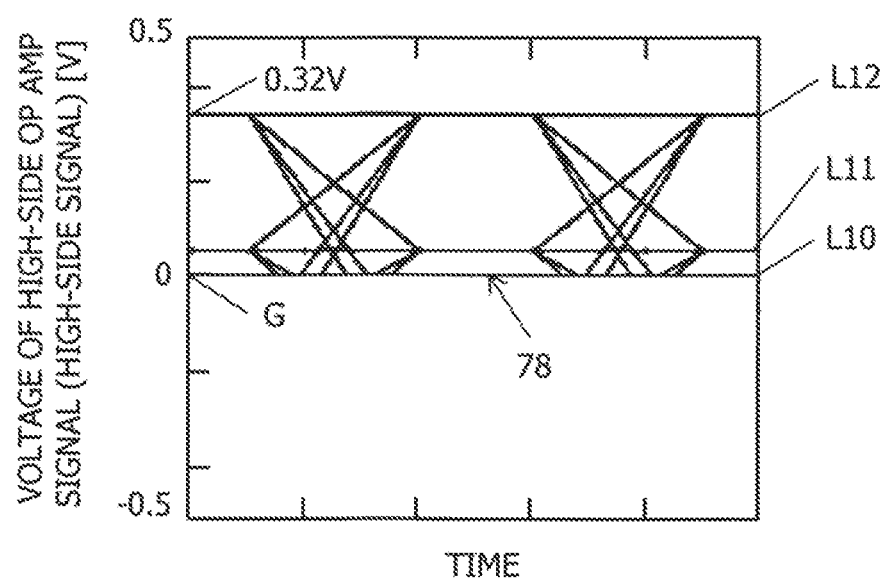
FIG. 11 is a diagram illustrating an example of an eye pattern 78 of a signal output by the op amp OP1.

FIG. 11 is a diagram illustrating an example of an eye pattern 78 of a signal output by the op amp OP1 (hereinafter, referred to as high-side op amp signal). The horizontal axis is time. The vertical axis is voltage of the high-side op amp signal.

As illustrated in FIG. 10, a positive power supply that outputs positive voltage is connected to a positive-side power supply terminal of the op amp OP1. The reference potential is connected to a negative-side power supply terminal of the op amp OP1. Accordingly, when the polarity of the monitor signal 46 is positive, the op amp OP1 outputs a signal obtained by amplifying the monitor signal 46 input to the non-inverting input terminal. The amplification factor of the monitor signal 46 is an amplification factor A (=(r1+ r2)/r1) determined by the resistance value r1 of the resistor R1 and the resistance value r2 of the resistor R2. When the polarity of the monitor signal 46 is negative, the op amp OP1 outputs the reference potential G. In the following description, r1 is to be understood to be sufficiently greater than r2. In this case, the amplification factor A is approximately 1. Note however, that the amplification factor A may be a factor other than 1.

The high-side signal generating unit 64 outputs a high-side op amp signal. The signal that the high-side signal generating unit 64 outputs (or generates) will be referred to hereinafter as high-side signal 76 (see FIG. 2). Accordingly, in the example illustrated here, the eye pattern 78 in FIG. 11 is the eye pattern of the high-side signal 76, as well.

When the polarity of the monitor signal 46 is positive or the magnitude of the monitor signal is zero (e.g., 0 V), the high-side signal 76 takes levels L12, L11, L10 (see FIG. 11) in accordance with the level of the monitor signal 46, as exemplified with reference to FIGS. 10 and 11. In the example described with reference to FIGS. 10 and 11, the "level in accordance with the level of the monitor signal 46" is a level obtained by amplifying the level of the monitor signal 46 by the amplification factor A (a factor that is greater than zero and includes 1) (the same hereinafter).

When the polarity of the monitor signal 46 is negative, the high-side signal 76 takes a constant level (hereinafter referred to as dummy level). In the example described with reference to FIGS. 10 and 11, the dummy level is the reference potential G. In this case, the dummy level is the lowest level L10 of the high-side signal 76.

The dummy level does not have to be the reference potential. Note however, when the deviation between the dummy level and the reference potential is great, erroneous level adjustment or imprecise level adjustment is performed on the later-described "position control of middle eye" and so forth. Accordingly, smaller the deviation between the dummy level and the reference potential is, the more desirable (the same regarding the dummy level of a later-described low-side signal 90).

Now, in the circuit illustrated in FIG. 10, the high-side signal generating unit 64 directly outputs the output of the op amp OP1. However, the high-side signal generating unit 64 may invert (i.e., reverse the polarity) the output of the op amp OP1 by an inverting circuit, and then perform output. The reason is that a quantity important in processing based on the high-side signal 76 (i.e., output of the high-side signal generating unit 64) is the magnitude (i.e., absolute value) of the level of the high-side signal 76. This is the same for the output of the later-described low-side signal generating unit 66 and so forth, as well.

The circuit illustrated in FIG. 10 is an analog circuit. However, the high-side signal generating unit 64 may be realized by a digital circuit, such as a DSP or the like. This is the same for the later-described low-side signal generating unit 66, high-side peak value detecting unit 68, low-side peak value detecting unit 70, high-side average value detecting unit 72, and low-side average value detecting unit 74, as well.

(1-2) Low-Side Signal Generating Unit 66

Figure 12:
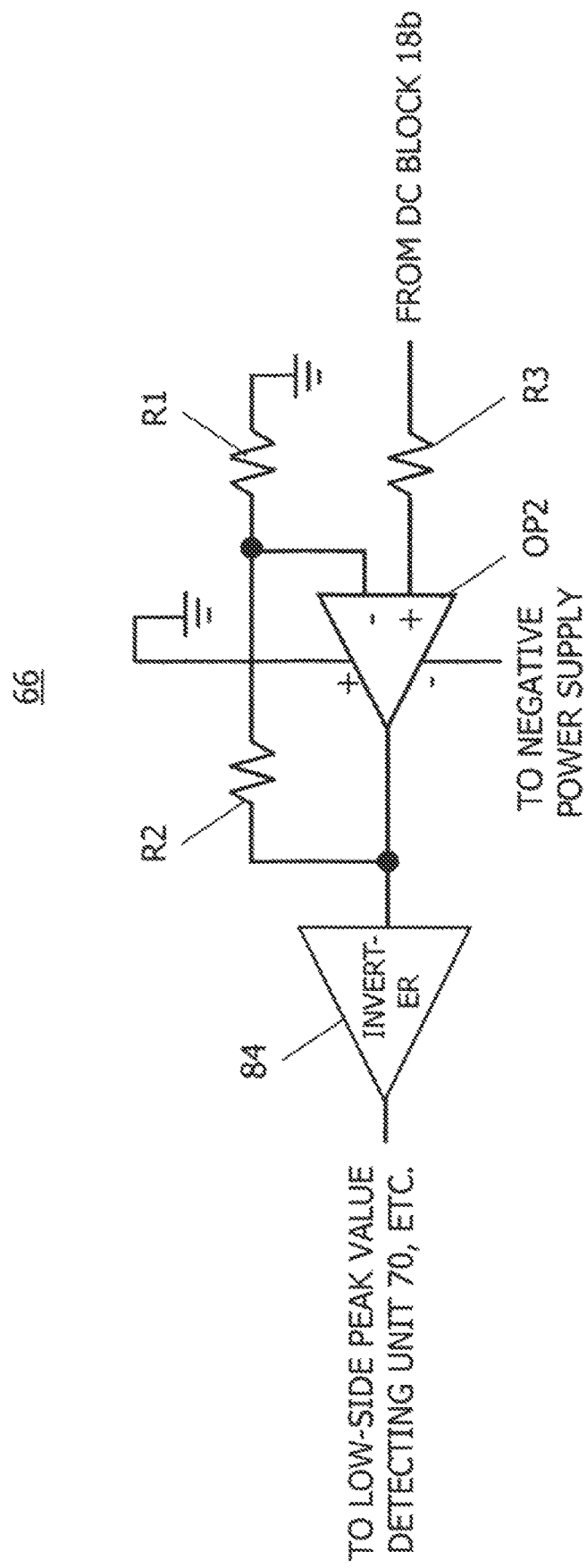
FIG. 12 is a circuit diagram illustrating an example of a hardware configuration of the low-side signal generating unit 66.

FIG. 12 is a circuit diagram illustrating an example of a hardware configuration of the low-side signal generating unit 66. The low-side signal generating unit 66 is similar to the high-side signal generating unit 64. Accordingly, portions that are substantially the same as those in the high-side signal generating unit 64 are denoted by the same signs, and description will be omitted or simplified.

The low-side signal generating unit 66 has, for example, an op amp OP2, and a resistor R1 connected between an inverting input terminal of the op amp OP2 and the reference potential. The low-side signal generating unit 66 further has a resistor R2 connected between the inverting input terminal of the op amp OP2 and an output terminal thereof, and a resistor R3 connected between a non-inverting input terminal of the op amp OP2 and the DC block 18*b*. The low-side signal generating unit 66 further has an inverting circuit 84 (i.e., an inverter) of which the input terminal is connected to the output terminal of the op amp OP2, and of which the output terminal is connected to the low-side peak value detecting unit 70 and the low-side average value detecting unit 74.

Figure 13:
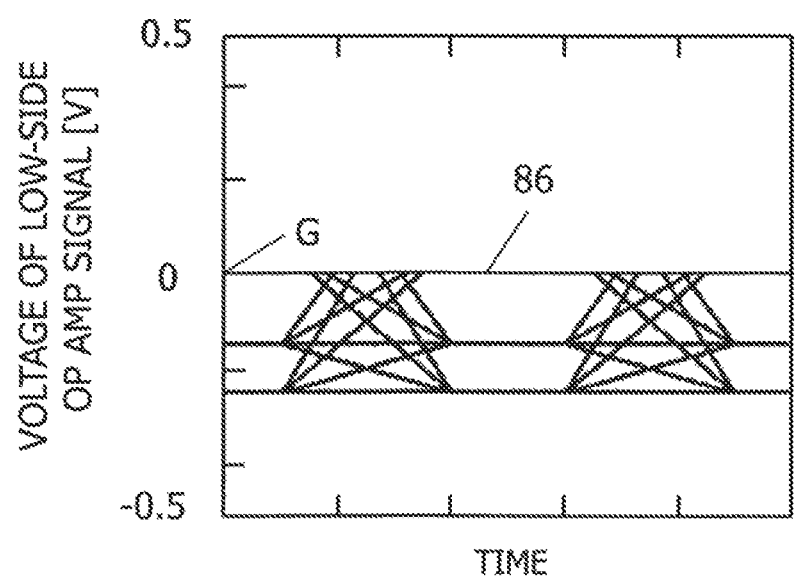
FIG. 13 is a diagram illustrating an example of an eye pattern 86 of a signal output by the op amp OP2.

FIG. 13 is a diagram illustrating an example of an eye pattern 86 of a signal output by the op amp OP2 (hereinafter, referred to as low-side op amp signal). The horizontal axis is time. The vertical axis is voltage.

As illustrated in FIG. 12, the reference potential is connected to the positive-side power supply terminal of the op amp OP2. A negative power supply that outputs negative voltage is connected to the negative-side power supply terminal of the op amp OP2. Accordingly, when the voltage of the monitor signal 46 is positive, the op amp OP2 outputs the reference potential G.

In a case in which the polarity of the monitor signal 46 is negative, the op amp OP2 outputs a signal obtained by amplifying the monitor signal 46 input to the non-inverting input terminal. The amplification factor of the monitor signal 46 is the amplification factor A described in "(1-1) High-Side Signal Generating Unit 64". In the example illustrated here, the amplification factor A is approximately 1. The amplification factor of the low-side op amp signal and the amplification factor of the high-side op amp signal are the same amplification factor.

The inverting circuit 84 inverts the low-side op amp signal (i.e., the output of the op amp OP2). The low-side signal generating unit 66 outputs the inverted low-side op amp signal. The output of the low-side signal generating unit 66 (see FIG. 2) will be referred to as low-side signal 90 hereinafter.

Figure 14:
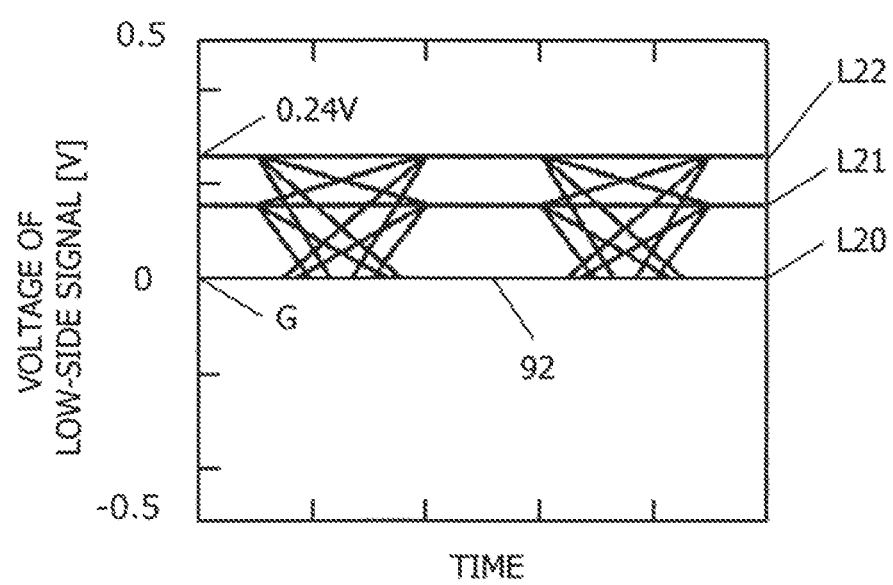
FIG. 14 is a diagram illustrating an example of an eye pattern 92 of the low-side signal 90 that the low-side signal generating unit 66 outputs.

FIG. 14 is a diagram illustrating an example of an eye pattern 92 of the low-side signal 90 (see FIG. 2) that the low-side signal generating unit 66 outputs (or generates). As illustrated in FIG. 14, the eye pattern 92 of the low-side signal 90 is, in the example illustrated here, a pattern obtained by inverting the polarity of the eye pattern 86 of the low-side op amp signal (see FIG. 13).

When the polarity of the monitor signal 46 is negative or the magnitude of the monitor signal level is zero (e.g., 0 V), the low-side signal 90 takes a level L22, L21, L20 (see FIG. 14) in accordance with the level of the monitor signal, as exemplified with reference to FIGS. 12 through 14. In the example described with reference to FIGS. 12 through 14, the "level in accordance with the level of the monitor signal 46" is a level obtained by amplifying the level of the monitor signal 46 by the amplification factor A and further inverting the level.

When the polarity of the monitor signal 46 is positive, the low-side signal 90 takes a dummy level (i.e., a constant level). In the example described with reference to FIGS. 12 through 14, the dummy level of the low-side signal 90 is the reference potential G. In this case, the dummy level is the lowest level L20 of the monitor signal 46.

Note that in the circuit illustrated in FIG. 12, the low-side signal generating unit 66 has the inverting circuit 84. However, the low-side signal generating unit 66 does not have to have the inverting circuit 84.

(1-3) High-Side Peak Value Detecting Unit 68

Figure 15:
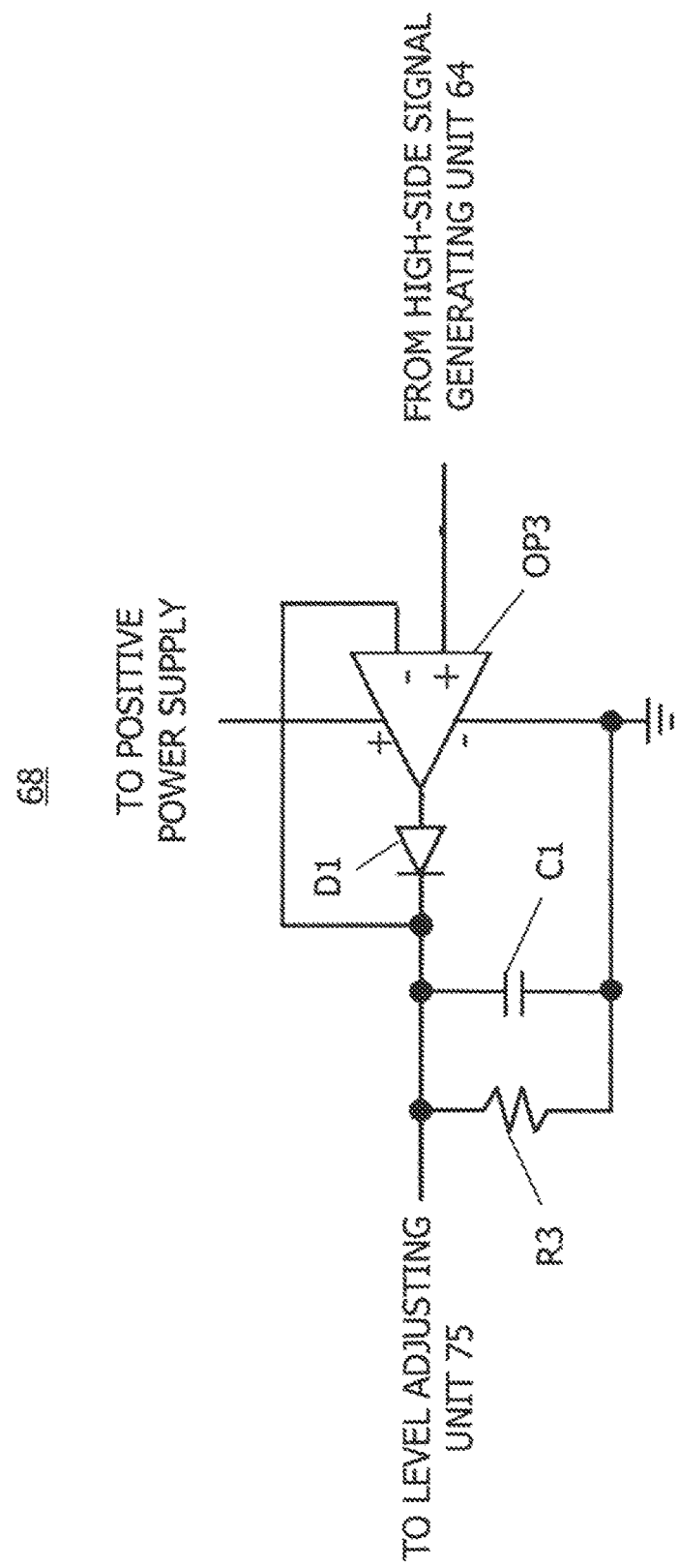
FIG. 15 is a circuit diagram illustrating an example of a hardware configuration of the high-side peak value detecting unit 68.

FIG. 15 is a circuit diagram illustrating an example of a hardware configuration of the high-side peak value detecting unit 68. The high-side peak value detecting unit 68 has, for example, an op amp OP3 of which the non-inverting input terminal is connected to the high-side signal generating unit 64, and a diode D1 connected between an inverting input terminal of the op amp OP3 and an output terminal thereof. The diode D1 is connected so as to allow current that flows from the output terminal of the op amp OP3 toward the diode D1 to pass therethrough, and to stop the flow of current from the diode D1 toward the output terminal of the op amp OP3.

The high-side peak value detecting unit 68 further has a capacitor C1 connected between an end of the diode D1 on the opposite side from the op amp OP3, and the reference potential. The high-side peak value detecting unit 68 further has the resistor R3 connected in parallel with the capacitor C1. A positive power supply that outputs positive voltage is connected to the positive-side power supply terminal of the op amp OP3, as illustrated in FIG. 15. Also, the reference potential is connected to the negative-side power supply terminal of the op amp OP3.

The high-side signal 76 from the high-side signal generating unit 64 (see FIG. 2) is input to the non-inverting input terminal of the op amp OP3. In a case in which the voltage of the high-side signal 76 is higher than the voltage of the capacitor C1, the op amp OP3 charges the capacitor C1. Conversely, when the voltage of the high-side signal 76 is lower than the voltage of the capacitor C1, the diode D1 is inversely biased, and current does not flow from the capacitor C1 to the op amp OP3.

The charge that is charged in the capacitor C1 by the current from the op amp OP3 is gradually discharged via the resistor R3. The high-side peak value detecting unit 68 is a so-called peak detector. In the example illustrated in FIG. 15, the high-side peak value detecting unit 68 outputs the voltage of the capacitor C1 without change. However, the high-side peak value detecting unit 68 may amplify the voltage across both ends of the capacitor C1 by a factor other than 0, and thereafter output.

A signal 96 that the high-side peak value detecting unit 68 generates (hereinafter referred to as high-side peak value signal) takes (or assumes) a level in accordance with a certain level (hereinafter referred to as a first certain level) out of levels that the high-side signal 76 takes (e.g., levels L10 through L12 in FIG. 11). The first certain level is a level (e.g., level L12 in FIG. 11) with a greatest value (|L12| here) of the absolute values (e.g., |L10|, |L11|, |L12|) for levels that the high-side signal 76 takes (e.g., levels L10 through L12 in FIG. 11). The level of the high-side peak value signal 96 will be referred to as fourth level hereinafter. The absolute value of the fourth level of the high-side peak value signal 96 is the same as the absolute value of the level L12 (e.g., 0.32 V) of the high-side signal 76, for example (see FIG. 11).

(1-4) Low-Side Peak Value Detecting Unit 70

The hardware configuration of the low-side peak value detecting unit 70 is substantially the same as, for example, the hardware configuration of the high-side peak value detecting unit 68 described with reference to FIG. 15. Accordingly, description of the hardware configuration of the low-side peak value detecting unit 70 will be omitted.

Note however, that the low-side signal generating unit 66 will be connected to the non-inverting input terminal of the op amp OP3.

A signal 98 that the low-side peak value detecting unit 70 generates (hereinafter referred to as low-side peak value signal) takes a level in accordance with a certain level (hereinafter referred to as a second certain level) out of levels that the low-side signal 90 takes (e.g., levels L20 through L22 in FIG. 14). The second certain level is a level (e.g., level L22 in FIG. 14) with the greatest value (|L22| here) of absolute values (e.g., |L20|, |L21|, |L22|) for levels that the low-side signal 90 takes (e.g., levels L20 through L22 in FIG. 14). The level of the low-side peak value signal 98 will be referred to as fifth level hereinafter. The absolute value of the fifth level of the low-side peak value signal 98 is the same as the absolute value of the level L22 (e.g., 0.24 V) of the low-side signal 90, for example (see FIG. 14).

The low-side peak value detecting unit 70 may amplify the voltage across both ends of the capacitor C1 (hereinafter referred to capacitor voltage) and output, in the same way as with the high-side peak value detecting unit 68. Note however, that the amplification factor of the capacitor voltage is to be the same amplification factor as that of the capacitor voltage of the high-side peak value detecting unit 68.

(1-5) High-Side Average Value Detecting Unit 72

Figure 16:
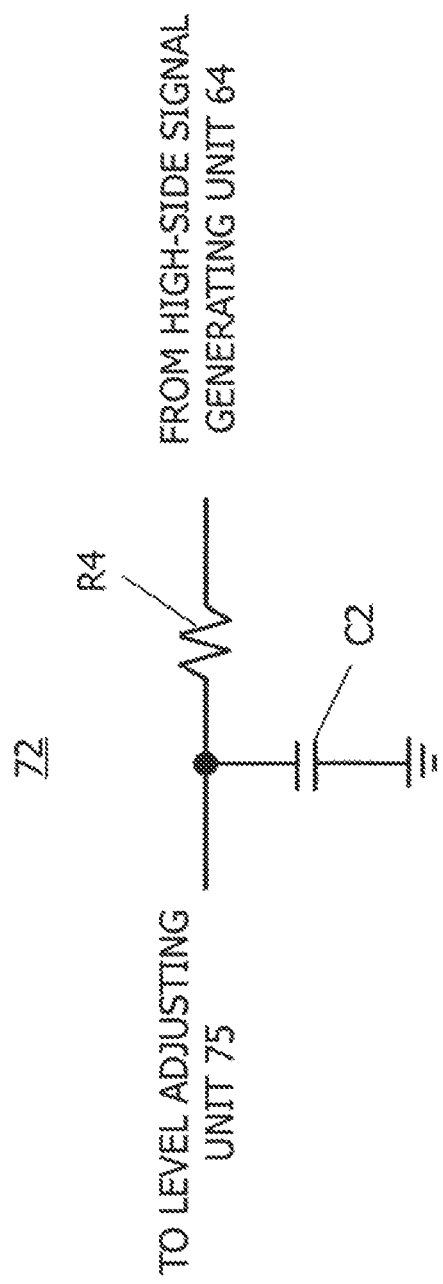
FIG. 16 is a circuit diagram illustrating an example of a hardware configuration of the high-side average value detecting unit 72.

FIG. 16 is a circuit diagram illustrating an example of a hardware configuration of the high-side average value detecting unit 72. The high-side average value detecting unit 72 has, for example, a resistor R4 of which one end is connected to the high-side signal generating unit 64 and the other end is connected to the level adjusting unit 75. The high-side average value detecting unit 72 further has a capacitor C2 of which one end is connected to the reference potential, and the other end is connected to one end of the resistor R4 on the level adjusting unit 75 side. The high-side average value detecting unit 72 illustrated in FIG. 16 is an RC circuit that averages input voltage. The time constant of this RC circuit is set sufficiently long so that the voltage across both ends of the capacitor C2 are approximately proportionate to the average value of voltage of the high-side signal 76.

The high-side average value detecting unit 72 generates a high-side average signal 100 that takes a level (hereinafter, referred to as sixth level) in accordance with the average value of the levels that the high-side signal 76 takes (hereinafter, referred to as first average value). An example of "first average value of the levels that the high-side signal 76 takes" is the average value of the levels L10, L11, L12 (see FIG. 11) of the high-side signal 76.

(1-6) Low-Side Average Value Detecting Unit 74

The hardware configuration of the low-side average value detecting unit 74 is substantially the same as the hardware configuration of the high-side average value detecting unit 72. Accordingly, description of the hardware configuration of the low-side average value detecting unit 74 will be omitted. Note however, that one end of the resistor R4 on the opposite side from the level adjusting unit 75 is connected to the low-side signal generating unit 66.

The low-side average value detecting unit 74 generates a low-side average signal 102 that takes a level (hereinafter, referred to as seventh level) in accordance with the average value of the levels that the low-side signal 90 takes (hereinafter, referred to as second average value). An example of "second average value of the levels that the low-side signal 90 takes" is the average value of the levels L20, L21, L22 (see FIG. 14) of the low-side signal 90.

(1-7) Level Adjusting Unit 75

(1-7-1) Structure of Level Adjusting Unit 75

Figure 17:
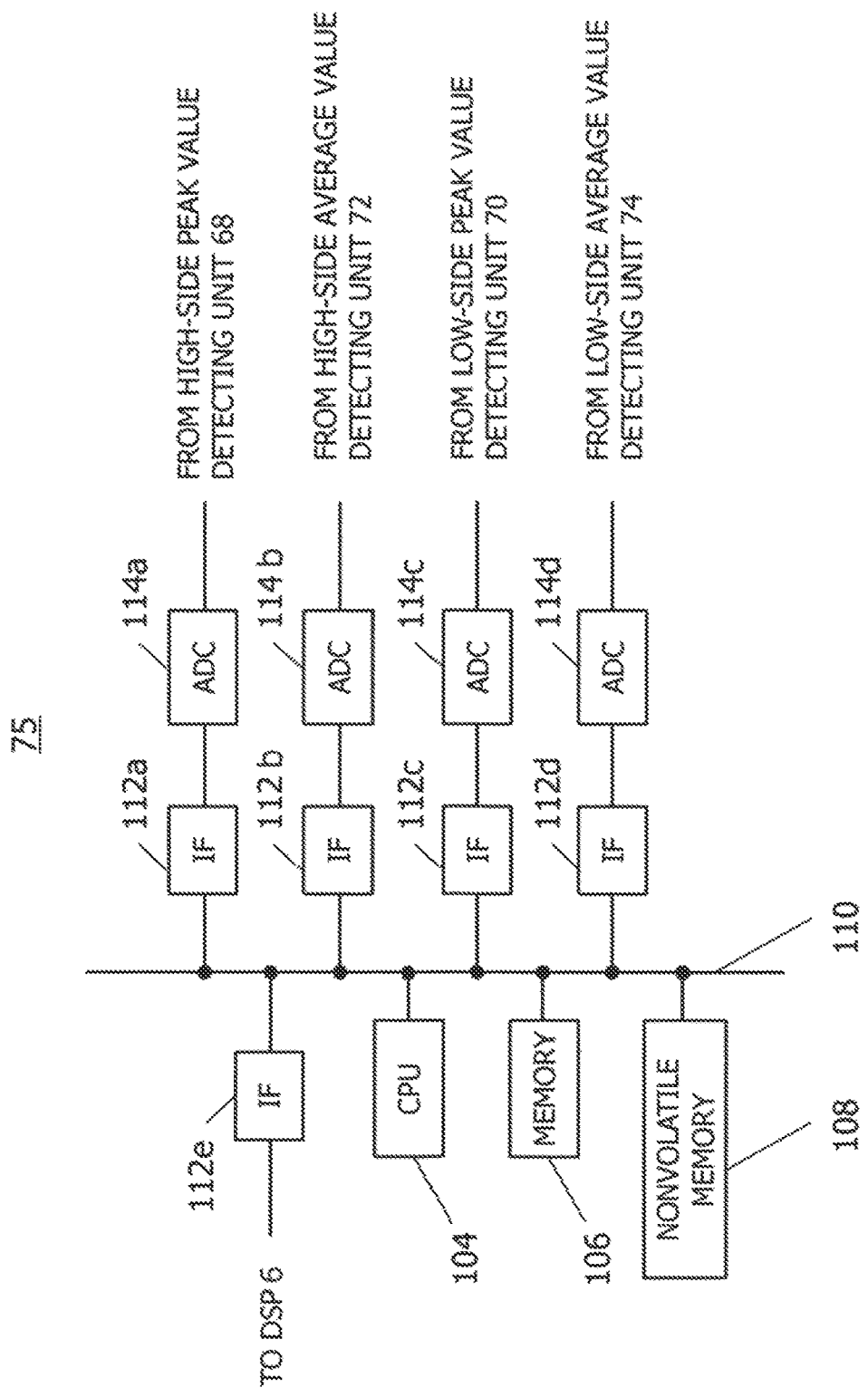
FIG. 17 is a circuit diagram illustrating an example of a hardware configuration of the level adjusting unit 75.

FIG. 17 is a circuit diagram illustrating an example of a hardware configuration of the level adjusting unit 75. The level adjusting unit 75 has, for example, a CPU (Central Processing Unit) 104, memory 106, and nonvolatile memory 108. The memory 106 is, for example, RAM (Random Access Memory). The nonvolatile memory 108 is, for example, flash memory.

The level adjusting unit 75 further has a bus 110, and an interface 112a connected to the bus 110. The level adjusting unit 75 further includes an analog-to-digital converter 114a (hereinafter referred to as ADC 114a, the same hereinafter) that is connected between the interface 112a and the high-side peak value detecting unit 68. The level adjusting unit 75 further includes an interface 112b that is connected to the bus 110, and an analog-to-digital converter 114b that is connected between the interface 112b and the high-side average value detecting unit 72. The level adjusting unit 75 further includes an interface 112c that is connected to the bus 110, and an analog-to-digital converter 114c that is connected between the interface 112c and the low-side peak value detecting unit 70. The level adjusting unit 75 further includes an interface 112d that is connected to the bus 110, and an analog-to-digital converter 114d that is connected between the interface 112d and the low-side average value detecting unit 74. The level adjusting unit 75 further includes an interface 112e that is connected between the DSP 6 and the bus 110.

The CPU 104 is coupled to the memory 106 via the bus 110, and is configured to execute programs recorded in the nonvolatile memory 108, for example. The hardware configuration of the level adjusting unit 75 is not limited to the circuit illustrated in FIG. 17. For example, the level adjusting unit 75 may be an FPGA (Field-Programmable Gate Array).

The level adjusting unit 75 controls the DSP 6 that converts the digital signal 10 into the multivalued signal 12 (quaternary signal here). The level adjusting unit 75 further controls the bias controller 16.

In the following description, the modulating signal 22 is a quaternary signal, and the high-side signal generating unit 64 outputs the output signal of the op amp OP1 (see FIG. 10) without change, in the same way as with the description above. Conversely, the low-side signal generating unit 66 does not have the inverting circuit 84 (see FIG. 12) unlike the description above, and outputs the output signal of the op amp OP2 without change.

(1-7-2) Operations of Level Adjusting Unit 75

Figure 18:
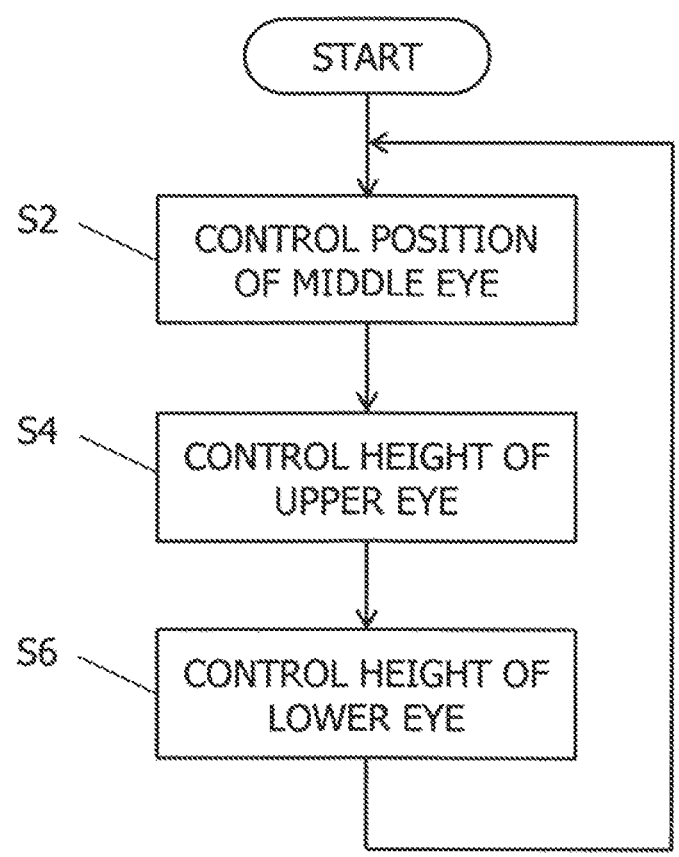
FIG. 18 is a diagram illustrating an example of a control method of modulating signals that the level adjusting unit 75 executes.

FIG. 18 is a diagram illustrating an example of a control method of modulating signals that the level adjusting unit 75 executes.

The level adjusting unit 75 first adjusts the levels of the multivalued signal 12 that the DSP 6 generates, thereby controlling the position of the middle eye ME2 of the monitor signal 46 (see FIG. 9B) (step S2). The level adjusting unit 75 further adjusts the level of the multivalued signal 12 that the DSP 6 generates, thereby controlling the height (i.e., level interval) of an upper eye UE2 of the monitor signal 46 (step S4). The level adjusting unit 75 further adjusts the level of the multivalued signal 12 that the DSP 6 generates, thereby controlling the height of a lower eye LE2 of the monitor signal 46 (step S6). After step S6, the level adjusting unit 75 returns to step S2. The level adjusting unit 75 repeatedly executes steps S2 through S6.

In the example illustrated here, the heights of each of the middle eye ME2, the upper eye UE2, and the lower eye LE2 become approximately equal, through the repeating of steps S2 through S6. That is to say, repeating steps S2 through S6 generates modulated light 32 that has uniform level intervals, which is suitable for multivalued optical communication.

Note however, in a case in which the modulation format applied to the optical transmitter 4 stipulates non-uniform level intervals, the level adjusting unit 75 may adjust the levels of the multivalued signal 12 so that the height of the eye of the monitor signal 46 is non-uniform. Such adjustment can be realized by appropriately setting later-described first through third target values T1, T2, and T3, for example.

The lower eye is an opening region sandwiched between the lowest level (e.g., level L30 of the monitor signal 46) and the second-lowest level (e.g., level L31 of the monitor signal 46) (see FIG. 9B). The upper eye is an opening region sandwiched between the highest level (e.g., level L33 of the monitor signal 46) and the second highest level (e.g., level L32 of the monitor signal 46). The middle eye is an opening region sandwiched between the upper eye and the lower eye.

In the example illustrated in FIG. 18, step S6 is executed following step S4, but step S6 may be performed between step S2 and step S4. Steps S2 through S6 are executed by the CPU 104.

From here, steps S2 through S6 will be explained along processing that the level adjusting unit 75 performs after the bias voltage 14 set at the linear center (i.e., the center of the linear region 50) is lowered. Upon the bias voltage 14 being lowered from the linear center, the second and third-lowest levels L1 and L2 of the modulated light 32 move toward the lowest level L0 side (see right diagram in FIG. 9A). Accordingly, the second and third-lowest levels L31 and L32 of the monitor signal 46 also move toward the lowest level L30 side (see right diagram in FIG. 9B). As a result, the level intervals of the modulated light 32 and the monitor signal 46 become non-uniform (see right diagram in FIGS. 9A and 9B). In a case in which the ambient temperature around the modulator 28 changes, for example, the bias voltage 14 is updated by the bias controller 16 that has received instructions from the level adjusting unit 75.

(a) Position Control of Middle Eye

Figure 19:
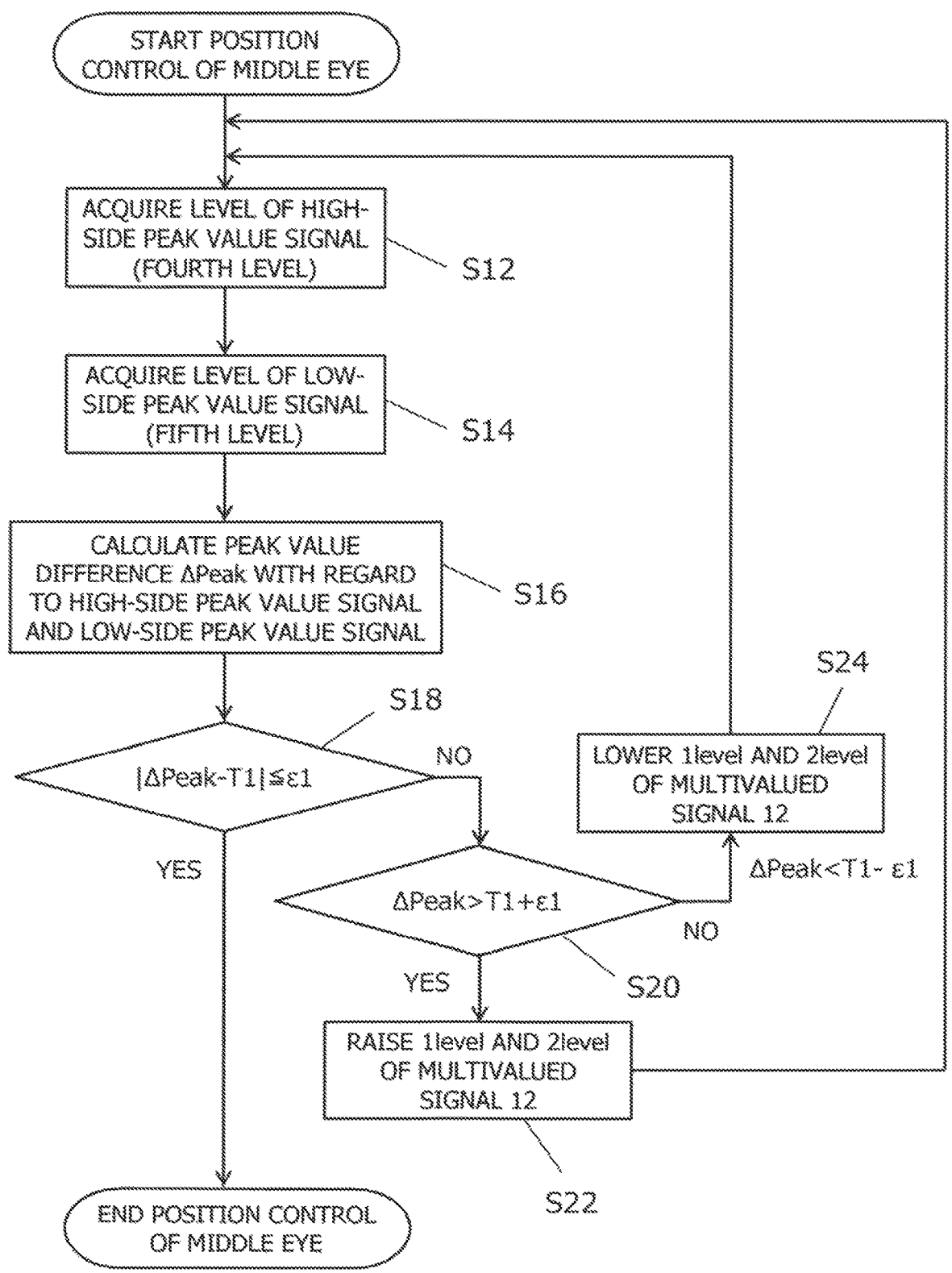
FIG. 19 is a flowchart illustrating an example of step S2.

FIG. 19 is a flowchart illustrating an example of step S2 (hereinafter referred to as position control of middle eye). According to step S2, the center of the middle eye ME2 of the monitor signal 46 (see FIG. 9B) and the center of the eye pattern E2 of the monitor signal 46 approximately match.

Step S12

The CPU 104 first acquires the level of the high-side peak value signal 96. Specifically, the ADC 114a (see FIG. 17) converts the level $L_{high}$ (i.e., fourth level) of the high-side peak value signal 96 into a digital signal, and the CPU 104 acquires the level $L_{high}$ converted into the digital signal, which is a level of the high-side peak value signal 96. This is the same for other levels that the CPU 104 acquires (e.g., the level of the low-side peak value signal 98).

Figure 20:
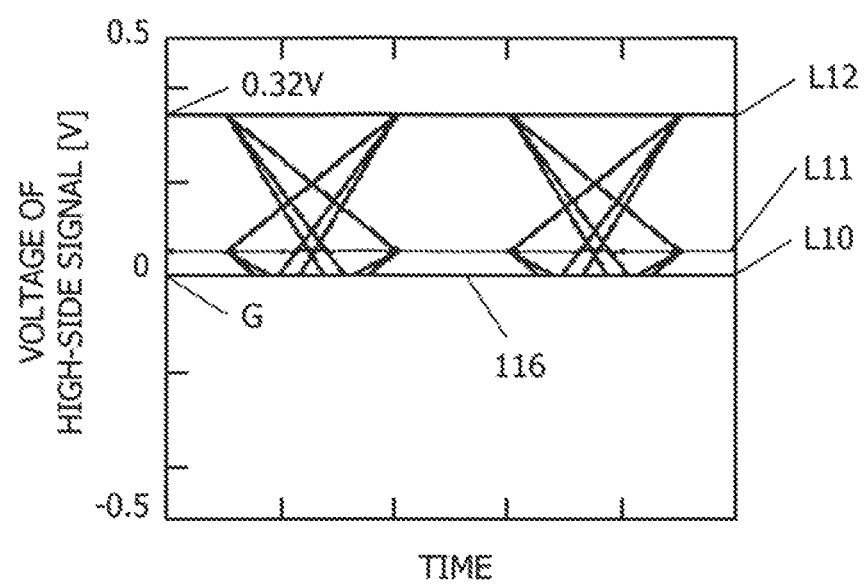
FIG. 20 is a diagram illustrating an example of an eye pattern 116 of the high-side signal 76.

FIG. 20 is a diagram illustrating an example of an eye pattern 116 of the high-side signal 76. The level $L_{high}$ of the high-side peak value signal 96 is a level in accordance with a first certain level out of the levels that the high-side signal 76 takes (i.e., levels L10 through L12 in FIG. 20), as described above. The first certain level is a level (L12 in FIG. 20) with the greatest value of absolute values for the levels that the high-signal 76 takes (i.e., levels L10 through L12 in FIG. 20). In the example illustrated here, the level $L_{high}$ that the CPU 104 acquires is the same level as the level L12 (=0.32 V) of the high-side signal 76.

Step S14

Figure 21:
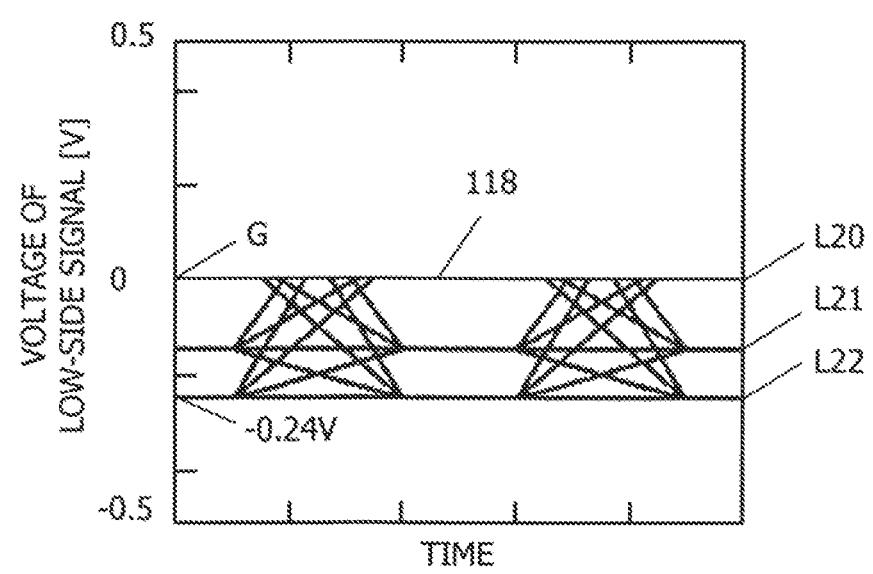
FIG. 21 is a diagram illustrating an example of an eye pattern 118 of the low-side signal 90.

Following step S12, the CPU 104 acquires the level $L_{low}$ (fifth level) of the low-side peak value signal 98. FIG. 21 is a diagram illustrating an example of an eye pattern 118 of the low-side signal 90. In the example described here, the low-side signal generating unit 66 outputs the output of the op amp OP2 (see FIG. 12) without change, and accordingly the eye pattern 118 in FIG. 21 is eye pattern 86 of the low-side op amp signal (see FIG. 13).

The level $L_{low}$ of the low-side peak value signal 98, which the CPU 104 acquires, is a level in accordance with a second certain level out of the levels that the low-side signal 90 takes (i.e., levels L20 through L22 in FIG. 21). The second certain level is a level (L22 in FIG. 21) with the greatest value of absolute values for the levels that the low-side signal 90 takes (i.e., levels L20 through L22 in FIG. 21). In the example illustrated here, the level $L_{low}$ that the CPU 104 acquires is the same level as, out of the levels that the low-side signal 90 takes, the level L22 (=−0.24 V) with the greatest absolute value.

In the example illustrated in FIG. 19, step S14 is executed after step S12, but step S14 may be executed before step S12.

Step S16

Following step S14, the CPU 104 calculates the difference (e.g., 0.8 V) between the absolute value of level $L_{high}$ of the high-side peak value signal 96 (e.g., 0.32 V) and the absolute value of level $L_{low}$ of the low-side peak value signal 98 (e.g., 0.24 V). The difference (=|$L_{high}$|−|$L_{low}$|) calculated in step S14 will hereinafter be referred to as peak value difference ΔPeak.

In the example described here, the polarity of the high-side peak value signal 96 is positive, and accordingly the absolute value |$L_{high}$| of the level $L_{high}$ of the high-side peak value signal 96 and the level $L_{high}$ of the high-side peak value signal 96 agree. Note however, that in a case in which the output of the op amp OP1 of the high-side signal generating unit 64 (see FIG. 10) is inverted by the inversion circuit, the absolute value |$L_{high}$| of the level $L_{high}$ of the high-side peak value signal 96 and the level $L_{high}$ of the high-side peak value signal 96 will be of opposite polarity.

Conversely, in the example described here, the polarity of the low-side peak value signal 98 is negative, and accordingly the absolute value |$L_{low}$| of the level $L_{low}$ of the low-side peak value signal 98 and the level $L_{low}$ of the low-side peak value signal 98 are of opposite polarity. Note however, in a case in which the low-side signal generating unit 66 has an inversion circuit (see FIG. 12), the absolute value |$L_{low}$| of the level $L_{low}$ of the low-side peak value signal 98 and the level $L_{low}$ of the low-side peak value signal 98 agree.

Step S18

Following step S16, the CPU 104 determines whether or not the absolute value of a difference (=ΔPeak−T1) between the peak value difference ΔPeak (=|$L_{high}$|−|$L_{low}$|) and a first target value T1 is no greater than α first tolerance value ε1 (step S18). Here, the peak value difference ΔPeak (=|$L_{high}$|+|$L_{low}$|) is a difference with regard to the high-side peak value signal 96 and the low-side peak value signal 98, as mentioned above. The first tolerance value ε1 is a number equal to or greater than zero.

In the example illustrated here, the first target value T1 is 0 V. In a case in which the level intervals of the monitor signal 46 are uniform, the peak value difference ΔPeak is 0 V, and accordingly in the example illustrated here, the first target value T1 is set to 0 V. Note however, that the first target value T1 may be a voltage greater than 0 V.

In a case in which the absolute value of the above difference (=ΔPeak−T1) is no greater than the first tolerance value ε1, the CPU 104 ends step S2. The first tolerance value ε1 is, for example, a value sufficiently smaller than the specific absolute value |$L_{high}$| of a specific level of the high-side peak value signal 96, the specific level being obtained when the peak value difference ΔPeak agrees with the first target value. For example, the value is |$L_{high}$|×0.1.

In a case in which the absolute value of the above difference (=ΔPeak−T1) is greater than the first tolerance value ε1, the CPU 104 advances to step S20.

Step S20

In step S20, the CPU 104 determines whether or not the peak value difference ΔPeak is greater than the sum of the first target value T1 and the first tolerance value ε1 (=T1+ε1) (step S20). The sum of the first target value T1 and the first tolerance value ε1 (=T1+ε1) will hereinafter be referred to as ΔPeak tolerance range upper limit. The difference between the first target value T1 and the first tolerance value ε1 (=T1−ε1) hereinafter be referred to as ΔPeak tolerance range lower limit.

In a case in which the peak value difference ΔPeak is greater than the ΔPeak tolerance range upper limit, the CPU 104 advances to step S22. In a case in which the peak value difference ΔPeak is no greater than the ΔPeak tolerance range upper limit (=T1+ε1), the CPU 104 advances to step S24.

When the peak value difference ΔPeak is determined in step S20 to be no greater than the ΔPeak tolerance range upper limit (=T1+ε1), the peak value difference ΔPeak is smaller than the ΔPeak tolerance range lower limit (=T1−ε1) because Step S20 is performed following step S18. The reason is as follows. In a case in which |ΔPeak−T1| is judged to be greater than the first tolerance value ε1 in step S18, the peak value difference ΔPeak is either greater than the ΔPeak tolerance range upper limit (=T1+ε1) or smaller than the ΔPeak tolerance range lower limit (=T1−ε1).

Step S22

In step S22, the CPU 104 controls the DSP 6 to raise the second-lowest level (hereinafter referred to as 1level) of the multivalued signal 12 and the third-lowest level (hereinafter referred to as 2level) of the multivalued signal 12. At this time, the level difference between 1level and 2level (=2level−1level) is maintained constant.

Note that in the following description, the lowest level of the multivalued signal 12 is referred to as 0level. The highest level of the multivalued signal 12 is referred to as 3level. The relation in magnitude of the levels of the multivalued signal 12 in inequalities is 0level<1level<2level<3level. Following step S22, the CPU 104 returns to step S12.

The CPU 104 repeats steps S12 through S22 until the absolute value of the difference between the peak value difference ΔPeak and the first target value T1 (=|ΔPeak−T1|) is no greater than the first tolerance value ε1. Note however, that in a case in which the peak value difference ΔPeak becomes smaller than the ΔPeak tolerance range lower limit, a later-described step S24 is executed.

FIGS. 22A, 22B, 23A, and 23B are diagrams illustrating an example of eye patterns of the modulating signal 22 and so forth, before and after position control of the middle eye is performed. FIGS. 22A, 22B, 23A, and 23B illustrate change that occurs in eye patterns of the modulating signal 22 and so forth after determination is made that the absolute value |$L_{high}$| of the level of the high-side peak value signal 96 exceeds the absolute value |$L_{low}$| of the level of the low-side peak value signal 98 (more precisely, |$L_{low}$|+T1+ε1). This determination is made in steps S18 through S20.

Figure 22A:
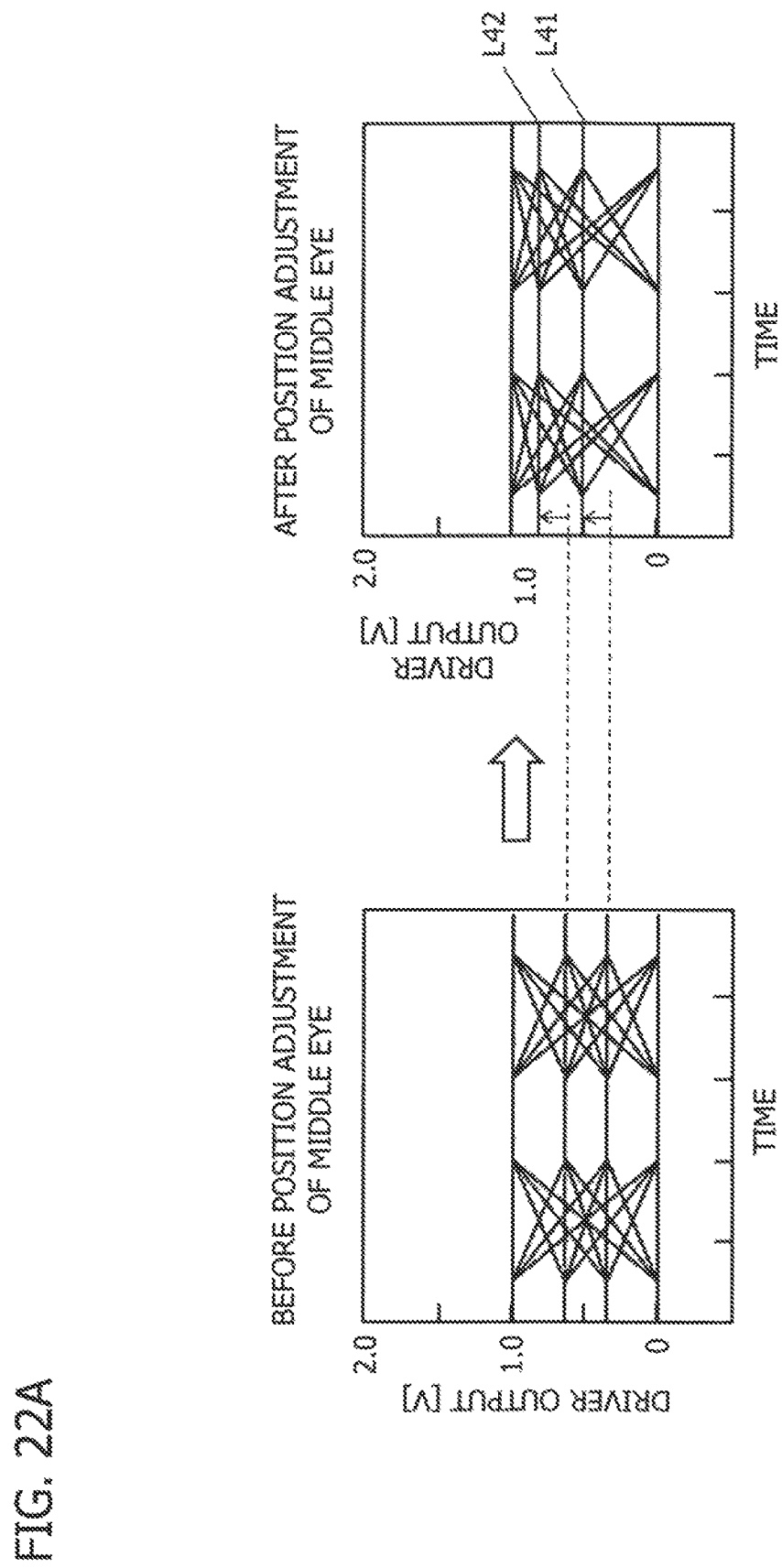
FIG. 22A is a diagram illustrating eye patterns of the driver output 20, before and after position control of the middle eye is performed.
Figure 22B:
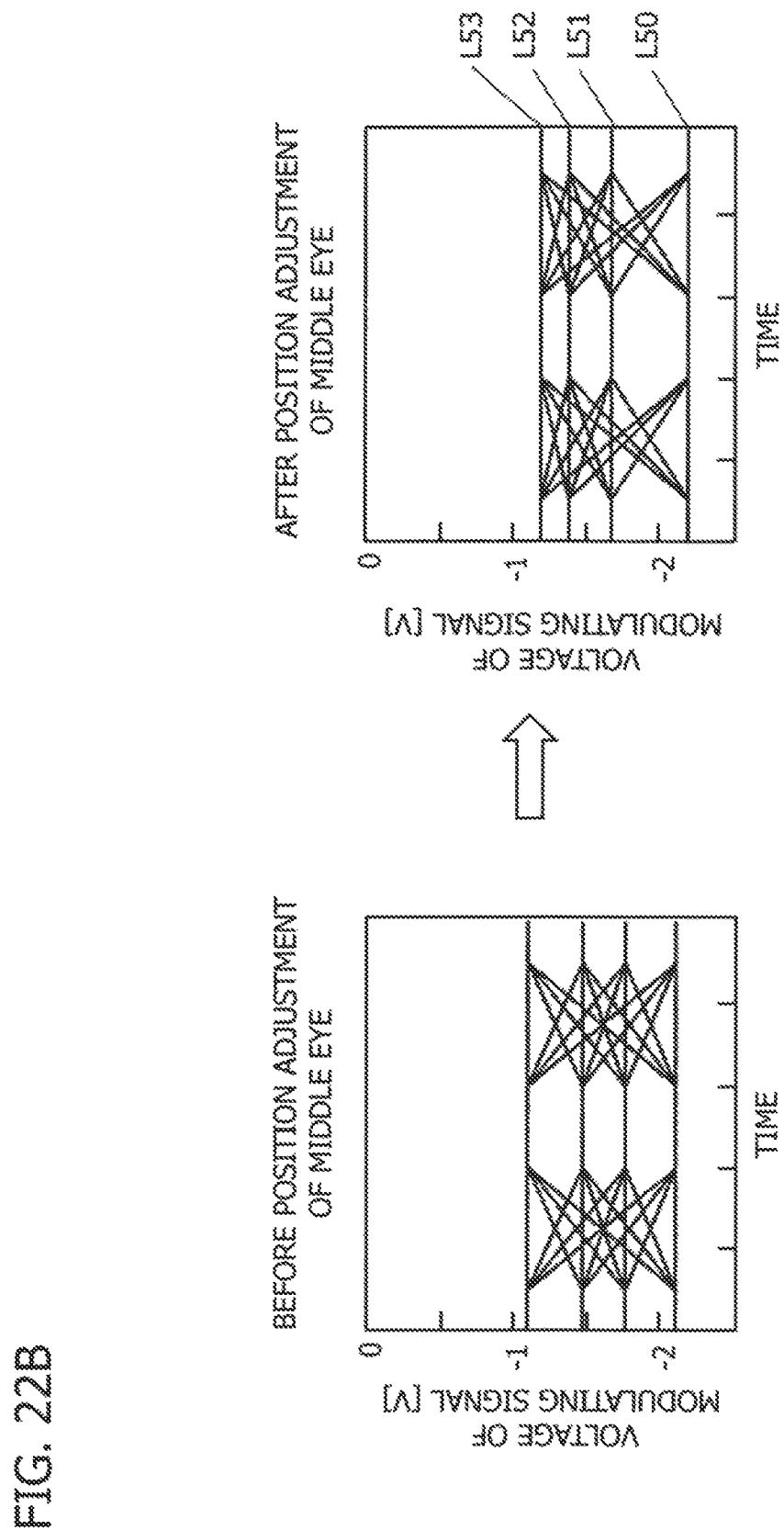
FIG. 22B is a diagram illustrating eye patterns of the modulating signal 22, before and after position control of the middle eye is performed.
Figure 23A:
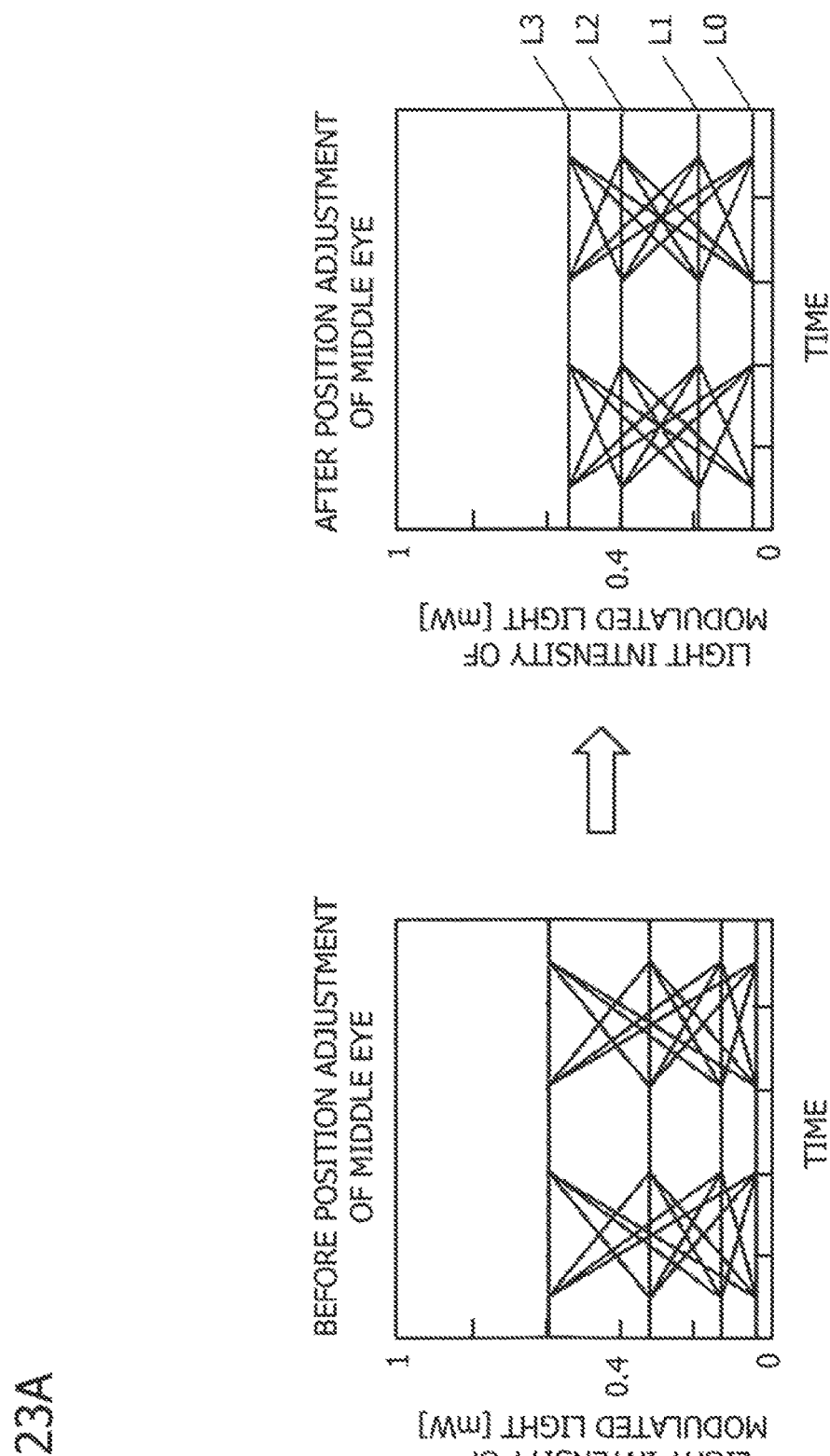
FIG. 23A is a diagram illustrating eye patterns of the modulated light 32, before and after position control of the middle eye is performed.
Figure 23B:
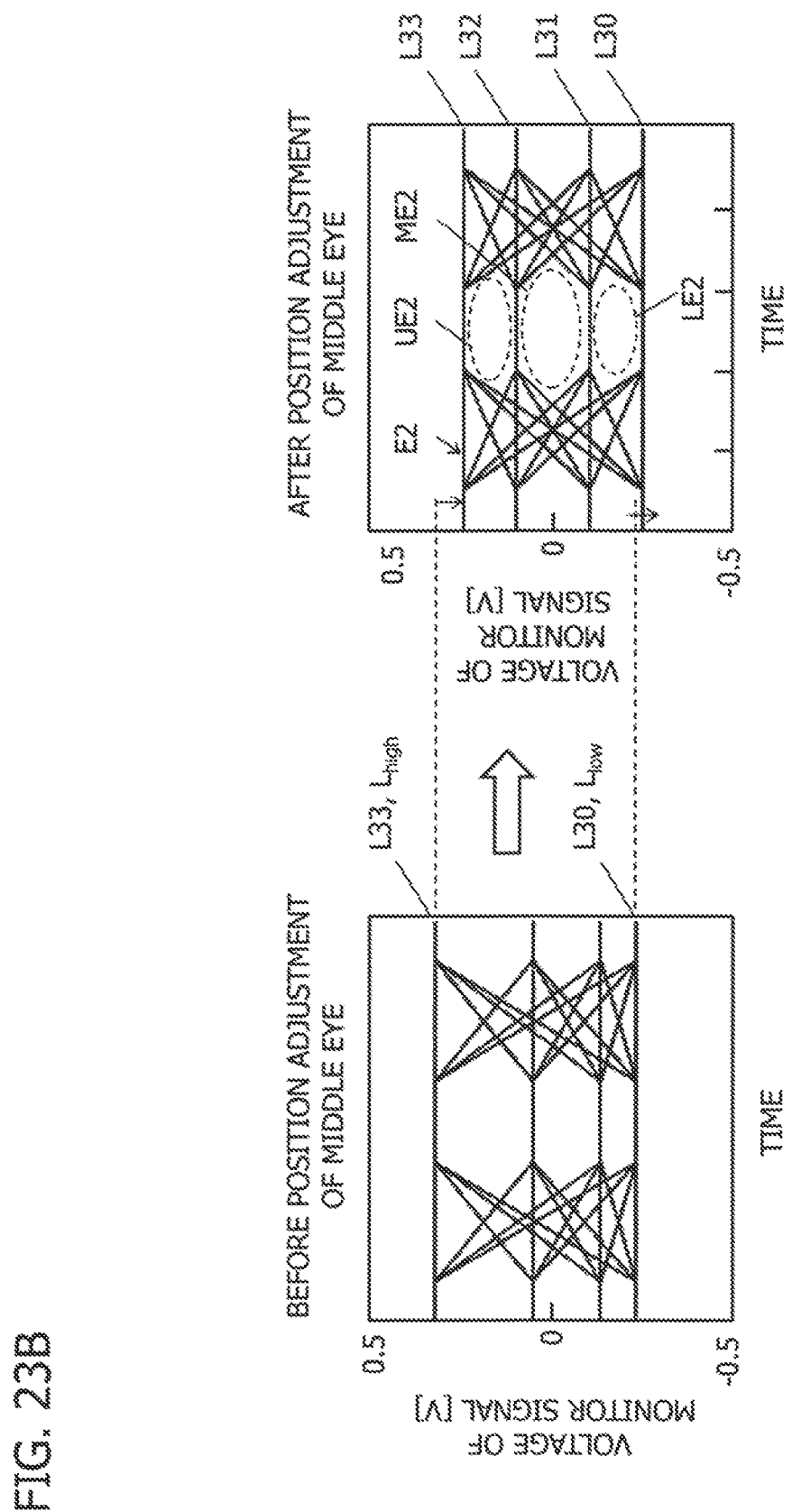
FIG. 23B is a diagram illustrating eye patterns of monitor signal 46, before and after position control of the middle eye is performed.

That is to say, FIGS. 22A, 22B, 23A, and 23B illustrate change that occurs in eye patterns of the modulating signal 22 and so forth after determination is made that $|L_{high}|>|L_{low}|$ (see FIG. 23B). The first target value T1 here is 0 V, as described above. The same is applied to the first tolerance value ε1.

FIG. 22A illustrates an eye pattern of the driver output 20. The pattern to the left side is an eye pattern immediately following the bias voltage 14 being lowered from the linear center (the same for FIGS. 22B, 23A, and 23B). At this point in time, the position control of the middle eye has not started yet. The pattern to the right side is the eye pattern at the point in time of the position control of the middle eye having ended (the same for FIGS. 22B, 23A, and 23B). The eye pattern of the modulating signal 22 is illustrated in FIG. 22B. The eye pattern of the modulated light 32 is illustrated in FIG. 23A. The eye pattern of the monitor signal 46 is illustrated in FIG. 23B.

When the bias voltage 14 is lowered from the linear center, the absolute value $|L_{high}|$ (=|L33|) of the level of the high-side peak value signal 96 becomes greater than the absolute value $|L_{low}|$ (=|L30|) of the level of the low-side peak value signal 98, as obvious from FIG. 9B. Determination is then made in steps S18 through S20 that the absolute value $|L_{high}|$ of the level of the high-side peak value signal 96 exceeds the absolute value $|L_{low}|$ of the level of the low-side peak value signal 98 (more precisely, $|L_{low}|$+T1+ε1). As a result, the level adjusting unit 75 advances to step S22, and steps S12 through S22 are repeated.

When the second-lowest level (1level) and the third-lowest level (2level) of the multivalued signal 12 rise due to steps S12 through S22, a second-lowest level L41 and a third-lowest level L42 of the driver output 20 also rise (see right diagram in FIG. 22A). Accordingly, second and third-lowest levels L51 and L52 of the modulating signal 22 approach a highest level L53 (see right diagram in FIG. 22B).

When the level of the modulating signal 22 changes as described above, the second and third-lowest levels L1 and L2 of the modulated light 32 also approach the highest level L3 (see FIG. 23A). As a result, the second-lowest level L31 and the third-lowest level L32 of the monitor signal 46 also approach the highest level L33 (see FIG. 23B).

The monitor signal 46 is the alternating current component of the electric signal 44, and accordingly the average voltage is consistently 0 V. Accordingly, when the second and third-lowest levels L31, L32 of the monitor signal 46 approach the highest level L33, the highest level L33 (>0 V) of the monitor signal 46 and the lowest level L30 (<0 V) fall due to counteraction thereof. Accordingly, the absolute value of the highest level L33 decreases, and the absolute value of the lowest level L30 increases. As a result, the value of the determination expression |ΔPeak−T1| in step S18 decreases.

The diagram to the right in FIG. 23B illustrates a state in which steps S12 through S24 have been repeated, and the absolute value of the difference (=ΔPeak−T1) between the peak value difference ΔPeak and the first target value T1 is no greater than the first tolerance value ε1. In this state, the center of the middle eye ME2 of the monitor signal 46 and the center of the eye pattern E2 of the monitor signal 46 approximately match. Further, the height of the upper eye UE2 and the height of the lower eye LE2 are approximately equal.

Step S24

Step S24 is performed in a case in which the bias voltage 14 is raised from the linear center, and the absolute value $|L_{high}|$ of the level of the high-side peak value signal 96 becomes smaller than the absolute value $|L_{low}|$ of the level of the low-side peak value signal 98 (more precisely, $|L_{low}|$+T1−ε1), for example. The first target value T1 and the first tolerance value is 0 V here, as described above.

In step S24, the CPU 104 controls the DSP 6 and lowers the second and third-lowest levels of the multivalued signal 12 (i.e., 1level and 2level). At this time, the level difference (=2level−1level) between the second and third-lowest levels is maintained constant, in the same way as in step S22.

When the second and third-lowest levels 1level and 2level of the multivalued signal 12 fall, the second and third-lowest levels L31, L32 of the monitor signal 46 approach the lowest level L30. Thereupon, the absolute (=$|L_{high}|$) value of the highest level L33 (>0 V) of the monitor signal 46 increases. Conversely, the absolute value (=$|L_{low}|$) of the lowest level L30 (<0 V) of the monitor signal 46 decreases. As a result, the peak value difference ΔPeak (<0) approaches 0 V, and "the absolute value of the difference (=ΔPeak−T1) between the peak value difference ΔPeak and the first target value T1" determined in step S18 becomes small. Here, the peak value difference ΔPeak (=$|L_{high}|$−$|L_{low}|$) is a difference with regard to the high-side peak value signal 96 and the low-side peak value signal 98, as mentioned above.

As steps S12 through S20 and S24 are repeated, eventually the absolute value of the difference (=ΔPeak−T1) between the peak value difference ΔPeak and the first target value T1 (0 V here) is no greater than the first tolerance value ε1. At this time as well, the center of the middle eye ME2 of the monitor signal 46 and the center of the eye pattern E2 thereof approximately match, and the height of the upper eye UE2 and the height of the lower eye LE2 are approximately equal.

As described above, the level adjusting unit 75 adjusts the second-lowest level and the third-lowest level of the multivalued signal 12, on the basis of the fourth level that the high-side peak value signal 96 takes and the fifth level that the low-side peak value signal 98 takes (see steps S22 and S24). The level-adjusted multivalued signal 12 is amplified by the driver 8, and thereafter is superimposed on the bias voltage 14 via the DC block 18a to become the modulating signal 22.

That is to say, the level adjusting unit 75 indirectly adjust the second and third-lowest levels L51 and L52 of the modulating signal 22, on the basis of the fourth level $L_{high}$ that the high-side peak value signal 96 takes and the fifth level $L_{low}$ that the low-side peak value signal 98 takes. Specifically, the level adjusting unit 75 adjusts the second and third-lowest levels of the modulating signal 22 such that the peak value difference ΔPeak that is the difference between the absolute value of the fourth level of the high-side peak value signal 96 and the absolute value of the fifth level of the low-side peak value signal 98 approaches the first target value T1.

Relation Between Position of Middle Eye ME2 and Peak Value Difference ΔPeak

Figure 24A:
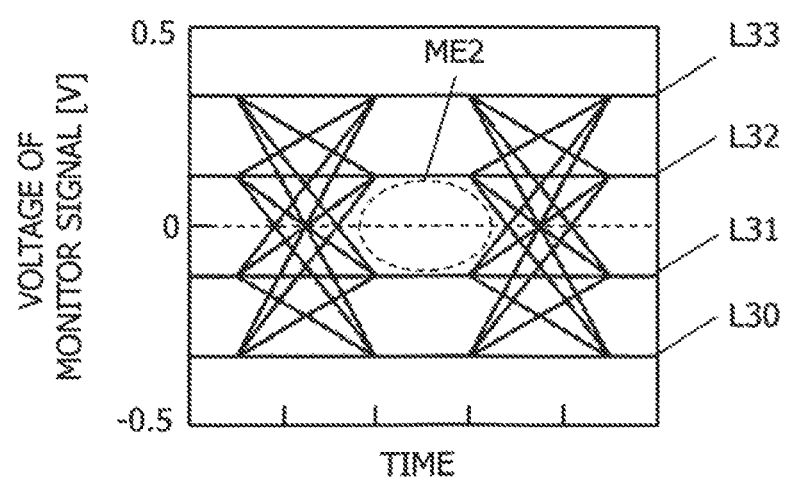
FIGS. 24A, 24B and 24C are diagrams illustrating the relation between the position of the middle eye ME2 in the monitor signal 46 and the peak value difference ΔPeak.
Figure 24B:
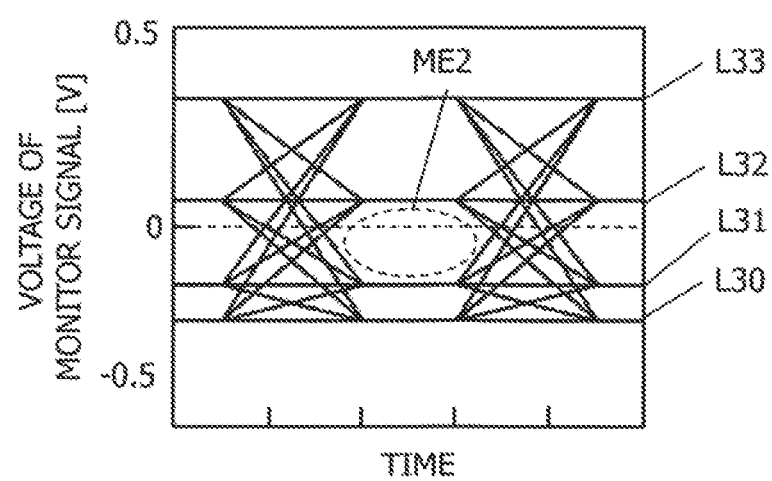
Figure 24C:
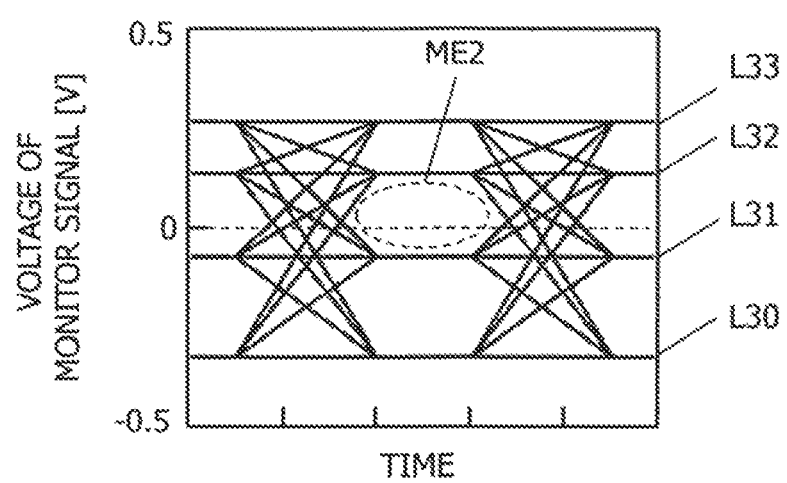

FIGS. 24A through 24C are diagrams illustrating the relation between the position of the middle eye ME2 in the monitor signal 46 and the peak value difference ΔPeak.

FIG. 24A illustrates an eye pattern of the monitor signal 46 in a case in which the level intervals are uniform. In this case, the absolute value of the highest level L33 of the monitor signal 46 and the absolute value of the lowest level L30 are equal, as illustrated in FIG. 24A. Accordingly, the peak value difference ΔPeak is zero.

FIG. 24B illustrates an eye pattern of the monitor signal 46 in a case in which the second-lowest level L31 and the third-lowest level L32 are biased toward the lowest level L30 side. In this case, the absolute value of the highest level L33 of the monitor signal 46 becomes greater than the absolute value of the lowest level L30. Accordingly, the peak value difference ΔPeak is positive.

FIG. 24C illustrates an eye pattern of the monitor signal 46 in a case in which the second-lowest level L31 and the third-lowest level L32 are biased toward the highest level L33 side. In this case, the absolute value of the highest level L33 of the monitor signal 46 becomes smaller than the absolute value of the lowest level L30, as illustrated in FIG. 24C. Accordingly, the peak value difference ΔPeak is negative.

Using this nature, the level adjusting unit 75 makes the level intervals of the monitor signal 46 to be uniform. For making the intervals of the monitor signal 46 to be uniform, the level adjusting unit 75 adjusts the second and third-lowest levels L31, L32 of the monitor signal 46 so that the peak value difference ΔPeak becomes zero, for example. In other words, the level adjusting unit 75 makes the level intervals of the monitor signal 46 to be uniform by adjusting the position of the middle eye ME2 (the eye sandwiched between the second and third-lowest levels L31 and L32).

(b) Height Control of Upper Eye

The height (i.e., level interval) of the upper eye UE2 of the monitor signal 46 and the height of the lower eye LE2 become approximately equal (see FIG. 23B), by step S2 (i.e., position control of the middle eye). However, this does not necessarily make the height of the middle eye ME2 and the height of the upper eye UE2 to be the same. In the same way, this does not necessarily make the height of the middle eye ME2 and the height of the lower eye LE2 to be the same.

In the example illustrated in FIGS. 22A, 22B, 23A, and 23B, the upper eye UE2 following position control of the middle eye ME2 (see the right diagram in FIG. 23B) is smaller (more precisely, smaller in height) than the middle eye ME2. The same is true regarding the lower eye LE2.

Figure 25:
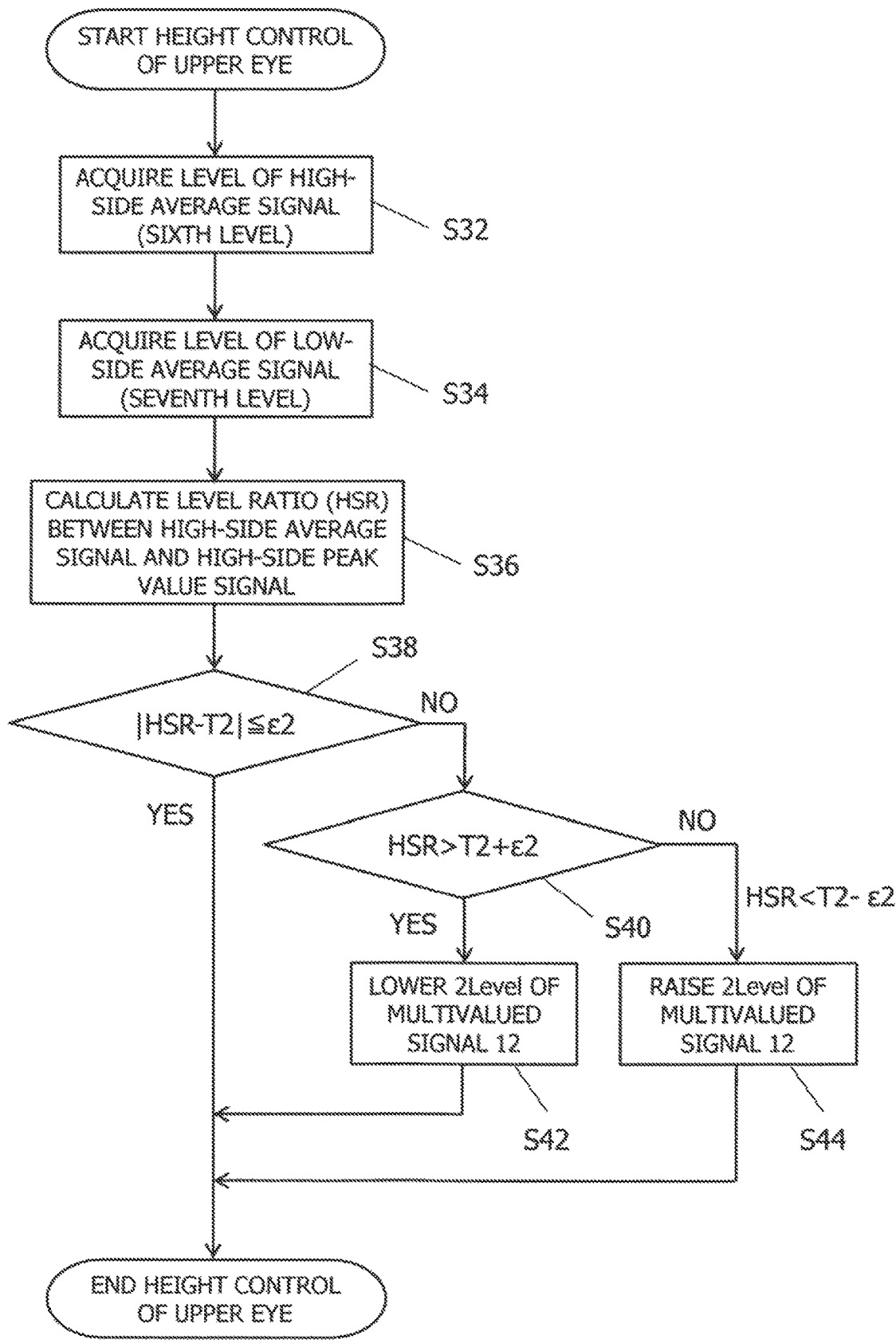
FIG. 25 is a flowchart illustrating an example of step S4.

According to step S4 (hereinafter referred to as height control of the upper eye), the height of the upper eye UE2 of the monitor signal 46 approaches the height of the middle eye ME2. FIG. 25 is a flowchart illustrating an example of step S4.

Steps S32, S34

The CPU 104 first acquires a sixth level L6 of the high-side average signal 100 (step S32). The CPU 104 further acquires a seventh level L7 of the low-side average signal 102 (step S34).

In the example illustrated in FIG. 25, step S34 is executed after step S32, but step S34 may be executed before step S32. Alternatively, step S34 may be executed within step S6 (hereinafter referred to as height control of the lower eye).

Step S36

Following step S34, the CPU 104 calculates a first ratio HSR ($=L6/L_{high}$) of the sixth level L6 acquired in step S32 and the fourth level $L_{high}$ (level of high-side peak value signal 96) acquired in step S12 (see FIG. 19). This first ratio HSR will be referred to as high-side level ratio hereinafter.

Step S38

Following step S36, the CPU 104 determines whether or not the absolute value of the difference ($=\Delta$HSR−T2) between the high-side level ratio HSR calculated in step S36 and a second target value T2 is no greater than a second tolerance value ε2 (>0 V) (step S38). In the example illustrated here, the second target value T2 is 0.33. In a case in which the heights of the eyes ME2, UE2, and LE2 of the monitor signal 46 are equal, and the frequencies of appearance of each level are equal, the high-side level ratio HSR is 0.33. Note however, that the second target value T2 may be other than 0.33.

In a case in which the absolute value of the above difference ($=\Delta$HSR−T2) is no greater than the second tolerance value ε2, the CPU 104 ends step S4 (i.e., height control of the upper eye). The second tolerance value ε2 is set to a value that is sufficiently smaller than the second target value (e.g., 0.03), for example.

In a case in which the absolute value of the above difference ($=\Delta$HSR−T2) is greater than the second tolerance value ε2, the CPU 104 advances to step S40.

Step S40

Following step S38, the CPU 104 determines whether or not the high-side level ratio HSR is greater than the sum (=T2+ε2) of the second target value T2 and the second tolerance value ε2 (step S40). The sum (=T2+ε2) of the second target value T2 and the second tolerance value ε2 will hereinafter be referred to as HSR tolerance range upper limit. The difference (=T2−ε2) between the second target value T2 and the second tolerance value ε2 will hereinafter be referred to as HSR tolerance range lower limit. In a case in which the high-side level ratio HSR is greater than the HSR tolerance range upper limit, the CPU 104 advances to step S42.

In a case in which the high-side level ratio HSR is no greater than the HSR tolerance range upper limit (=T2+ε2), the CPU 104 advances to step S44. When the high-side level ratio HSR is determined in step S40 to be no greater than the HSR tolerance range upper limit (=T2+ε2), the high-side level ratio HSR is smaller than the HSR tolerance range lower limit (=T2−ε2) because step S40 is performed following step S38. The reason is as follows. In a case of a negative judgment in the determination of step S38, the high-side level ratio HSR is either greater than the HSR tolerance range upper limit (=T2+ε2) or smaller than the tolerance range lower limit (=T2−ε2).

Step S42

In step S42, the CPU 104 controls the DSP 6 to lower the third-lowest level of the multivalued signal 12 (i.e., 2level). Following step S42, the CPU 104 ends the height control of the upper eye.

Figure 26:
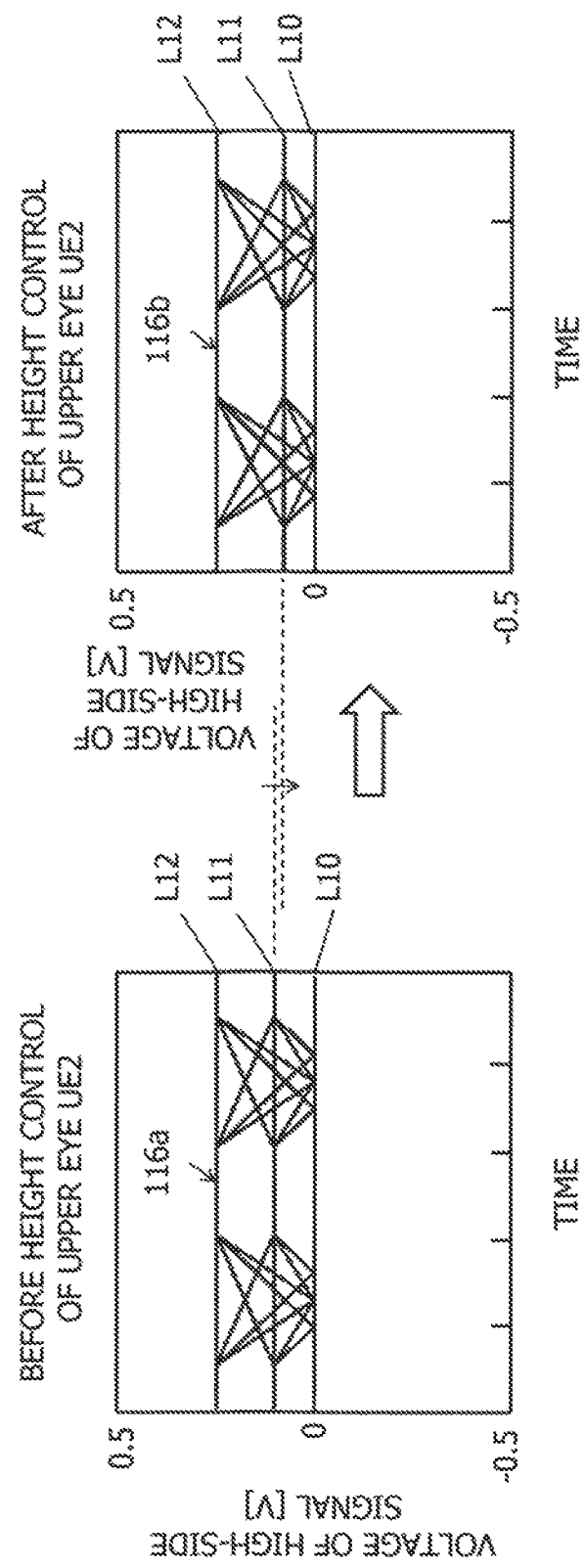
FIG. 26 is a diagram illustrating an example of the eye pattern of the high-side signal 76 before and after step S42 is carried out.

FIG. 26 is a diagram illustrating an example of the eye pattern of the high-side signal 76 before and after step S42 is carried out. The left diagram in FIG. 26 is an example of an eye pattern 116a of the high-side signal 76 before step S42 is carried out. The right diagram in FIG. 26 is an example of an eye pattern 116b of the high-side signal 76 after step S42 is carried out.

The second-lowest level L11 of the high-side signal 76 is a level that is generated in according with the third-lowest level of the multivalued signal 12 (i.e., 2Level). When step S42 is executed, the level L11 of the high-side signal 76 falls (see FIG. 26). As a result, the high-side level ratio HSR that is higher than the second target value T2 (more precisely, T2+ε2) decreases, and approaches the second target value T2. Accordingly, the height of the upper eye UE2 that is smaller than the middle eye ME2 (see right diagram in FIG. 23B) approaches the height of the middle eye ME2.

Step S44

In step S44, the CPU 104 controls the DSP 6 to raise the third-lowest level of the multivalued signal 12 (i.e., 2level). Following step S44, the CPU 104 ends the height control of the upper eye.

The second-lowest level L11 of the high-side signal 76 (see FIG. 26) rises due to step S44. As a result, the high-side level ratio HSR increases. Step S44 is performed in a case in which the high-side level ratio HSR is smaller than the second target value T2 (more precisely, T2−ε2), and accordingly, the high-side level ratio HSR that is excessively low approaches the second target value T2 by step S44 being executed.

The level adjusting unit 75 indirectly adjusts a third-lowest level L52 of the modulating signal 22 by adjusting the third-lowest level of the multivalued signal 12 (i.e., 2level) by steps S32 through S44 (see FIG. 22B). In other words, the level adjusting unit 75 adjusts the third-lowest level L52 of the modulating signal 22 on the basis of the ratio (i.e., the high-side level ratio HSR) between the sixth level that the high-side average signal 100 takes and the fourth level that the high-side peak value signal 96 takes.

Specifically, the level adjusting unit 75 adjusts the third-lowest level of the modulating signal 22 such that the high-side level ratio HSR approaches the second target value T2, for example (see steps S42 and S44). Due to this adjustment, the height of the upper eye UE2 approaches the height of the middle eye ME2.

(c) Height Control of Lower Eye

The height (level interval) of the upper eye UE2 of the monitor signal 46 approaches the height of the middle eye ME2 by step S4 (i.e., height control of the upper eye). However, the difference in height of the lower eye LE2 and the height of the middle eye ME2 is not resolved by step S4. According to step S6 (i.e., height control of the lower eye), the height of the lower eye LE2 of the monitor signal 46 approaches the height of the middle eye ME2.

Figure 27:
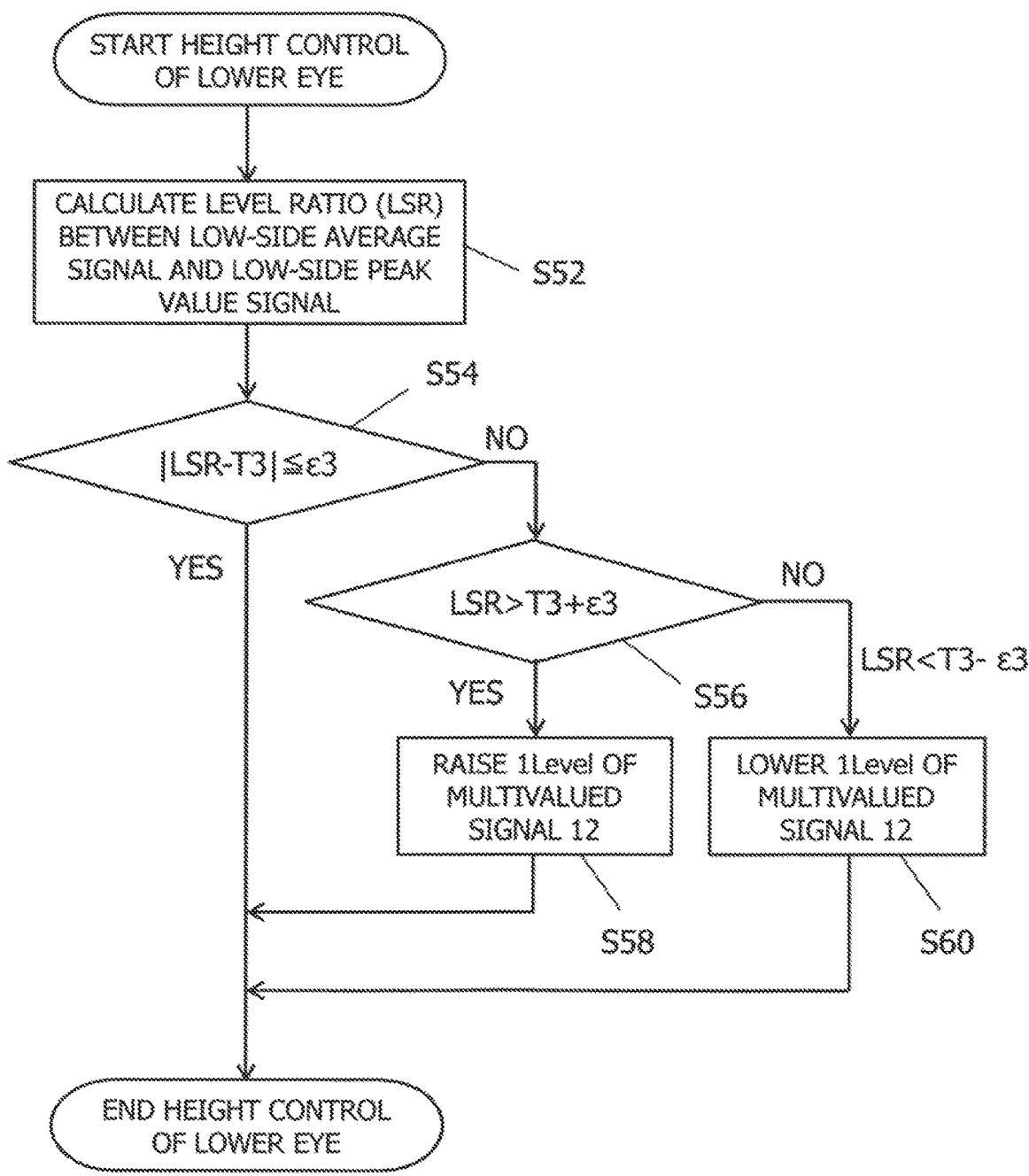
FIG. 27 is a flowchart illustrating an example of step S6.

FIG. 27 is a flowchart illustrating an example of step S6.

Step S52

The CPU 104 first calculates a second ratio LSR (=L7/$L_{low}$) of the seventh level L7 acquired in step S34 (see FIG. 25) and the fifth level $L_{low}$ (level of low-side peak value signal 98) acquired in step S14 (see FIG. 19). The seventh level L7 is the level of the low-side average signal 102. This second ratio LSR will be referred to as low-side level ratio hereinafter.

Step S54

Following step S52, the CPU 104 determines whether or not the absolute value of the difference (=ΔLSR−T3) between the low-side level ratio LSR calculated in step S52 and a third target value T3 is no greater than α third tolerance value ε3 (>0 V) (step S54). In the example illustrated here, the third target value T3 is 0.33, for example.

In a case in which the heights of the eyes ME2, UE2, and LE2 of the monitor signal 46 are equal, and the frequencies of appearance of each level are equal, the low-side level ratio LSR is 0.33, the same as with the high-side level ratio HSR. Accordingly, by setting the second target value T2 and the third target value T3 to 0.33, the level intervals of the modulated light 32 become uniform, and demodulation error can be suppressed. Note however, that the third target value T3 may be other than 0.33, in the same way as with the second target value T2.

In a case in which the absolute value of the above difference (=ΔLSR−T3) is no greater than the third tolerance value ε3, the CPU 104 ends step S6 (i.e., height control of the lower eye). The third tolerance value ε3 is set to a value that is sufficiently smaller than the third target value (e.g., 0.03), for example.

In a case in which the absolute value of the above difference (=ΔLSR−T3) is greater than the third tolerance value ε3, the CPU 104 advances to step S56.

Step S56

Following step S54, the CPU 104 determines whether or not the low-side level ratio LSR is greater than the sum (=T3+ε3) of the third target value T3 and the third tolerance value ε3 (step S56). The sum (=T3+ε3) of the third target value T3 and the third tolerance value ε3 will hereinafter be referred to as LSR tolerance range upper limit. The difference between the third target value T3 and the third tolerance value ε3 (=T3−ε3) will hereinafter be referred to as LSR tolerance range lower limit. In a case in which the low-side level ratio LSR is greater than the LSR tolerance range upper limit, the CPU 104 advances to step S58.

In a case in which the low-side level ratio LSR is no greater than the LSR tolerance range upper limit (=T3+ε3), the CPU 104 advances to step S60. When the low-side level ratio LSR is determined in step S56 to be no greater than the LSR tolerance range upper limit (=T3+ε3), the low-side level ratio LSR is smaller than the LSR tolerance range lower limit (=T3−ε3) because step S56 is performed following step S54. The reason is as follows. In a case of a negative judgment in the determination of step S54, the low-side level ratio LSR is either greater than the LSR tolerance range upper limit (=T3+ε3) or smaller than the LSR tolerance range lower limit (=T3−ε3).

Step 58

In step S58, the CPU 104 controls the DSP 6 to raise the second-lowest level of the multivalued signal 12 (i.e., 1level). Following step S58, the CPU 104 ends the height control of the lower eye.

Figure 28:
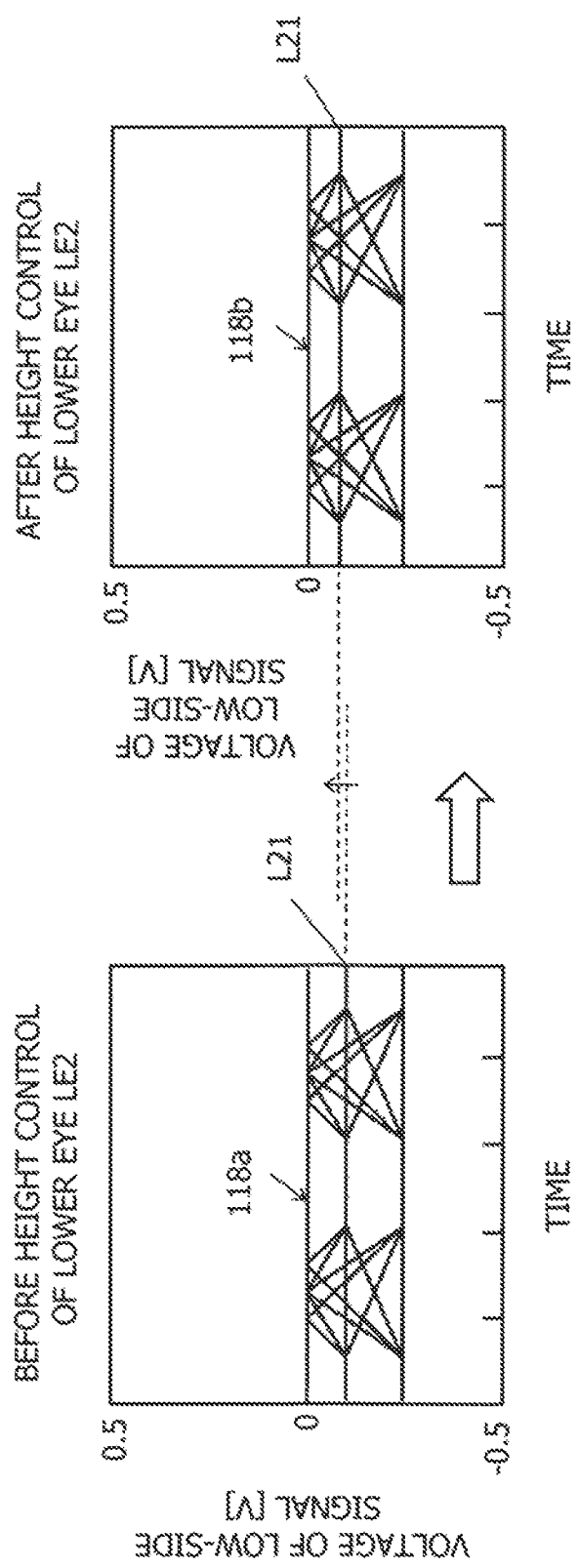
FIG. 28 is a diagram illustrating an example of the eye pattern of the low-side signal 90 before and after step S58 is carried out.

FIG. 28 is a diagram illustrating an example of the eye pattern of the low-side signal 90 before and after step S58 is carried out. The left diagram in FIG. 28 is an example of an eye pattern 118a of the low-side signal 90 before step S58 is carried out. The right diagram in FIG. 28 is a diagram illustrating an example of an eye pattern 118b of the low-side signal 90 after step S58 is carried out.

The second-lowest level L21 of the low-side signal 90 is a level that is generated in according with the second-lowest level of the multivalued signal 12 (i.e., 1Level). Accordingly, execution of step S58 causes the level L21 of the low-side signal 90 to rise (see FIG. 28). As a result, the low-side level ratio LSR that is higher than the third target value T3 (more precisely, T3+ε3) decreases, and approaches the third target value T3. Accordingly, the height of the lower eye LE2 that is smaller than the middle eye ME2 approaches the height of the middle eye ME2.

Step S60

In step S60, the CPU 104 controls the DSP 6 to lower the second-lowest level of the multivalued signal 12 (i.e., 1level). Following step S60, the CPU 104 ends the height control of the lower eye.

The second-lowest level L21 of the low-side signal 90 (see FIG. 28) falls due to step S60. As a result, the low-side level ratio LSR increases. Step S60 is performed in a case in which the low-side level ratio LSR is smaller than the third target value T3 (more precisely, T3−ε3), and accordingly, the low-side level ratio LSR that is excessively low approaches the third target value T3 by step S60 being executed.

The level adjusting unit 75 indirectly adjusts a second-lowest level L51 of the modulating signal 22 by adjusting the second-lowest level of the multivalued signal 12 (i.e., 1level) by steps S52 through S60 (see FIG. 22B). In other words, the level adjusting unit 75 adjusts the second-lowest level L51 of the modulating signal 22 on the basis of the ratio between the seventh level that the low-side average signal 102 takes and the fifth level that the low-side peak value signal 98 takes (i.e., the low-side level ratio LSR).

Specifically, the level adjusting unit 75 adjusts the second-lowest level of the modulating signal 22 such that the low-side level ratio LSR approaches the third target value T3, for example. Due to this adjustment, the height of the lower eye LE2 approaches the height of the middle eye ME2.

When steps S4 through S6 are executed, the position of the middle eye ME2 that has moved to the center of the monitor signal 46 by step S2 shifts. Accordingly, the level adjusting unit 75 returns to step S2 following step S6, and readjusts the position of the middle eye ME2, as illustrated in FIG. 18. Thereafter, the level adjusting unit 75 executes steps S4 and S6 again, and brings the respective heights of the upper eye UE2 and the lower eye LE2 closer to the target again. The level adjusting unit 75 repeatedly executes steps S2 through S6, as illustrated in FIG. 18, and accordingly the heights of the eyes (i.e., the level intervals) finally become approximately uniform.

Steps S2 through S6 may be repeated until cancelled by an external command, or may end after being repeated a preset number of times. Alternatively, steps S2 through S6 may be performed just once. If the non-linearity of the modulator 28 is small, the level intervals will become approximately uniform by executing just once.

FIGS. 29A, 29B, 30A, and 30B are diagrams illustrating an example of eye patterns of the modulating signal 22 and so forth obtained by repeating steps S2 through S6. FIG. 29A illustrates eye patterns of the driver output 20. The pattern to the left side is an eye pattern immediately after the first position control of the middle eye ending (the same for FIGS. 29B, 30A, and 30B as well). The pattern to the right side is the eye pattern at a point in time at which the level intervals of the monitor signal 46 have become approximately uniform by repeating steps S2 through S6 (the same for FIGS. 29B, 30A, and 30B as well). FIGS. 29A, 29B, 30A, and 30B illustrate a case in which the upper eye UE2 and the lower eye LE2 of the monitor signal 46 are smaller than the middle eye ME2 at the point in time of the first position control of the middle eye ending (see FIG. 30B).

Figure 30A:
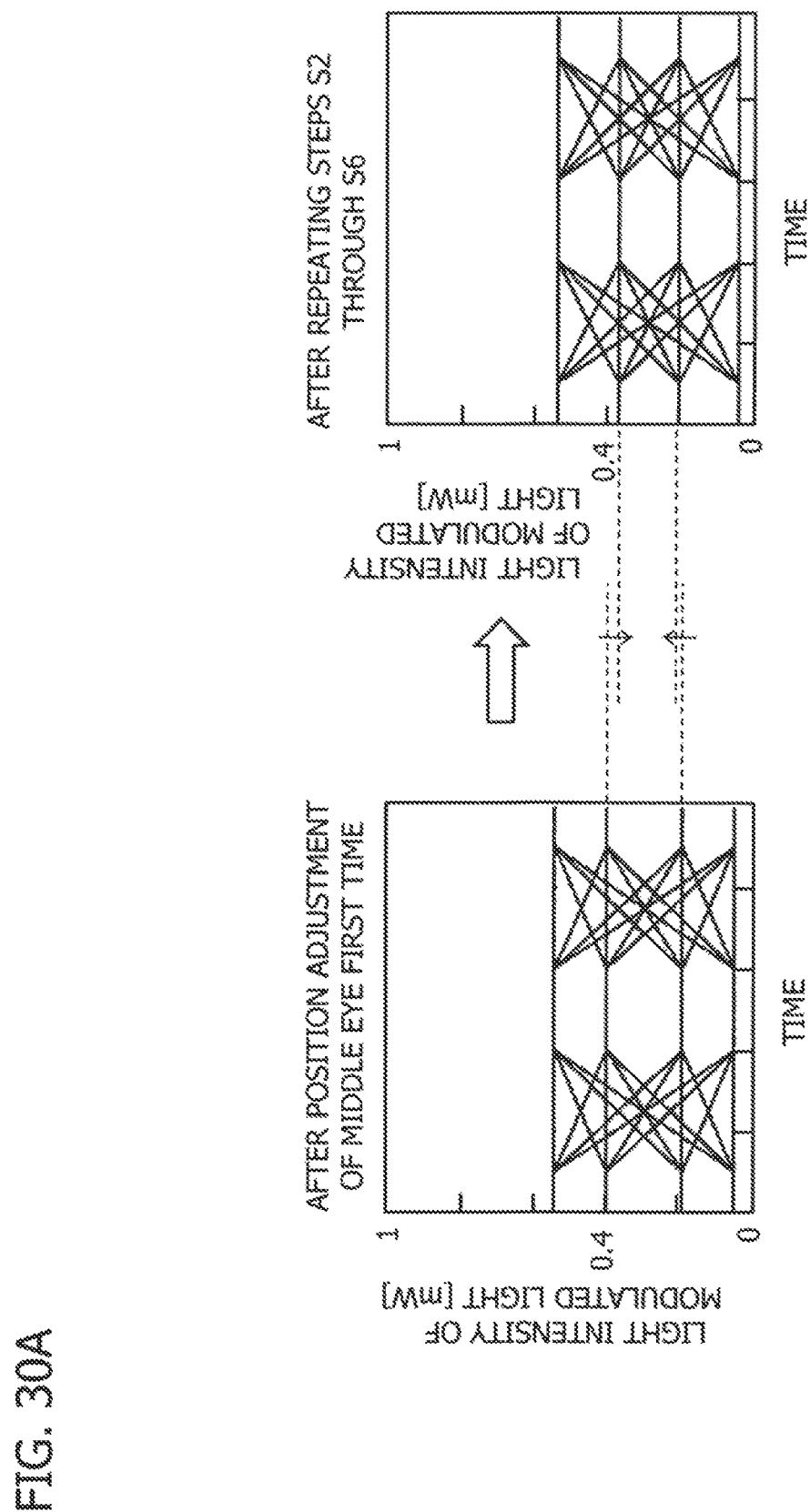
FIG. 30A is a diagram illustrating an eye pattern of the modulated light 32 obtained by repeating steps S2 through S6.
Figure 30B:
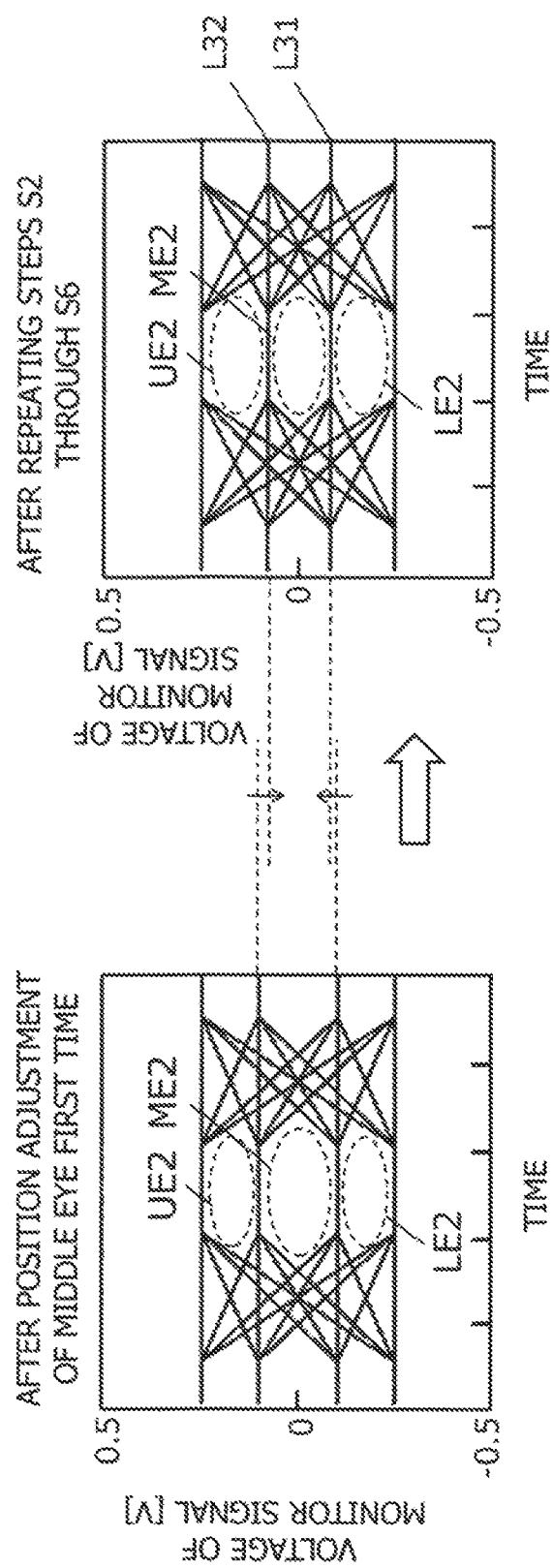
FIG. 30B is a diagram illustrating an eye pattern of the monitor signal 46 obtained by repeating steps S2 through S6.

FIG. 29B illustrates an eye pattern of the modulating signal 22. FIG. 30A illustrates an eye pattern of the modulated light 32. FIG. 30B illustrates an eye pattern of the monitor signal 46.

In the example illustrated in FIGS. 29A, 29B, 30A, and 30B, due to the repetition of steps S2 through S6, the third-lowest level of the multivalued signal 12 (i.e., 2Level) falls, and the second-lowest level (i.e., 1level) rises. Accordingly, the third-lowest level L42 of the driver output 20 falls, and the second-lowest level L41 rises, as indicated in the change from the left diagram to the right diagram in FIG. 29A. The change in the driver output 20 is reflected in the modulating signal 22, and as a result, the level intervals of the modulated light 32 change (see FIG. 30A).

Accordingly, the third-lowest level L32 of the monitor signal 46 falls, and the second-lowest level L31 rises, as indicated in the change from the left diagram to the right diagram in FIG. 30B.

As a result, the upper eye UE2 that is smaller (more precisely, smaller in height) than the middle eye ME2 becomes bigger (more precisely, bigger in height), and the middle eye ME2 and the upper eye UE2 become approximately the same height (see FIG. 30B). In the same way, the lower eye LE2 that is smaller (more precisely, smaller in height) than the middle eye ME2 becomes bigger (more precisely, bigger in height), and the middle eye ME2 and the lower eye LE2 become approximately the same height (see FIG. 30B). That is to say, the level intervals of the monitor signal 46 become approximately uniform. Accordingly, the level intervals of the modulated light 32 (see FIG. 30A) also become uniform, and thus demodulation error of the transmission light 34 is suppressed.

Now, in the above example, step S4 ends after the height of the upper eye UE is adjusted just once, and the next step (i.e., step S6) is executed. This is the same for step S6 as well. Accordingly, the adjustment of the heights of the upper eye UE2 and the lower eye LE2 is alternately performed in the repetition of steps S2 through S6. Alternating adjustment of the heights of the upper eye UE2 and the lower eye LE2 in this way enables the time taken to make the level intervals of the monitor signal 46 uniform shorter.

(2) Reference Example

Figure 31:
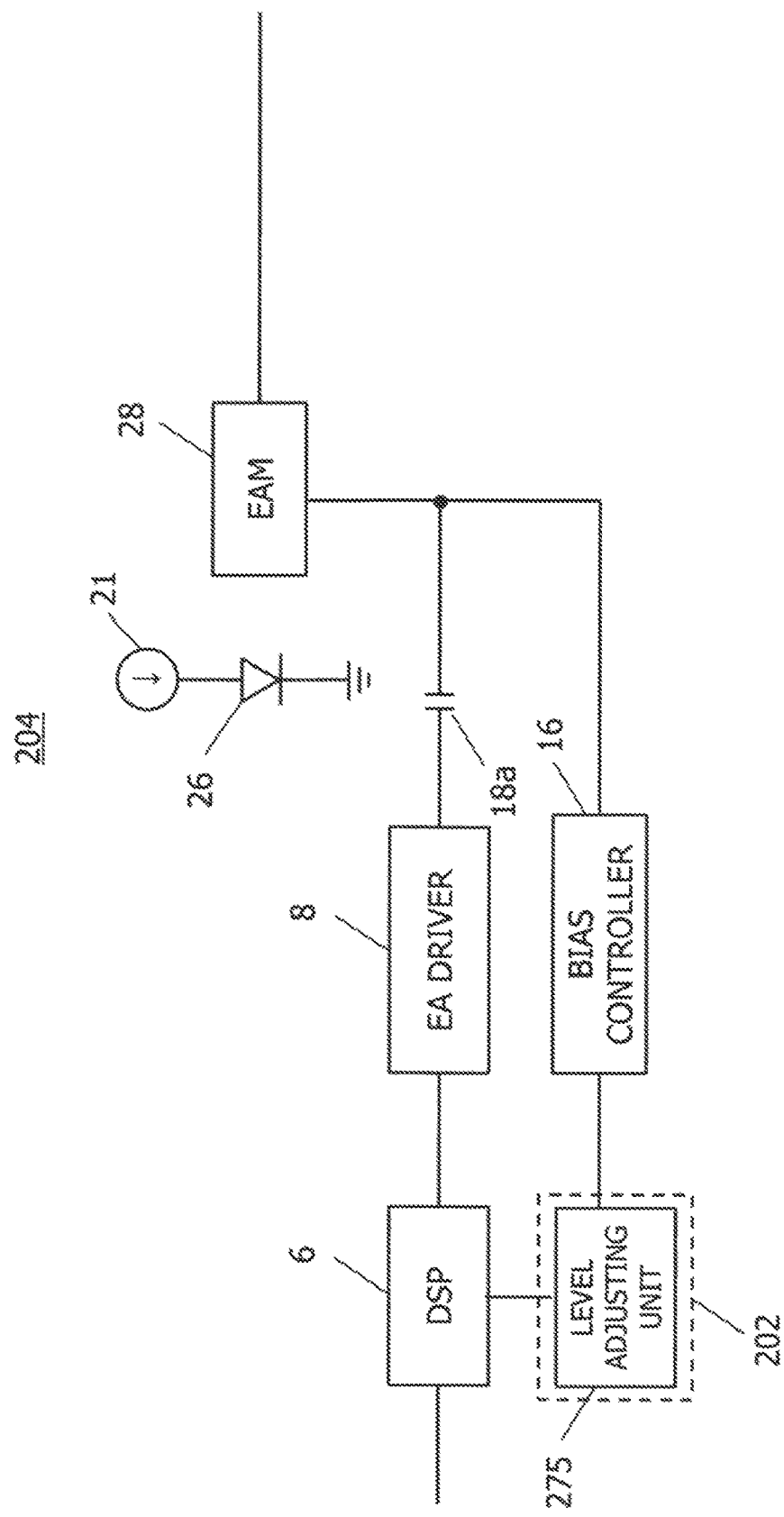
FIG. 31 is a diagram illustrating an example of an optical transmitter 204 that makes the level intervals of the modulated light 32 to be uniform without being based on the level of the monitor signal 46.
Figure 32:
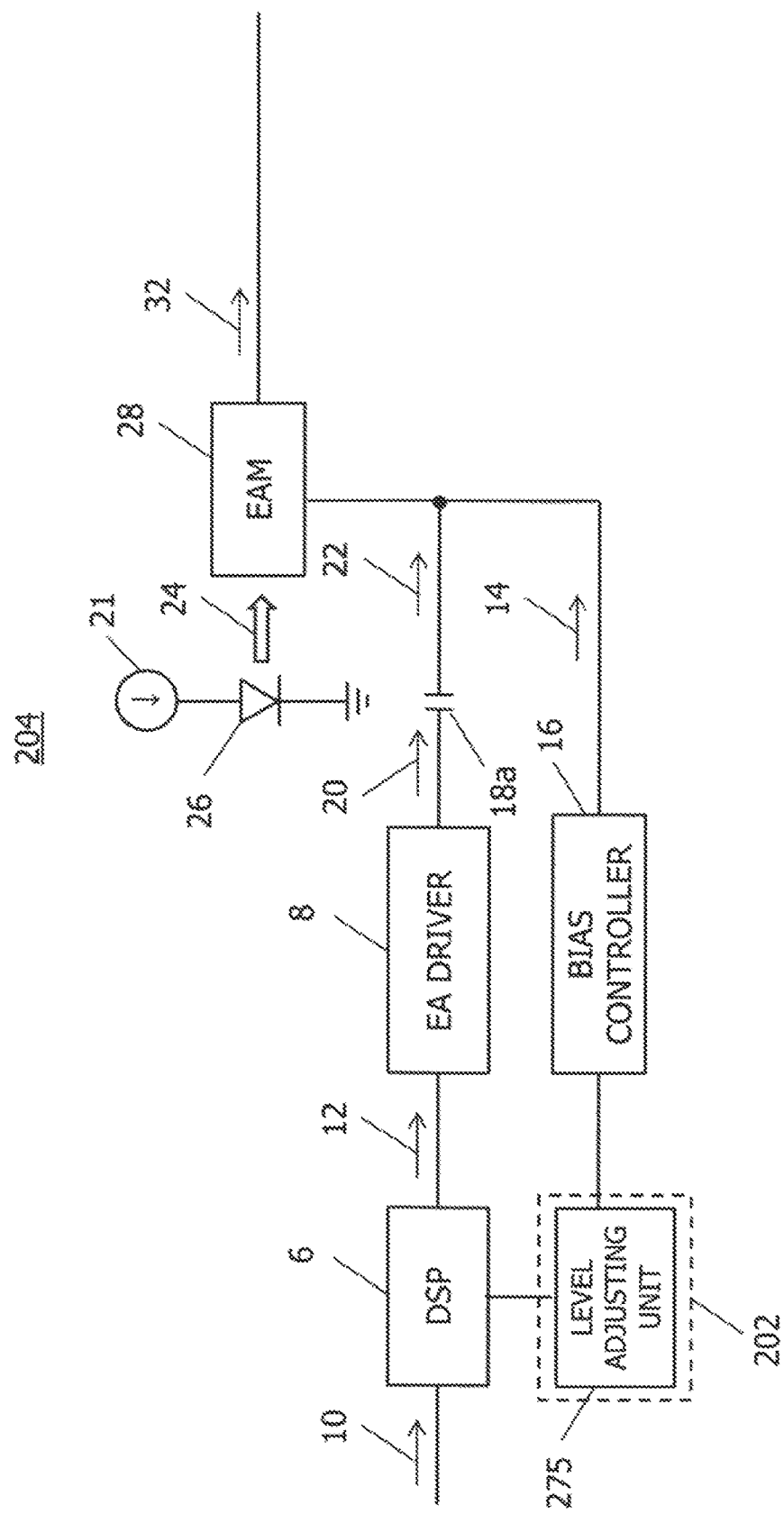
FIG. 32 is a diagram illustrating the flow of signals in FIG. 31.

In the example described with reference to FIG. 1 and others, the level intervals of the modulated light 32 are made uniform by adjusting the level of the multivalued signal 12 on the basis of the monitor signal 46. However, the level intervals of the modulated light 32 can be made to be uniform without being based on the level of the monitor signal 46. FIG. 31 is a diagram illustrating an example of an optical transmitter 204 that makes the level intervals of the modulated light 32 to be uniform without being based on the level of the monitor signal 46. FIG. 32 is a diagram illustrating the flow of signals in FIG. 31.

A control device 202 of the optical transmitter 204 has only a level adjusting unit 275, unlike the control device 2 described with reference to FIG. 1 and others, and does not have the high-side signal generating unit 64 and so forth. Further, the optical transmitter 204 does not have the photodetector 33 and so forth for generating the monitor signal 46, either.

The hardware configuration of the level adjusting unit 275 is generally the same as the hardware configuration of the level adjusting unit 75 described with reference to FIG. 17. Note however, that the level adjusting unit 275 does not have the interfaces 112a through 112d described with reference to FIG. 17 and the ADCs 114a through 114d. The modulation characteristics 48 of the modulator 28 (see FIG. 4) are recorded in the nonvolatile memory 108, along with control programs of the DSP 6.

The CPU 104 of the level adjusting unit 275 controls the bias controller 16 to set the bias voltage 14 (see FIG. 32). The CPU 104 further reads out the modulation characteristics 48 from the nonvolatile memory 108, and calculates the levels (0level to 3level) of the multivalued signal 12 regarding which the level intervals of the modulated light 32 are to be made uniform, for example, on the bases of the modulation characteristics 48 read out. The DSP 6 is instructed by the CPU 104 to realize the calculated levels of the multivalued signal 12.

Accordingly, the level intervals of the modulated light 32 can be made uniform by the control device 202 in FIG. 31 as well. However, the modulation characteristics change in accordance with the temperature of the modulator 28. In optical transmission devices in recent years, maintaining the temperature of the modulator 28 constant is rare, for the sake of suppressing electric power consumption. Accordingly, in order to calculate the level intervals of the multivalued signal 12 on the basis of the modulation characteristics of the modulator 28, modulation characteristics would have to be measured for each modulator 28 at a great number of temperatures, with the results being recorded in the nonvolatile memory 108 in advance. This is for calculating the levels of the multivalued signal 12 using accurate modulation characteristics determined by the ambient temperature of the modulator 28. Such technology (measurement of modulation characteristics at a great number of temperatures, in particular) is cumbersome and impractical.

Conversely, the control device 2 described with reference to FIG. 1 and so forth adjusts the levels of the multivalued signal 12 without being based on the modulation characteristics of the modulator 28, and accordingly has no such problem.

(3) Modifications (3-1) Modification 1

An optical transmitter according to Modification 1 has generally the same structure as the structure of the optical transmitter 4 described with reference to FIG. 1 and others, except for the modulator 28 (see FIG. 2) being a Mach-Zehnder modulator (hereinafter referred to as MZM).

Figure 33:
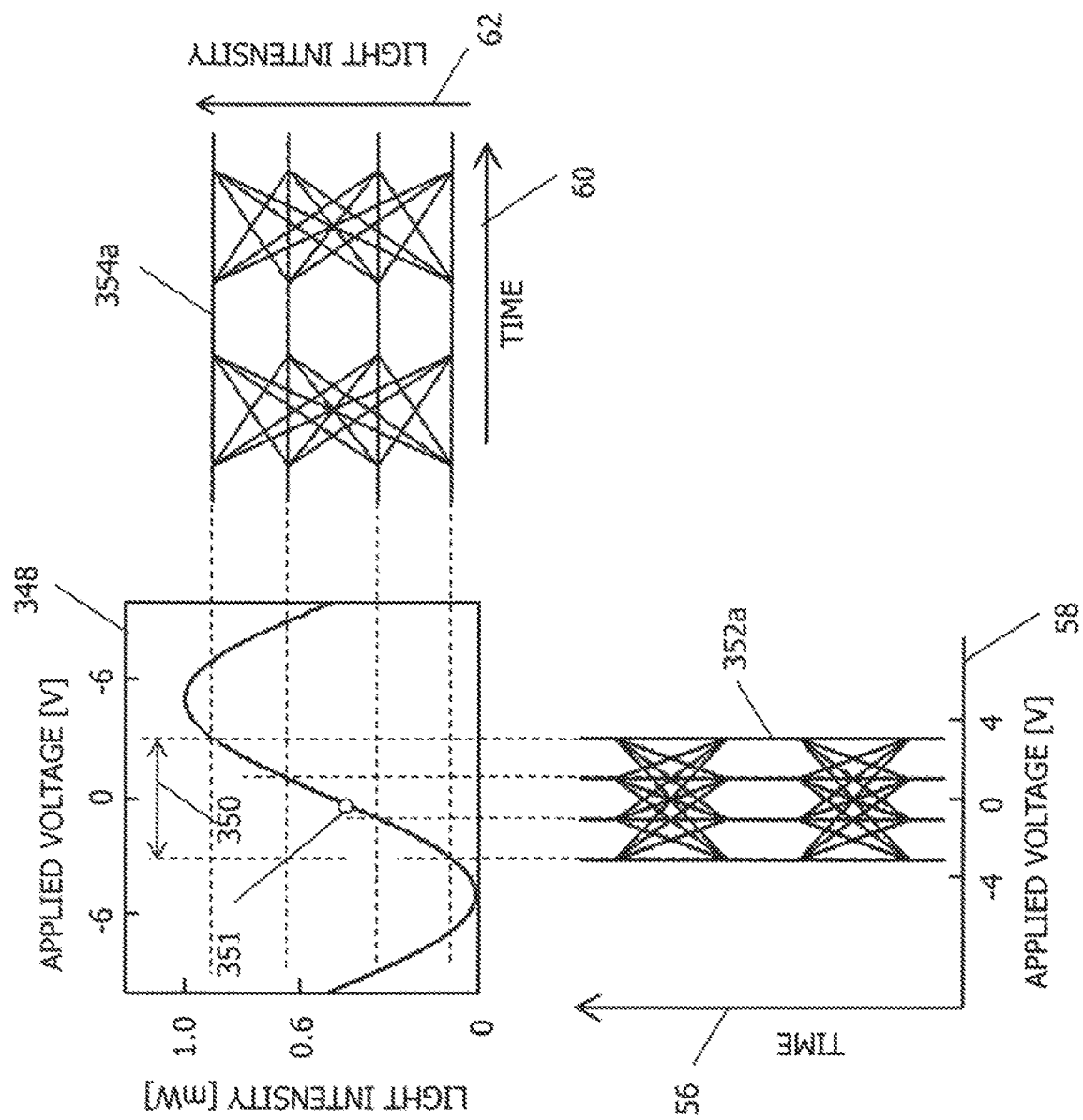
FIGS. 33, 34 and 35 are diagrams for describing level adjustment of the modulating signal 22 performed in the optical transmitter according to Modification 1.
Figure 34:
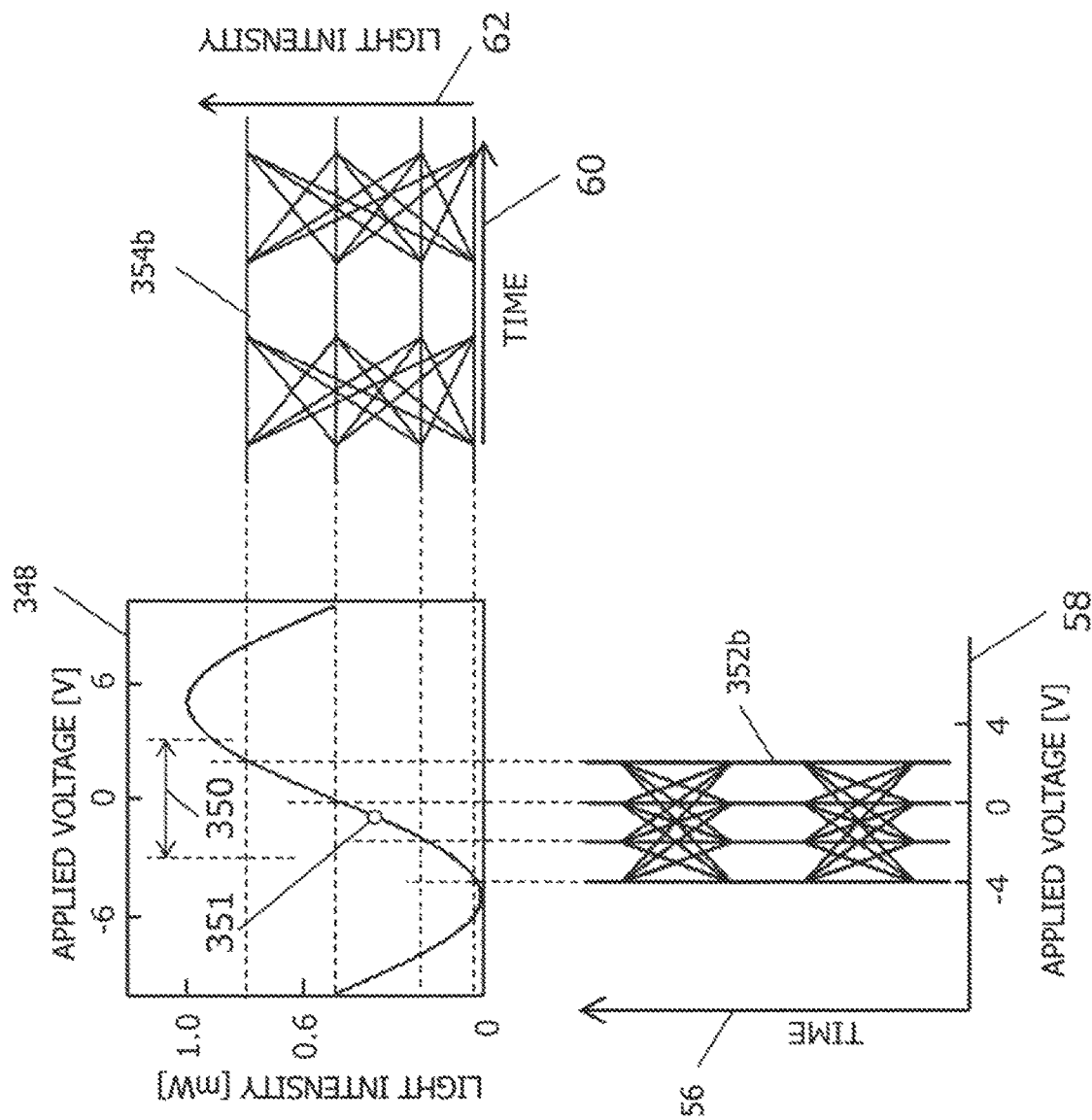
Figure 35:
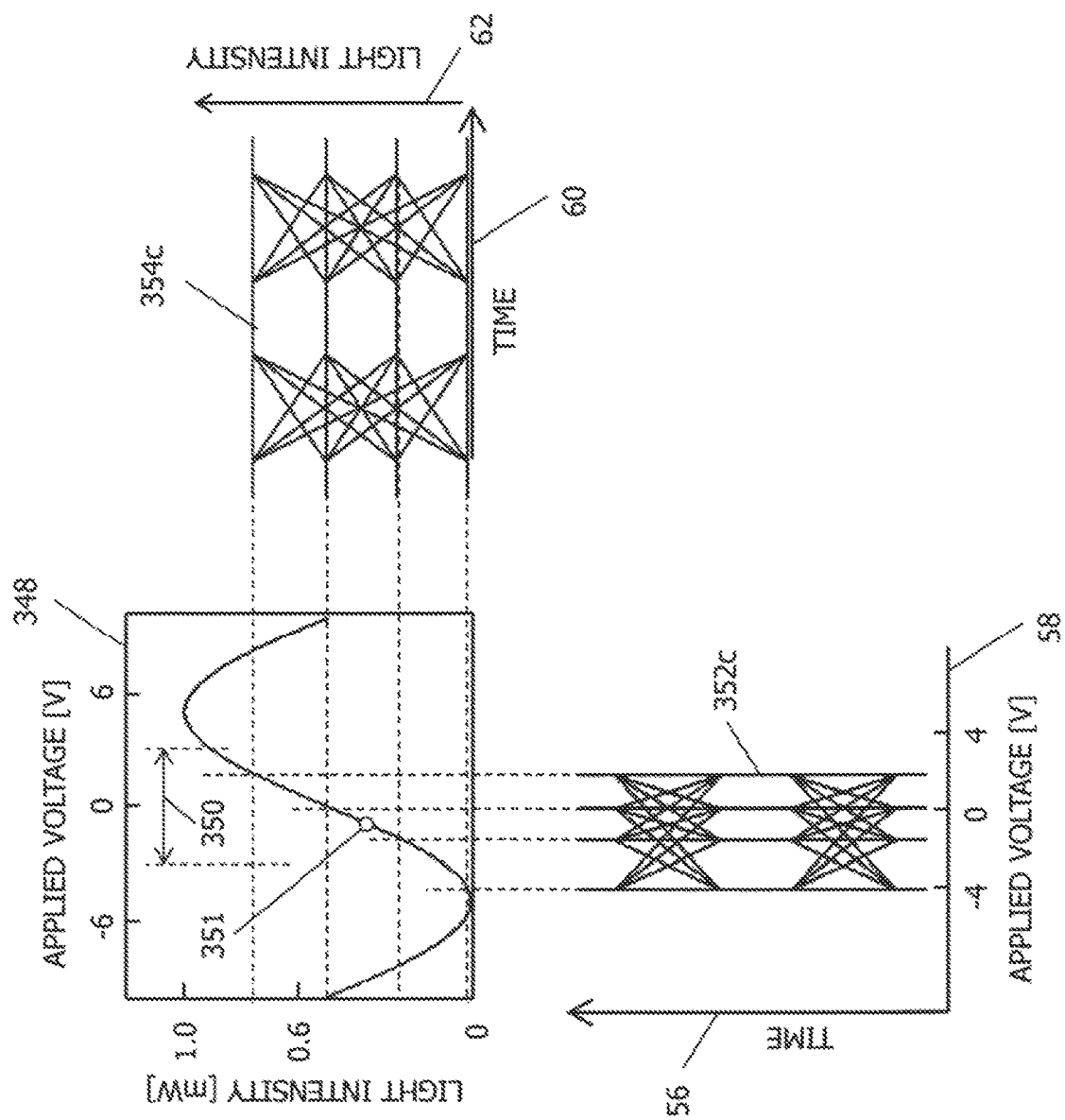

FIGS. 33 through 35 are diagrams for describing level adjustment of the modulating signal 22 performed in the optical transmitter according to Modification 1. FIG. 33 is a diagram illustrating an example of an eye pattern 354a of the modulated light 32, generated in a case in which the bias voltage 14 is set at the center of a linear region 350 of modulation characteristics 348. An outline dot 351 indicates the bias point of the MZM (the same hereinafter).

FIG. 33 illustrates the modulation characteristics 348 of the MZM, an eye pattern 352a of the modulating signal 22, and the eye pattern 354a of the modulated light 32. The time axes and so forth illustrated in FIG. 33 are drawn in the same way as the time axis 56 and so forth illustrated in FIG. 5. This is the same for the time axes and so forth in FIGS. 34 and 35 as well.

In a case in which the level of the modulating signal 22 (i.e., the applied voltage) changes within the linear region 350, the eye pattern 352a of the modulating signal 22 and the eye pattern 354a of the modulated light 32 are approximately the same shape, as illustrated in FIG. 33. Accordingly, as long as the level intervals of the modulating signal 22 (i.e., the heights of the eyes) are uniform, the level intervals of the modulated light 32 will also be approximately uniform.

FIG. 34 is a diagram illustrating an example of an eye pattern 354b of the modulated light 32 generated in a case in which the bias voltage 14 is set to a voltage lower than the center of the linear region 350. The modulation characteristics 348 of the MZM, an eye pattern 352b of the modulating signal 22, and the eye pattern 354b of the modulated light 32 are illustrated in FIG. 34.

When the level of the modulating signal 22 changes overlapping with outside of the linear region 350, the eye pattern 354b of the modulated light 32 changes to a pattern differs from the shape of the eye pattern 352b of the modulated signal 22, as illustrated in FIG. 34. Accordingly, the level intervals of the modulated light 32 are non-uniform even though the level intervals of the modulating signal 22 are uniform.

FIG. 35 is a diagram illustrating an example of an eye pattern 354c of the modulated light 32 in which level intervals are adjusted by the control device 2. The modulation characteristics 348 of the MZM, an eye pattern 352c of the modulating signal 22, and the eye pattern 354c of the modulated light 32 are illustrated in FIG. 35.

In the same way as the example illustrated in FIG. 34, the bias voltage 14 is set to a voltage lower than the center of the linear region 350 (see bias point 351). The control device 2 adjusts the level intervals of the multivalued signal 12 following the procedures illustrated in FIGS. 18, 19, 25, and 27.

Accordingly, the level intervals of the modulating signal 22 become broader in a region in which the inclination of the modulation characteristics 348 is small (i.e., the low-voltage side of the bias point 351), and the level intervals of the modulating signal 22 become narrower in regions in which the inclination of the modulation characteristics is great (i.e., the high-voltage side of the bias point 351) (see FIG. 35). As a result, the level intervals of the eye pattern 354c of the modulated light 32 become approximately uniform (see FIG. 35).

The modulation characteristics 48 of the electro-absorption modulator (see FIG. 5) and the modulation characteristics 348 of the MZM are greatly different. However, the modulation characteristics of the MZM in and near the linear region 350 (see FIG. 33) are similar to the modulation characteristics of the electro-absorption modulator in and near the linear region 50 (see FIG. 5). Accordingly, the control device 2 according to the embodiment 1 is capable of adjusting the level intervals of the modulated light 32 (e.g., making level intervals uniform) even if the modulator 28 is an MZM. This Modification 1 is particularly advantageous in cases of large-amplitude operations of the MZM, as illustrated in FIGS. 33 through 35.

In the example illustrated in FIGS. 33 through 35, the bias point 351 is set in a region in which the output of the MZM increases as the applied voltage increases. However, the bias point 351 may be set in a region in which the output of the MZM decreases as the applied voltage increases.

According to Modification 1, the variety of optical transmitters to which the control device 2 according to the embodiment 1 is applied is increased.

(3-2) Modification 2

An optical transmitter according to Modification 2 has generally the same structure as the optical transmitter 4 described with reference to FIG. 1 and so forth, except for using an optical device that has an optical modulator and a semiconductor optical amplifier (hereinafter referred to as optical modulator unit including an amplifier) instead of the modulator 28. The optical modulator unit including an amplifier according to Modification 2 has an optical modulator that operates in the linear region (e.g., electro-absorption modulator), and a semiconductor optical amplifier that amplifies the output of the optical modulator.

Such an optical device exhibits non-linearity based on gain saturation of the semiconductor optical amplifier. According to the control device 2 of the embodiment 1, level intervals of the modulated light 32 generated by the optical modulator unit including the amplifier can be adjusted.

According to Modification 2, the variety of optical transmitters to which the control device 2 according to the embodiment 1 is applied is increased.

(3-3) Modification 3

The control device 2 according to Modification 3 has generally the same structure as the control device 2 described with reference to FIG. 1 and so forth. Furthermore, the control device 2 according to Modification 3 operates in generally the same way as the control device 2 described with reference to FIG. 1 and so forth, except for adjusting the levels of the multivalued signal 12 exhibiting three, or five or more values. Accordingly, the modulating signal 22 according to Modification 3 causes the modulator to generate modulated light exhibiting three, or five or more values, by taking a first level, a second level that is higher than the first level, and one or three or more third levels that is higher than the first level and lower than the second level.

In the position control of the middle eye (see FIG. 19), one third level is adjusted, or three or more third levels are adjusted. In the height control of the upper eye (see FIG. 25) and the height control of the lower eye (see FIG. 27) as well, one third level is adjusted, or three or more third levels are adjusted. According to Modification 3, the variety of modulating signal 22 controlled by the control device 2 of the embodiment 1 is increased.

Note that in the example described with reference to FIGS. 1 through 7, 8A, 8B, 9A, 9B, 10 through 21, 22A, 22B, 23A, 23B, 24A through 24C, 25 through 28, 29A, 29B, 30A, 30B, and 31 through 35, the third level is the two levels L51 and 52 (see FIG. 22B). Therefore, the number of third levels of the modulating signal 22 according to Embodiment 1 is at least one.

(4) Control Method

FIG. 19 and others illustrate the following control method.

The control device 2 generates a high-side signal 76. The high-side signal 76 takes (or assumes) a level in accordance with the level of the monitor signal 46 when the polarity of the monitor signal 46 is positive or the magnitude of the monitor signal 46 is zero. The high-side signal 76 further takes a constant level when the polarity of the monitor signal 46 is negative.

The control device 2 further generates the low-side signal 90. The the low-side signal 90 takes a constant level when the polarity of the monitor signal 46 is positive. The low-side signal 90 takes a level in accordance with the level of the monitor signal 46 when the polarity of the monitor signal 46 is negative or the magnitude of the monitor signal 46 is zero.

The control device 2 further generates the high-side peak value signal 96 that takes the fourth level in accordance with a first certain level out of levels that the high-side signal takes. The first certain level is a level with a greatest value of absolute values for levels that the high-side signal 76 takes. The control device 2 further generates the low-side peak value signal 98 that takes the fifth level in accordance with a second certain level out of levels that the low-side signal takes. The second certain level is a level with a greatest value of absolute values for levels that the low-side signal 90 takes. The control device 2 finally adjusts at least one third level (i.e., one or more third levels) of the modulating signal 22 on the basis of the fourth level taken by the high-side peak value signal 96 and the fifth level taken by the low-side peak value signal 98.

As described with reference to FIGS. 24A through 24C, the peak value difference ΔPeak changes in accordance with the third levels of the monitor signal 46 (level L31 and level L32 in the example illustrated in FIGS. 24A through 24C). This is the same regarding the high-side level ratio HSR and the low-side level ratio LSR as well.

Therefore, according to the embodiment 1, the third levels of the modulating signal 22 are adjusted so that the measurement values of ΔPeak and so forth obtained by steps S12 through S16 (see FIG. 19) and so forth approach the target values of ΔPeak and so forth. An example of "target values of ΔPeak and so forth" is the values of ΔPeak and so forth obtained when target level intervals (e.g., uniform level intervals) are realized in the monitor signal 46, for example.

The target values of ΔPeak and so forth are values determined by the format of the optical transmission system, and are unrelated to characteristics of the modulator (i.e., modulation characteristics). Thus, according to the embodiment 1, the level intervals of the modulated light 32 can be adjusted without being based on the modulation characteristics of the optical device generating the modulated light 32 (e.g., the modulator 28). Thus, according to the embodiment 1, level intervals of the modulated light 32 can be adjusted without recording modulation characteristics of the optical device generating the modulated light 32 in nonvolatile memory or the like.

An embodiment of the present invention has been described above, but the embodiment is exemplary, and not limiting. For example, the control device 2 adjusts the second and third-lowest levels L51 and L52 of modulating signals, while maintaining the difference (=L52−L51) of the second and third-lowest levels L51 and L52 of modulating signals 22 constant. However, the control device 2 may adjust the second-lowest level L51 and the third-lowest level L52 of the modulating signal 22 independently from each other.

Further, the control device 2 in the embodiment 1 adjusts the position of the middle eye, the height of the upper eye, and the height of the lower eye, of the modulating signal 22. However, the control device 2 may adjust only the position of the middle eye of the modulating signal 22. If the non-linearity of modulation characteristics of the modulator or the like are weak, the level intervals of the modulated light 32 will become approximately constant just by adjusting the position of the middle eye. Alternatively, the control device 2 may adjust the position of the middle eye of the modulating signal 22, and thereafter adjust just one of the height of the upper eye and the height of the lower eye.

In the example described with reference to FIG. 2 and others, the signal that the DSP 6 converts into the multivalued signal 12 is a digital signal 10 (i.e., a binary signal). However, the signal converted into the multivalued signal 12 by the DSP 6 may be a multivalued signal (e.g., a quaternary signal).

In the example described with reference to FIG. 1 and others, the DSP 6, the driver 8, the bias controller 16, the modulator 28, the optical splitter 30, the photodetector 33, and the current/voltage conversion device 42 are not included in the control device 2. However, the control device 2 may include part or all of these devices.

According to one aspect of the embodiments, level intervals of multivalued optical signals can be adjusted without recording modulation characteristics of modulators in memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control device that controls a modulating signal that takes a first level, a second level that is higher than the first level, and at least one third level that is higher than the first level and lower than the second level, the control device comprising:
   a high-side signal generating unit that generates a high-side signal, the high-side signal taking a level in accordance with a level of an alternating current component of an electrical signal generated from a modulated light when a polarity of the alternating current component is positive or magnitude of the alternating current component is zero, the high-side signal further taking a constant level when a polarity of the alternating current component is negative;

a low-side signal generating unit that generates a low-side signal, the low-side signal taking a constant level when a polarity of the alternating current component is positive, the low-side signal further taking a level in accordance with a level of the alternating current component when a polarity of the alternating current component is negative or magnitude of the alternating current component is zero;

a high-side peak value detecting unit that generates a high-side peak value signal that takes a fourth level in accordance with a first certain level out of levels that the high-side signal takes, the first certain level being a level with a greatest value of absolute values for levels that the high-side signal takes;

a low-side peak value detecting unit that generates a low-side peak value signal that takes a fifth level in accordance with a second certain level out of levels that the low-side signal takes, the second certain level being a level with a greatest value of absolute values for levels that the low-side signal takes;

a level adjusting unit that adjusts the at least one third level of the modulating signal on the basis of the fourth level taken by the high-side peak value signal and the fifth level taken by the low-side peak value signal, wherein the modulating signal causes an optical device to generate the modulated light by taking the first level, the second level, and the at least one third level while being applied to the optical device, the modulated light being a multivalued signal.

2. The control device according to claim 1,
wherein the level adjusting unit adjusts the at least one third level of the modulating signal such that a peak value difference that is a difference between an absolute value of the fourth level and an absolute value of the fifth level approaches a first target value.

3. The control device according to claim 1,
wherein the at least one third level includes two levels, and wherein the level adjusting unit adjusts the at least one third level of the modulating signal while maintaining a difference between the two levels constant.

4. The control device according to claim 1, further comprising:
a high-side average value detecting unit that generates a high-side average signal that takes a sixth level in accordance with a first average value of levels that the high-side signal takes,
wherein, following adjustment of the at least one third level of the modulating signal on the basis of the fourth level that the high-side peak value signal takes and the fifth level that the low-side peak value signal takes, the level adjusting unit further adjusts the at least one third level of the modulating signal on the basis of a first ratio of the sixth level that the high-side average signal takes and the fourth level that the high-side peak value signal takes.

5. The control device according to claim 4,
wherein the level adjusting unit adjusts the at least one third level of the modulating signal such that the first ratio approaches a second target value.

6. The control device according to claim 4, further comprising:
a low-side average value detecting unit that generates a low-side average signal that takes a seventh level in accordance with a second average value of levels that the low-side signal takes,
wherein, between adjustment of the at least one third level of the modulating signal on the basis of the fourth level that the high-side peak value signal takes and the fifth level that the low-side peak value signal takes and adjustment of the at least one third level of the modulating signal on the basis of the first ratio, or following adjustment of the at least one third level on the basis of the first ratio, the level adjusting unit further adjusts the at least one third level of the modulating signal on the basis of a second ratio of the seventh level that the low-side average signal takes and the fifth level that the low-side peak value signal takes.

7. The control device according to claim 6,
wherein the level adjusting unit adjusts the at least one third level of the modulating signal such that the second ratio approaches a third target value.

8. The control device according to claim 6,
wherein the level adjusting unit repeats adjustment of the at least one third level on the basis of the fourth level and the fifth level, adjustment of the at least one third level on the basis of the first ratio, and adjustment of the at least one third level on the basis of the second ratio.

9. The control device according to claim 1,
wherein the optical device is a modulator that modulates intensity of light that is input thereinto, in accordance with a level of the modulating signal.

10. A control method for controlling a modulating signal that takes a first level, a second level that is higher than the first level, and at least one third level that is higher than the first level and lower than the second level, the control method comprising:

generating a high-side signal that takes a level in accordance with a level of an alternating current component of an electrical signal generated from a modulated light when a polarity of the alternating current component is positive or magnitude of the alternating current component is zero, the high-side signal further taking a constant level when a polarity of the alternating current component is negative;

generating a low-side signal that takes a constant level when a polarity of the alternating current component is positive, the low-side signal further taking a level in accordance with a level of the alternating current component when a polarity of the alternating current component is negative or magnitude of the alternating current component is zero;

generating a high-side peak value signal that takes a fourth level in accordance with a first certain level out of levels that the high-side signal takes, the first certain level being a level with a greatest value of absolute values for levels that the high-side signal takes;

generating a low-side peak value signal that takes a fifth level in accordance with a second certain level out of levels that the low-side signal takes, the second certain level being a level with a greatest value of absolute values for levels that the low-side signal takes; and adjusting the at least one third level of the modulating signal on the basis of the fourth level taken by the high-side peak value signal and the fifth level taken by the low-side peak value signal, wherein the modulating signal causes an optical device to generate the modulated light by taking the first level, the second level, and the at least one third level while being applied to the optical device, the modulated light being a multivalued signal.

\* \* \* \* \*